(12) United States Patent
Aaron

(10) Patent No.: US 8,004,101 B2
(45) Date of Patent: Aug. 23, 2011

(54) VERTICAL AXIS VARIABLE GEOMETRY WIND ENERGY COLLECTION SYSTEM

(76) Inventor: Michael Scott Aaron, Clarksville, TN (US)

(*) Notice: Subject to any disclaimer, the term of this patent is extended or adjusted under 35 U.S.C. 154(b) by 566 days.

(21) Appl. No.: 12/287,656

(22) Filed: Oct. 11, 2008

(65) Prior Publication Data

US 2010/0092290 A1    Apr. 15, 2010

(51) Int. Cl.
*F03D 3/02* (2006.01)
(52) U.S. Cl. ............................................ 290/44; 290/55
(58) Field of Classification Search ................ 290/44, 290/55
See application file for complete search history.

(56) References Cited

U.S. PATENT DOCUMENTS

| | | | | |
|---|---|---|---|---|
| 4,419,587 A * | 12/1983 | Benton | ........................... | 290/44 |
| 4,906,060 A * | 3/1990 | Claude | ........................... | 322/29 |
| 7,518,257 B2 * | 4/2009 | Guey et al. | ..................... | 290/44 |
| 2010/0013233 A1 * | 1/2010 | Buhtz | ............................ | 290/55 |
| 2010/0296913 A1 * | 11/2010 | Lee | ............................... | 415/4.2 |

* cited by examiner

*Primary Examiner* — Gary F. Paumen

(57) ABSTRACT

A device to convert the kinetic energy of wind into kinetic energy in the form of a rotating mass (FIG. 9) and to then selectively harvest and convert the kinetic energy of the rotating mass into electrical energy using both permanent magnet and electromagnet generators (FIG. 33). The conversion of the kinetic energy of wind into mechanical kinetic energy of the rotating mass is maximized through mechanical means by varying the physical moment of inertia of the rotating mass programatically based upon real time sensor data (FIG. 27A, 27B). The conversion of the kinetic energy of the rotating mass into electrical energy is maximized through the programatical control of the field coil current of the electromagnet generator based upon real time sensor data (FIG. 62).

9 Claims, 68 Drawing Sheets

↑ WIND DIRECTION ↑

↑ WIND DIRECTION ↑

VERTICAL AXIS VARIABLE GEOMETRY WIND ENERGY COLLECTION SYSTEM

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to a device with which to efficiently capture wind energy and transform it into electrical power.

2. Background of the Invention

Wind has been utilized by man throughout history for power to mill grains, to power transmissions used in industrial processes, and to power transportation. With the current environment of energy supply from fossil based fuels becoming more scarce and expensive, wind power is being considered increasingly as an alternative means to provide electrical power.

At present the prevailing design for a typical wind generator employs the classical wind turbine whereby a nacelle assembly housing the generator and reduction gears is mounted atop a tall tower with large turbine blade structures connected to the prime mover shaft of the generator being driven by wind. To be economically viable, such designs must be large in scale and located in areas of relatively high average wind speed. The cost of installation and operation of such huge structures make such designs prohibitive for individuals or small electric cooperatives. There is an additional cost associated with providing the necessary transmission infrastructure to connect the output of these devices to the existing grid as these devices are typically located far from the grid.

Devices of this design must be placed in a standby mode of operation whenever wind speeds exceed a safe maximum value due to structural limitations of the turbine blades and reductions gears. Conversely devices of this type have a relatively high threshold of wind speed before operation can be initiated due to the large inertial and frictional forces associated with startup.

The size of the structures associated with this type of design has been found to pose a hazard to wildlife as well as being unsightly to the landscape. In addition, there has been some speculation that the harmonic frequencies generated by the high tip speed of the turbines may be harmful to humans and wildlife.

OBJECTS AND ADVANTAGES

While my invention may be scalable in size to that approaching the abovementioned wind turbine design, it lends itself to smaller, modular installations that are less intrusive on the landscape. Because my design has a vertical axis of rotation, it allows installation upon existing utility poles thereby alleviating the costs involved with erecting additional structures. The fact that my invention may be mounted upon existing utility poles means that its power output can be connected to the grid with a minimal amount of time and material cost thereby leveraging existing infrastructure.

There are no reduction gears associated with my design thereby making it more efficient without the attendant loss of power due to frictional forces inherent in designs where gears are used. My invention is designed such that it operates with lower wind speed than is typical with other designs and has features that permit more overall conversion of power when operating in conditions of light and variable winds. Moreover in conditions of high winds the robust structural design of my device allows it to operate with higher maximum wind speeds that would normally preclude operation of other designs.

The enabling techologies associated with modern electronics and automated manufacturing allow devices of this design to be mass produced at price points whereby ordinary homeowners and small electric cooperatives can afford to procure and operate them thereby bringing affordable renewable power to millions of people.

SUMMARY

This invention is designed to capture the kinetic energy of wind and convert it into kinetic energy in the form of a rotating mass. This conversion is to be done as efficiently as possible under a wide range of windspeeds and under variable wind conditions. Furthermore, this device is designed to maximize the kinetic energy of the rotating mass through mechanical means being controlled programatically using real time sensor data as input criteria. The final discriminator of this design is the selective harvest of the kinetic energy of the rotating mass through it's conversion to electrical power through electromagnetic means being controlled programatically using real time sensor data as input criteria.

DRAWINGS—FIGURES

Figure 21:
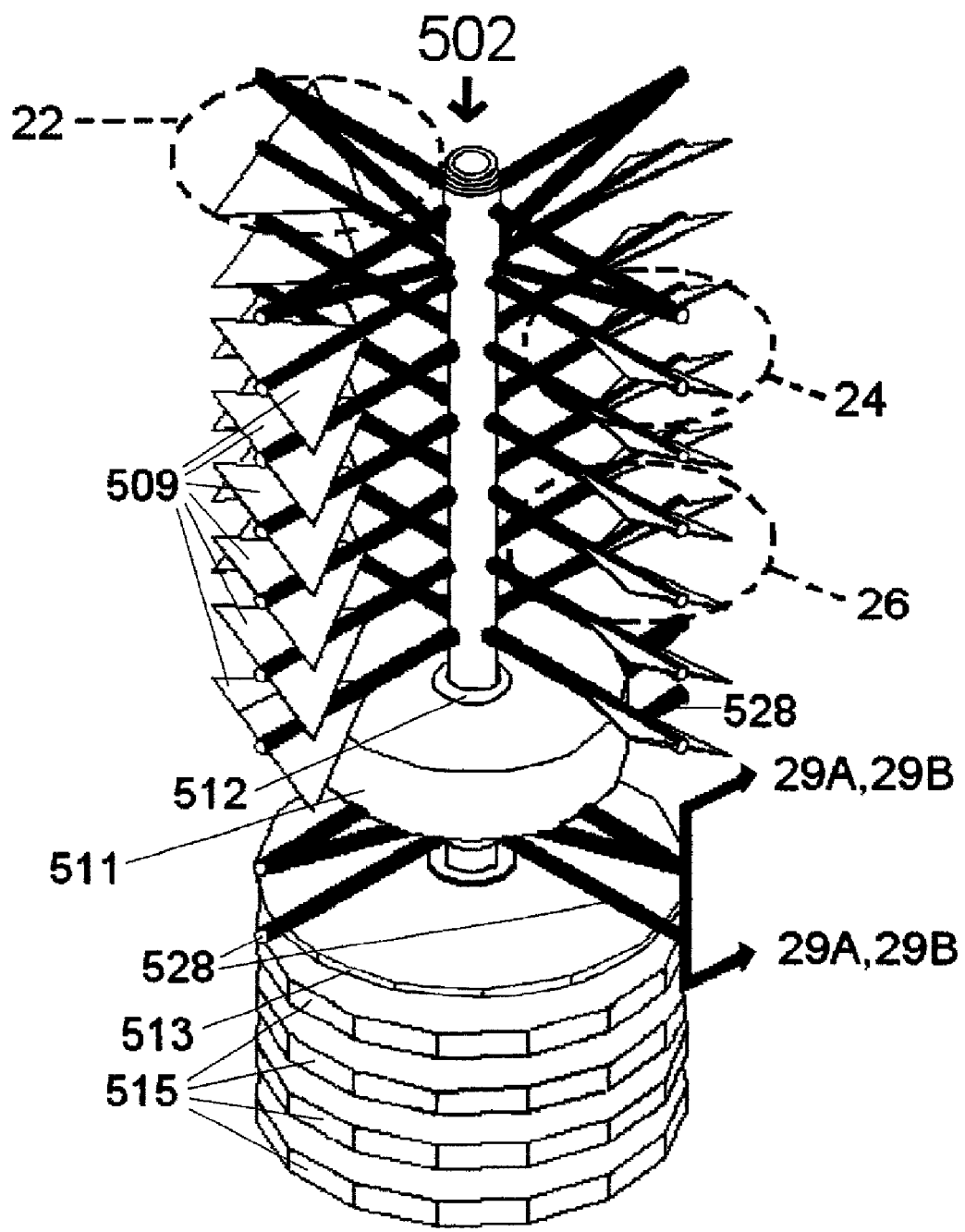

FIG. 21. shows a perspective view of the inner rotors subassembly.

Figure 22:
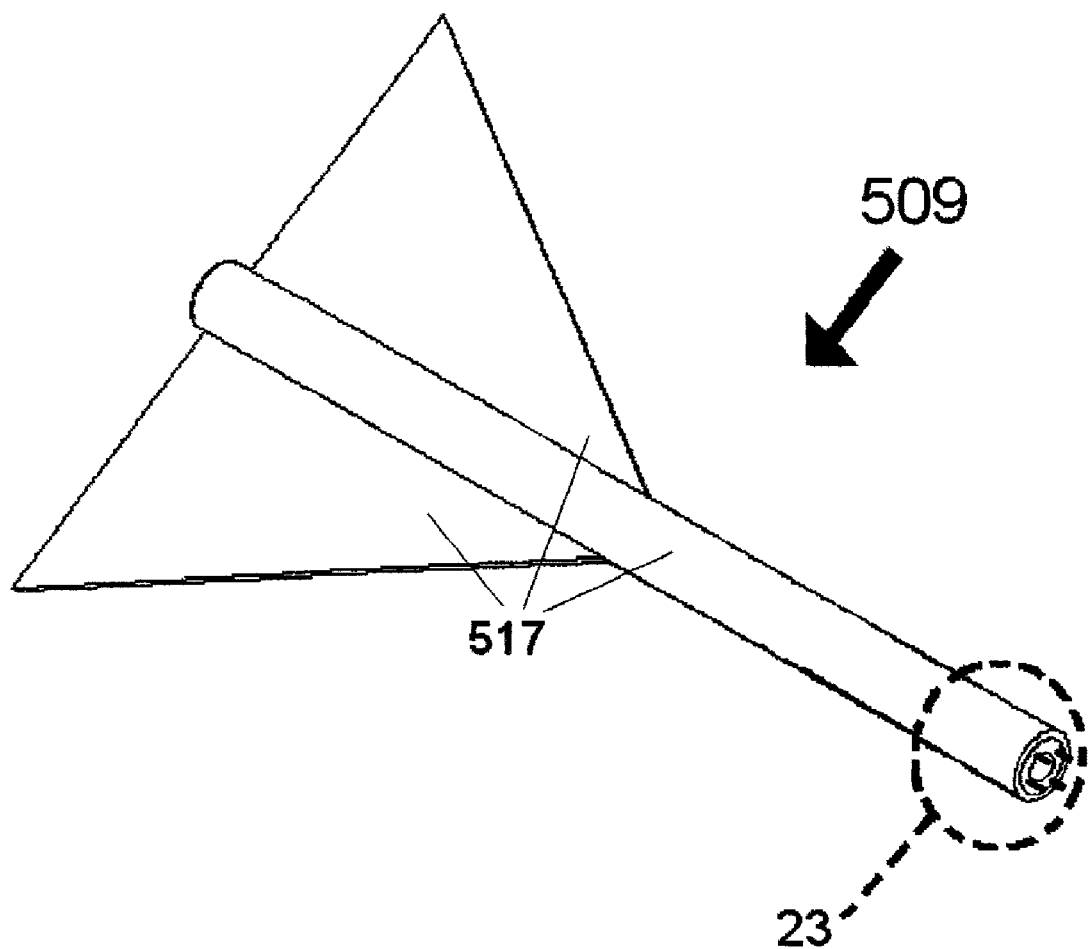

FIG. 22 shows a perspective view of a typical mass shifter subassembly depicted with inner rotor hub connection oriented toward viewer.

Figure 23:
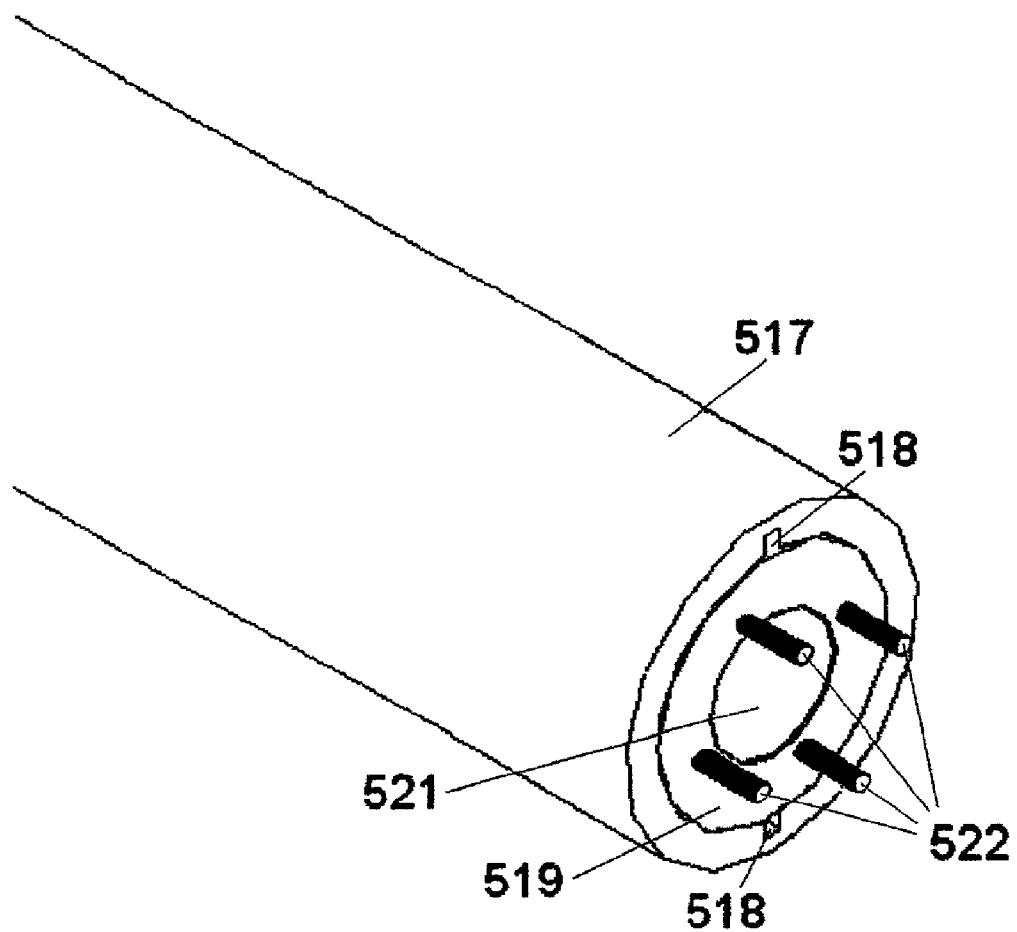

FIG. 23 shows an enlarged view of a typical mass shifter subassembly depicted with inner rotor hub connection end featured.

Figure 24:
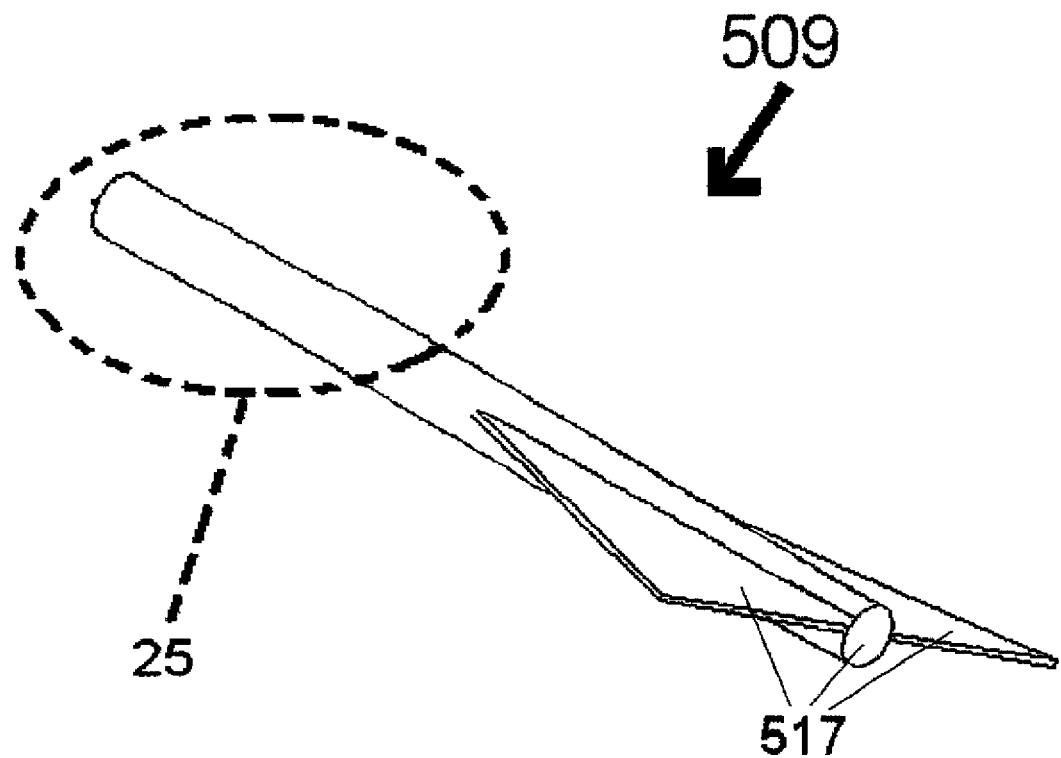

FIG. 24 shows a perspective view of a typical mass shifter subassembly depicted with outer rotor hub connection oriented toward viewer.

Figure 25:
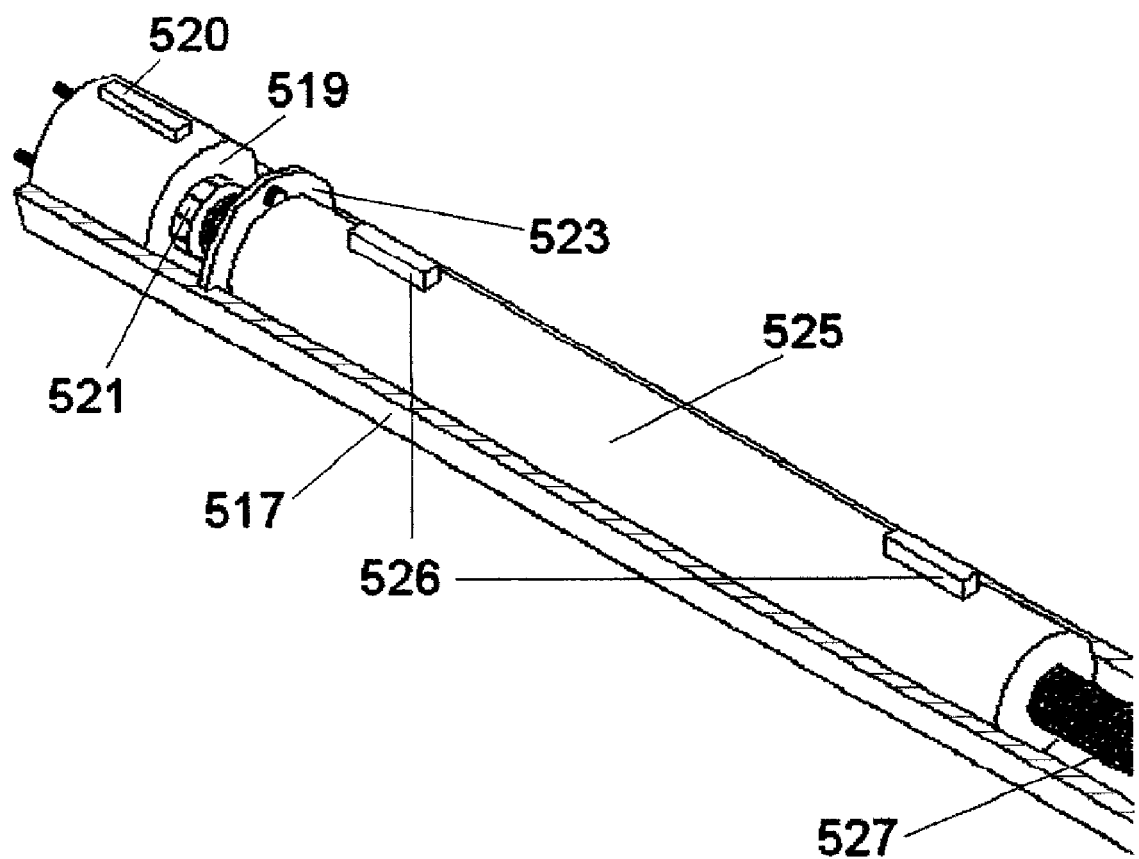

FIG. 25 shows an enlarged partial sectional view of a typical mass shifter subassembly depicted with top half of mass shifter outer structure removed.

Figure 26:
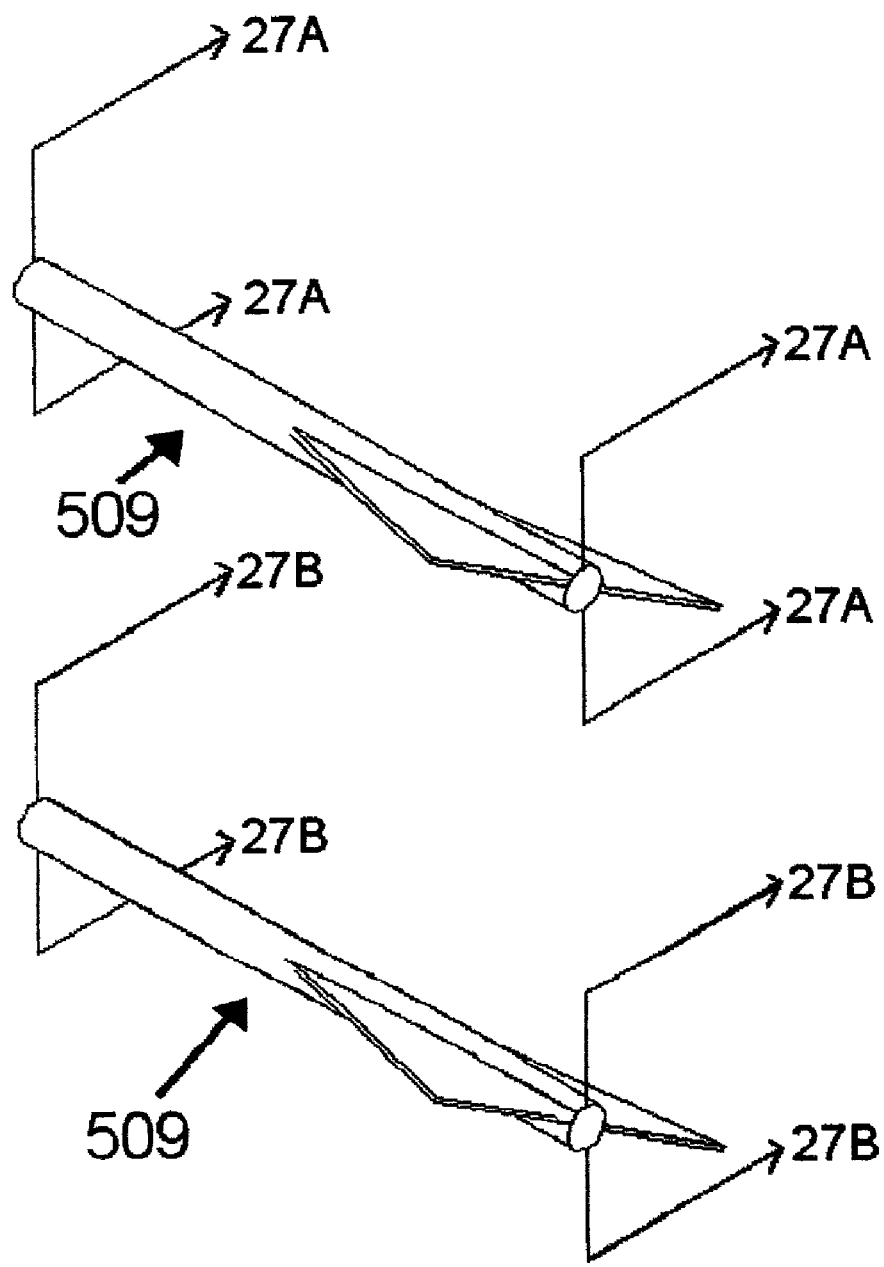

FIG. 26 shows a perspective view of two typical mass shifter subassemblies.

Figure 27A:
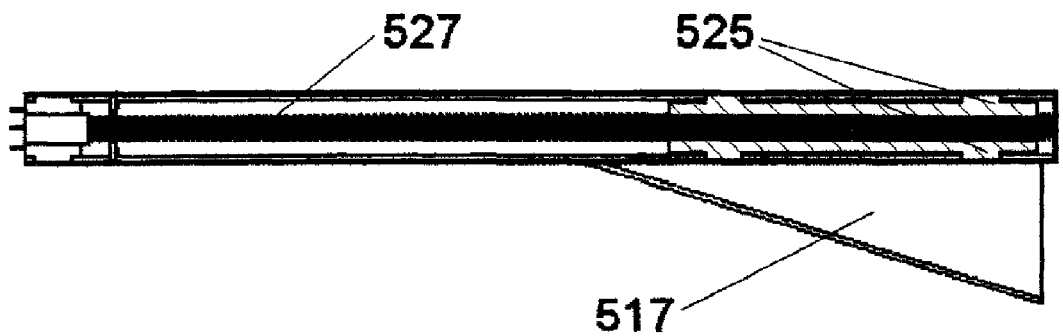

FIG. 27A shows a right side orthogonal sectional view of a typical mass shifter subassembly depicted with the shifting mass in the fully extended position.

Figure 27B:
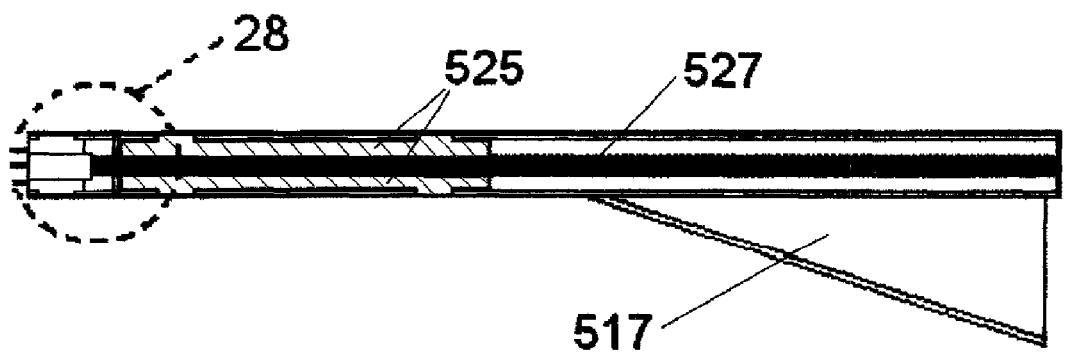

FIG. 27B shows a right side orthogonal sectional view of a typical mass shifter subassembly depicted with the shifting mass in the fully retracted position.

Figure 28:
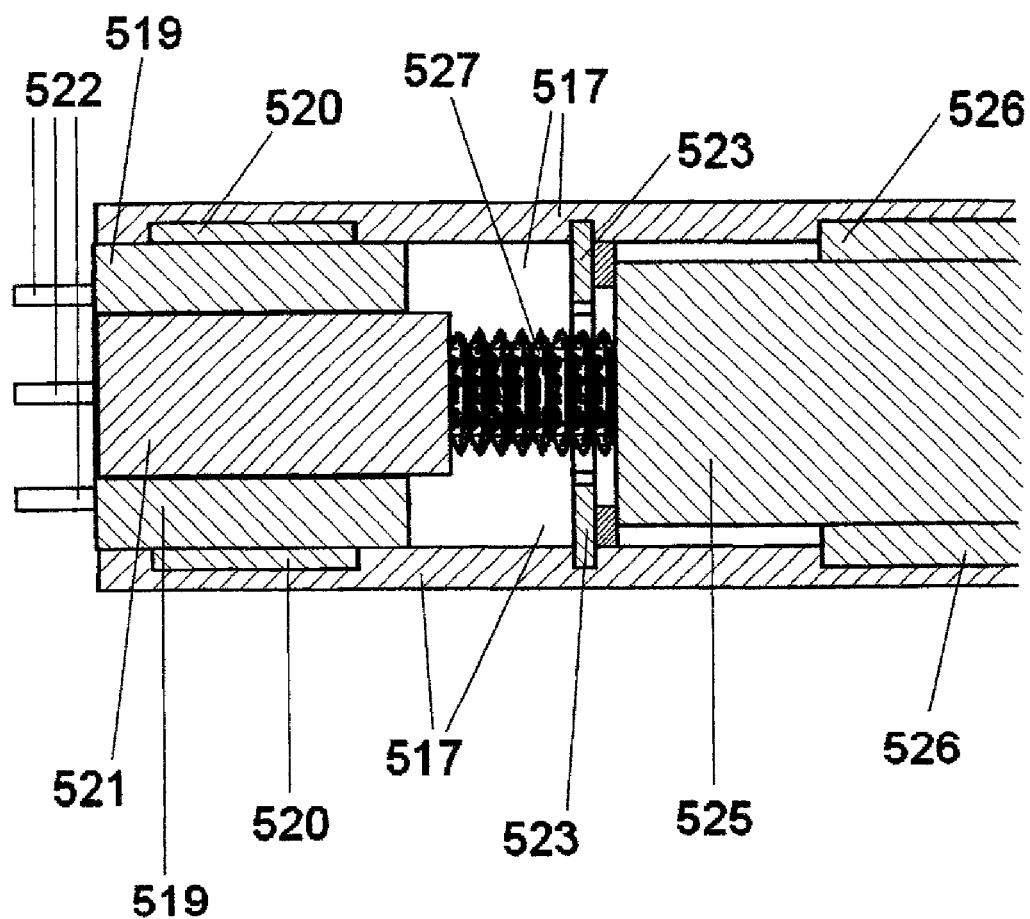

FIG. 28 shows an enlarged sectional view of a typical mass shifting mechanism.

Figure 29A:
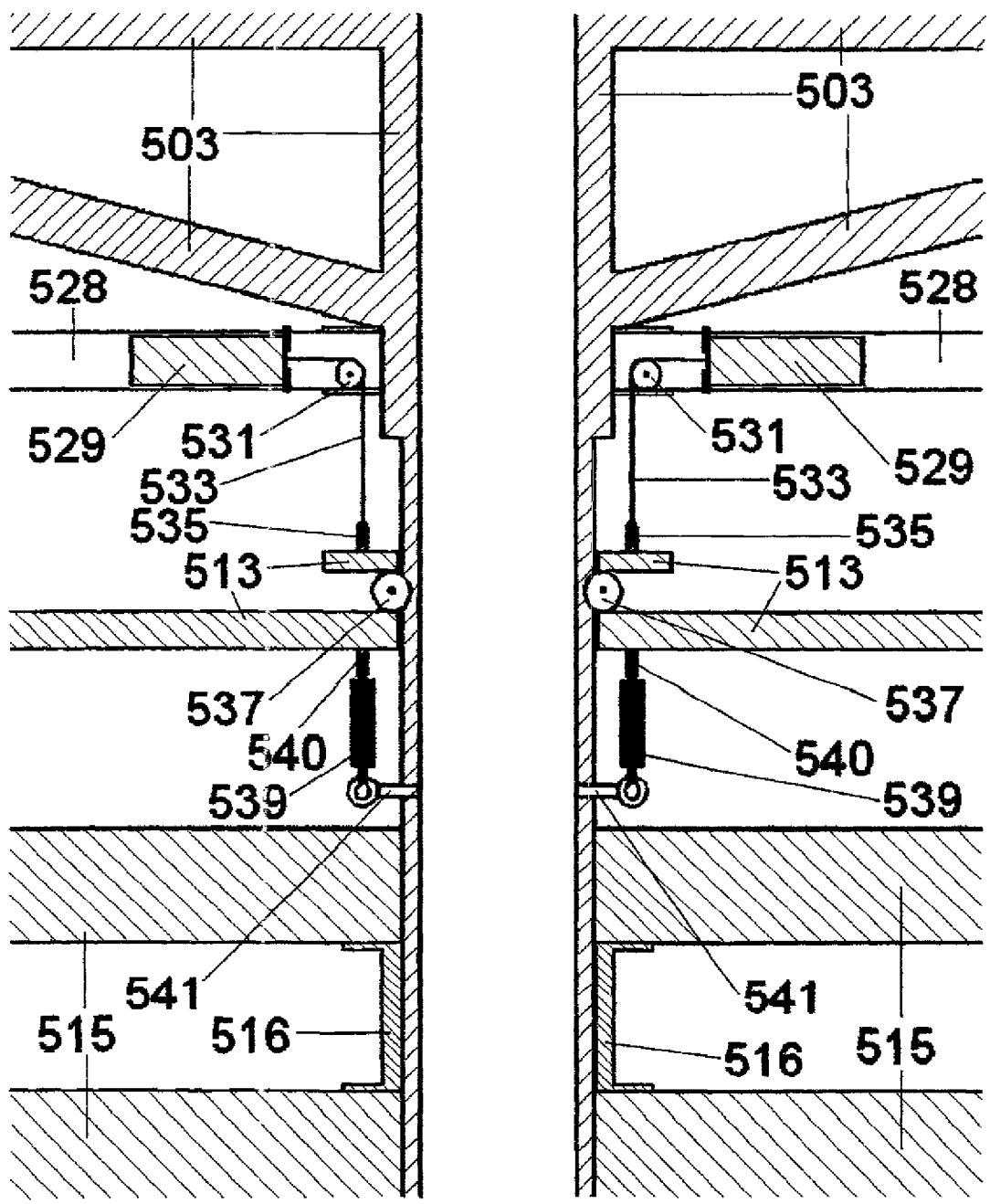

FIG. 29A shows an enlarged sectional view of the permanent magnet generator(PMG) actuator mechanism depicted in the disengaged position.

Figure 29B:
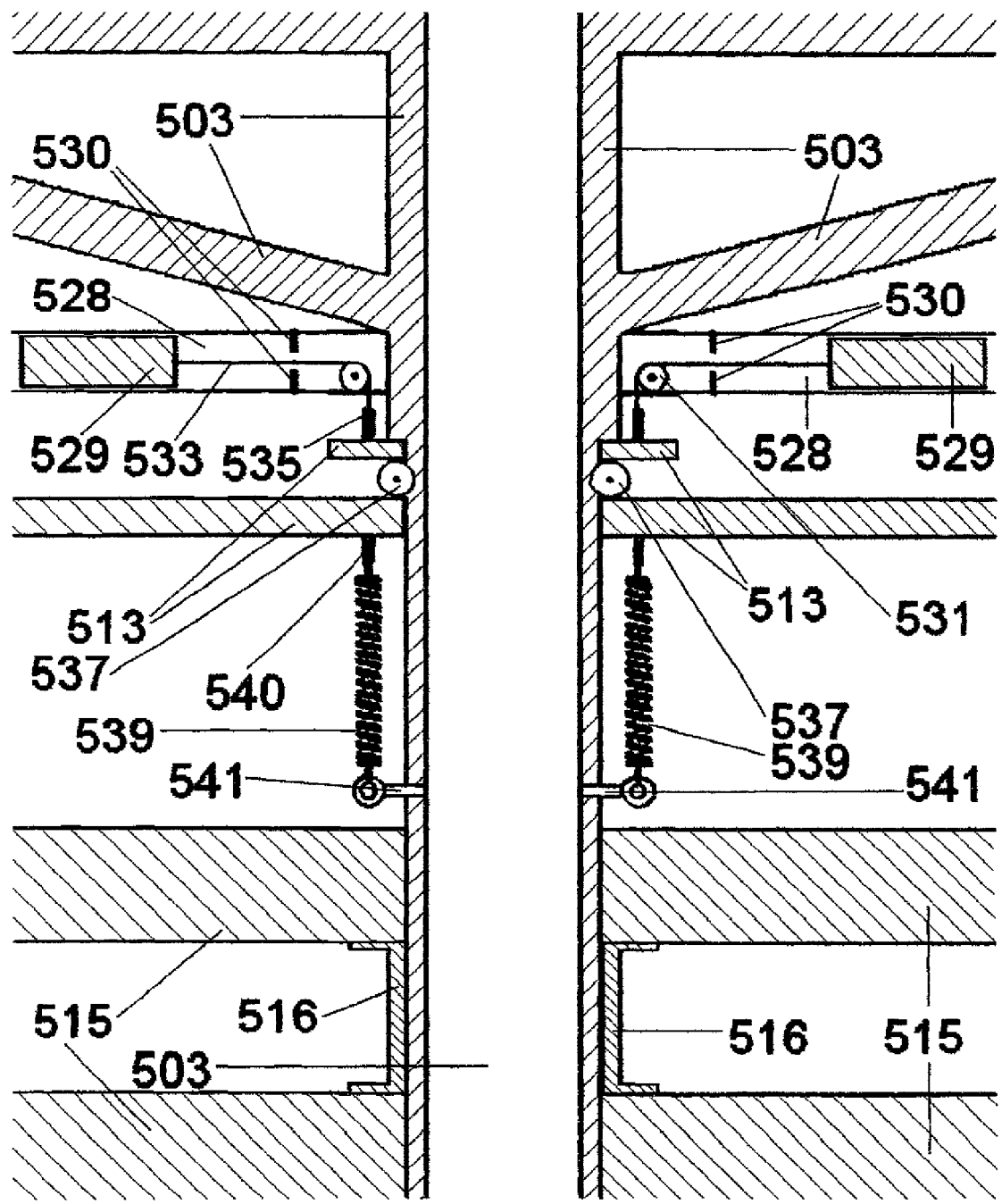

FIG. 29B shows an enlarged sectional view of the permanent magnet generator(PMG) actuator mechanism depicted in the engaged position.

Figure 30:
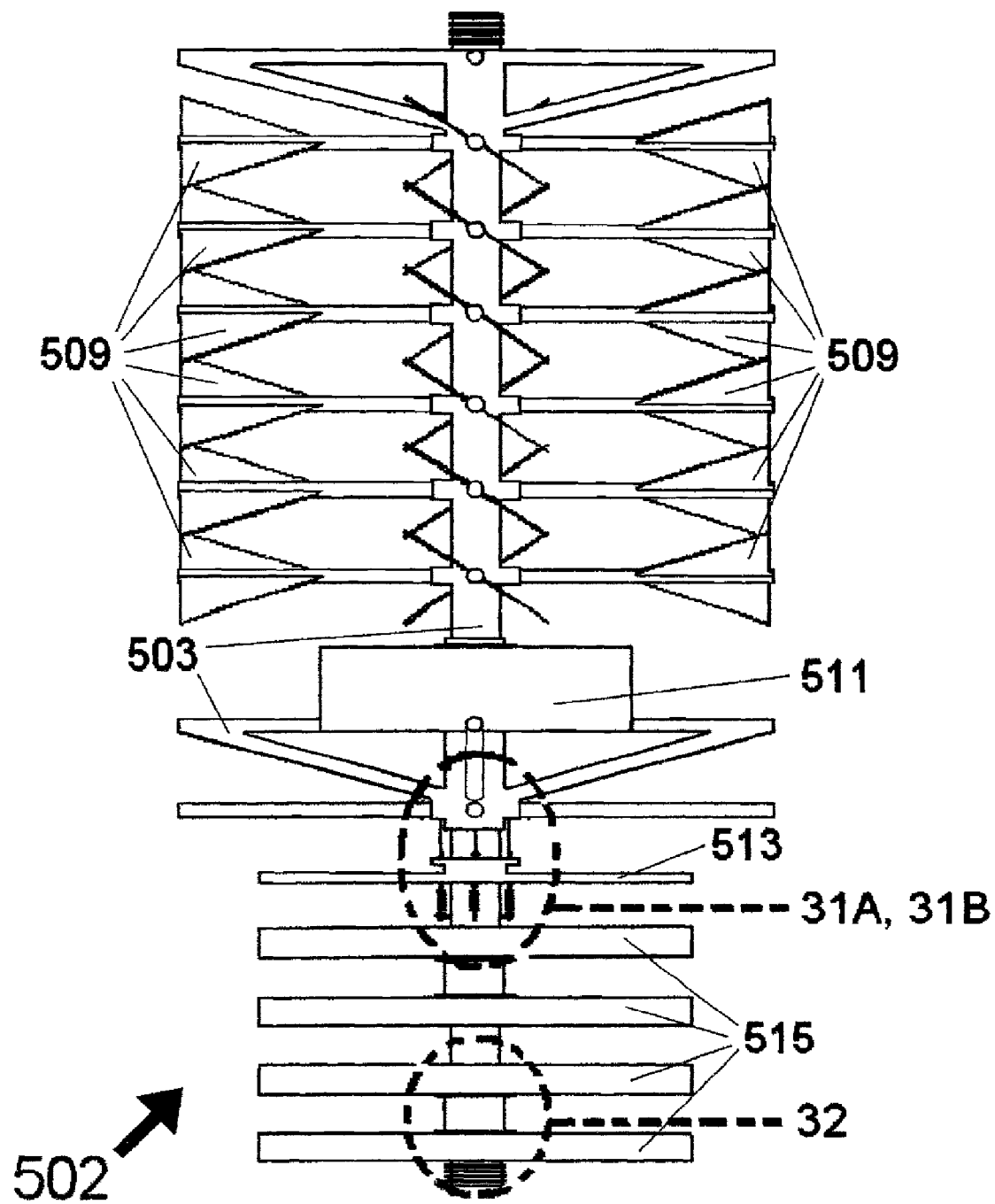

FIG. 30 shows a front side orthogonal view of the inner rotor subassembly.

Figure 31A:
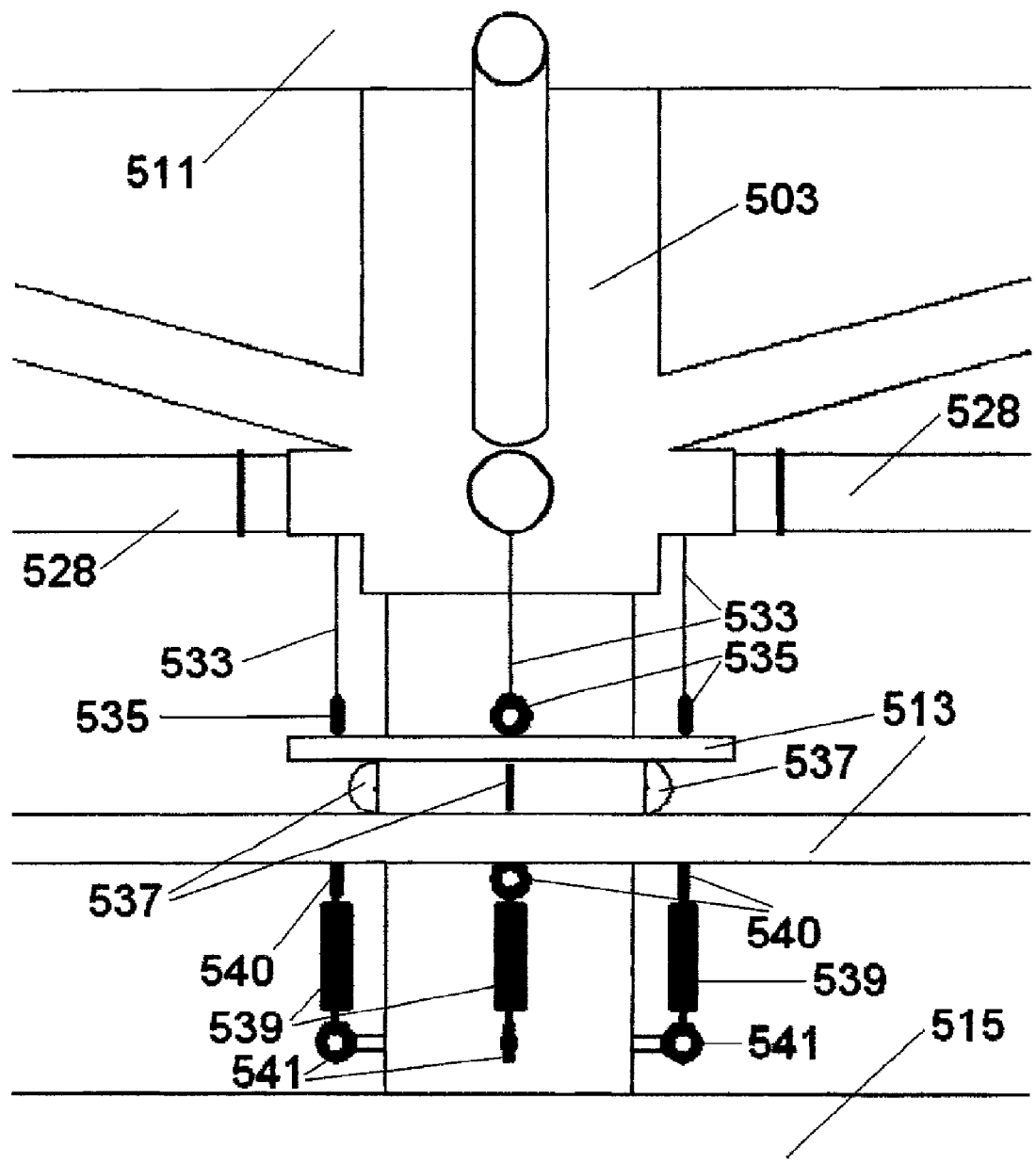

FIG. 31A shows an enlarged view of the permanent magnet generator(PMG) actuator mechanism depicted in the disengaged position.

Figure 31B:
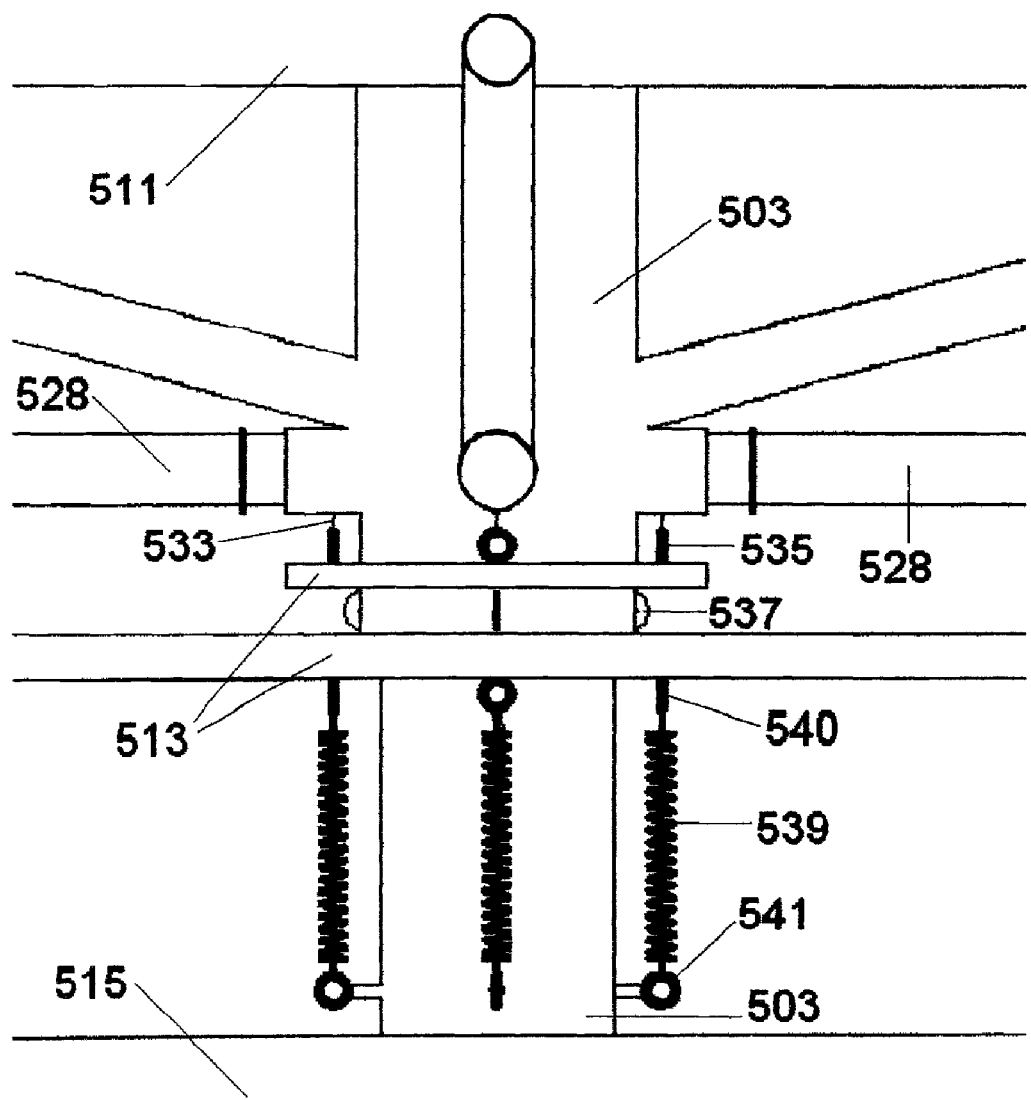

FIG. 31B shows an enlarged view of the permanent magnet generator(PMG) actuator mechanism depicted in the engaged position.

Figure 32:
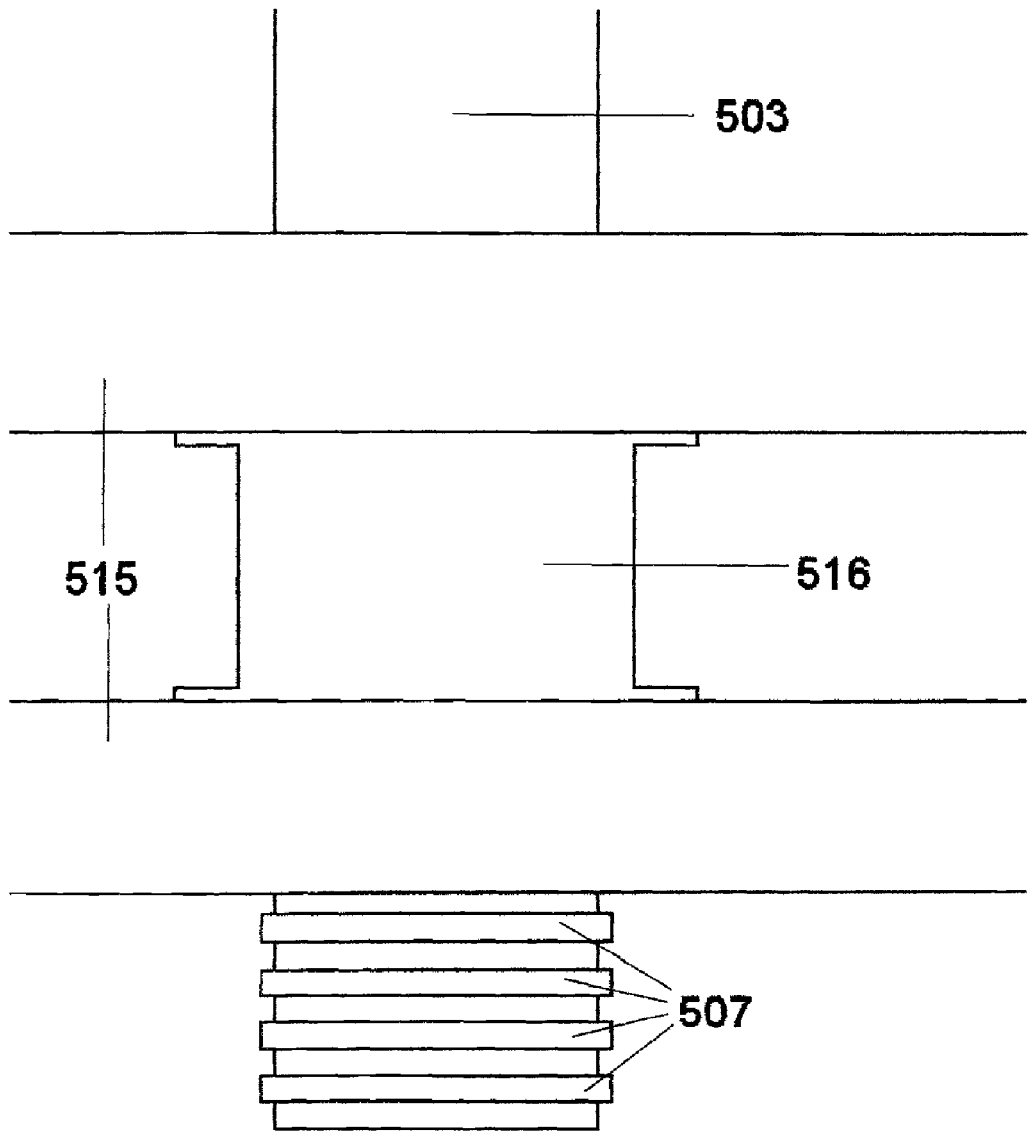

FIG. 32 shows an enlarged view of a typical electromagnetic generator(EMG) rotor mounting hub.

Figure 33:
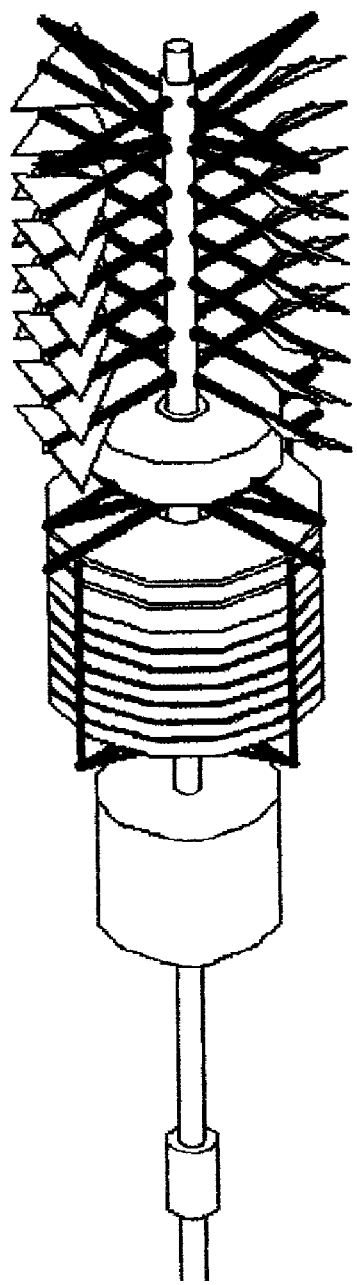

FIG. 33 shows a perspective view of the inner rotor subassembly and the static assembly mounted together.

Figure 34A:
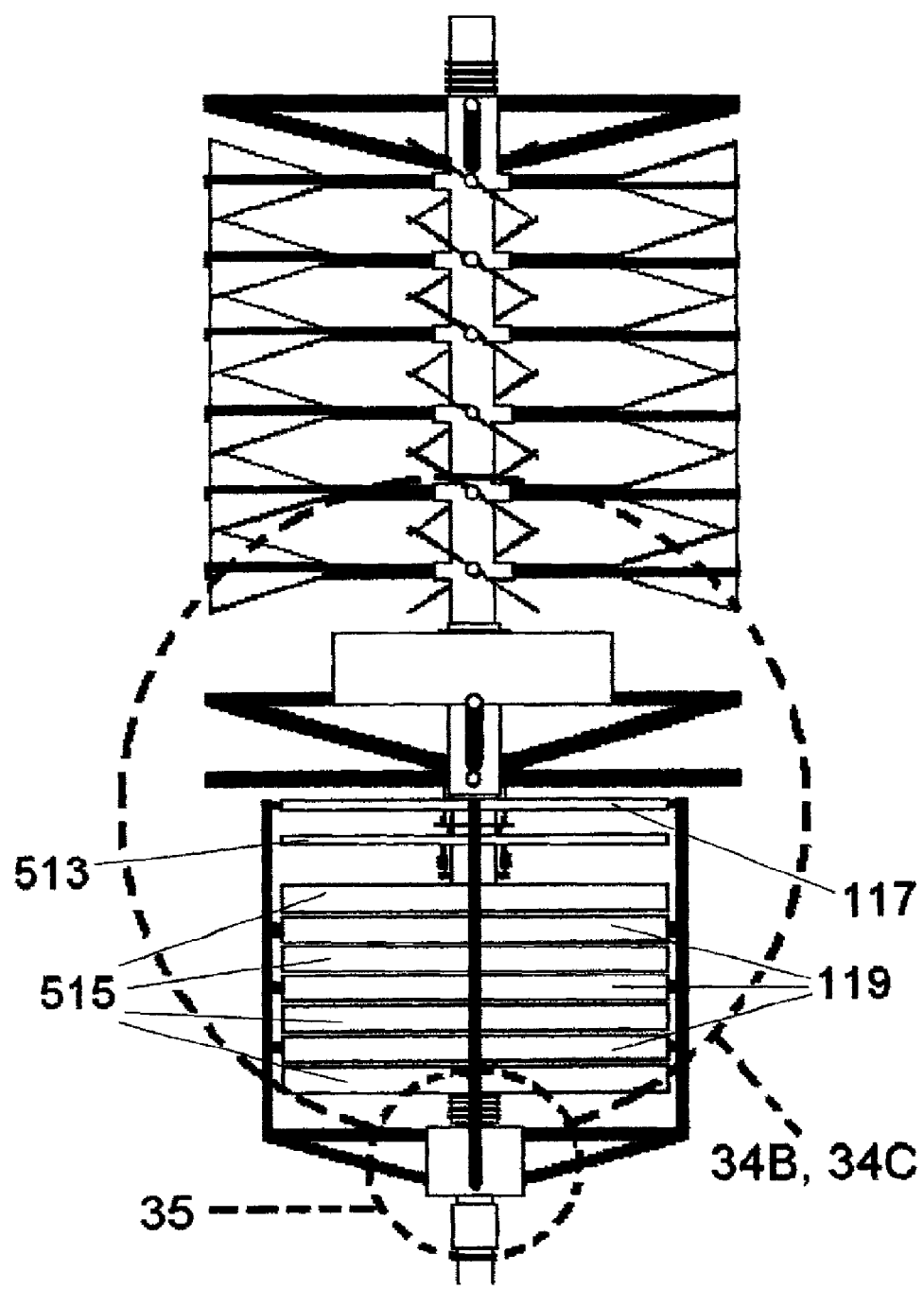

FIG. 34A shows a partial front side orthogonal view of the inner rotor subassembly and the static assembly mounted together.

Figure 34B:
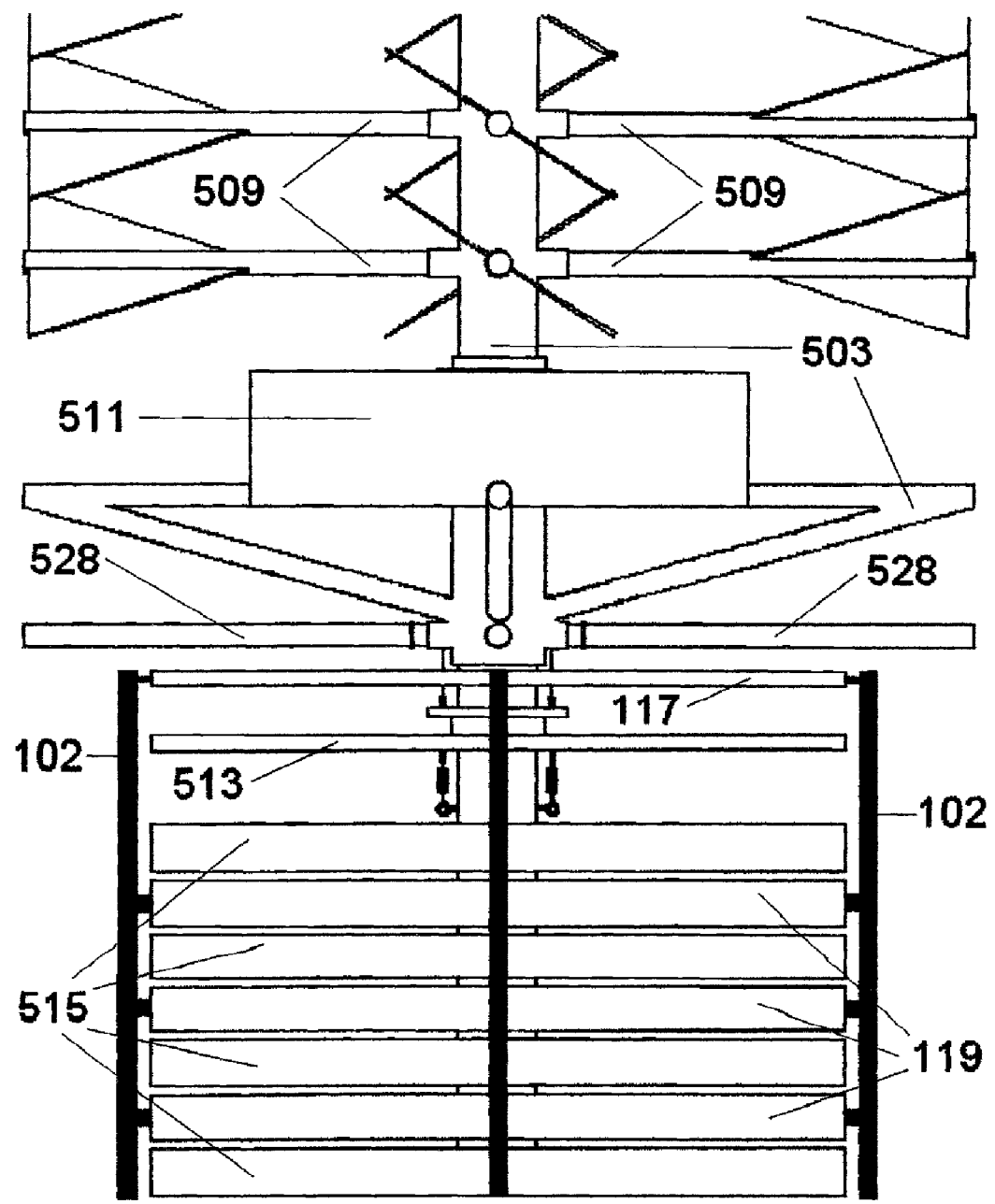

FIG. 34B shows a partial front side orthogonal view of the inner rotor subassembly and the static assembly mounted together depicted with the PMG actuator mechanism in the disengaged position.

Figure 34C:
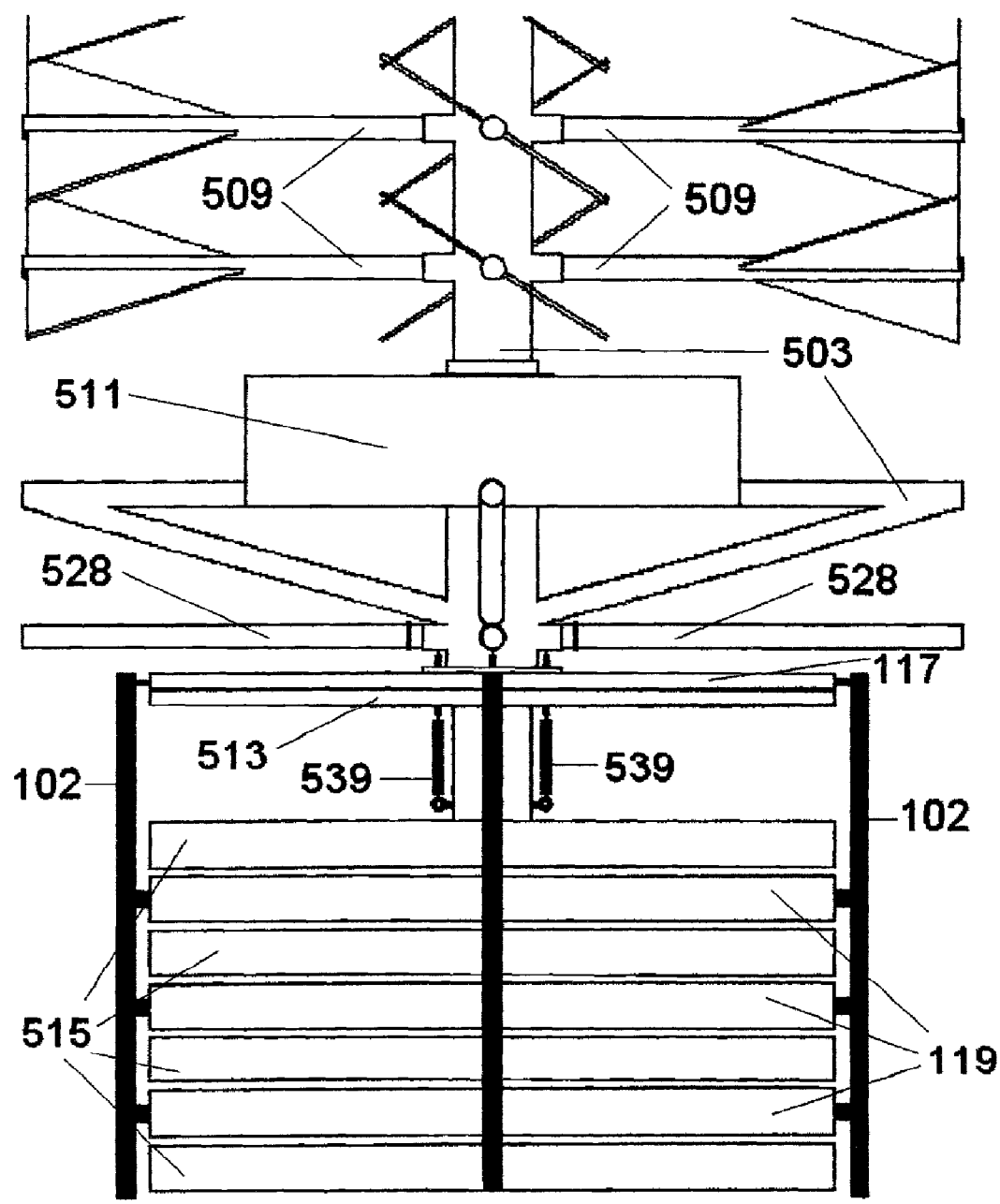

FIG. 34C shows a partial front side orthogonal view of the inner rotor subassembly and the static assembly mounted together depicted with the PMG actuator mechanism in the engaged position.

Figure 35:
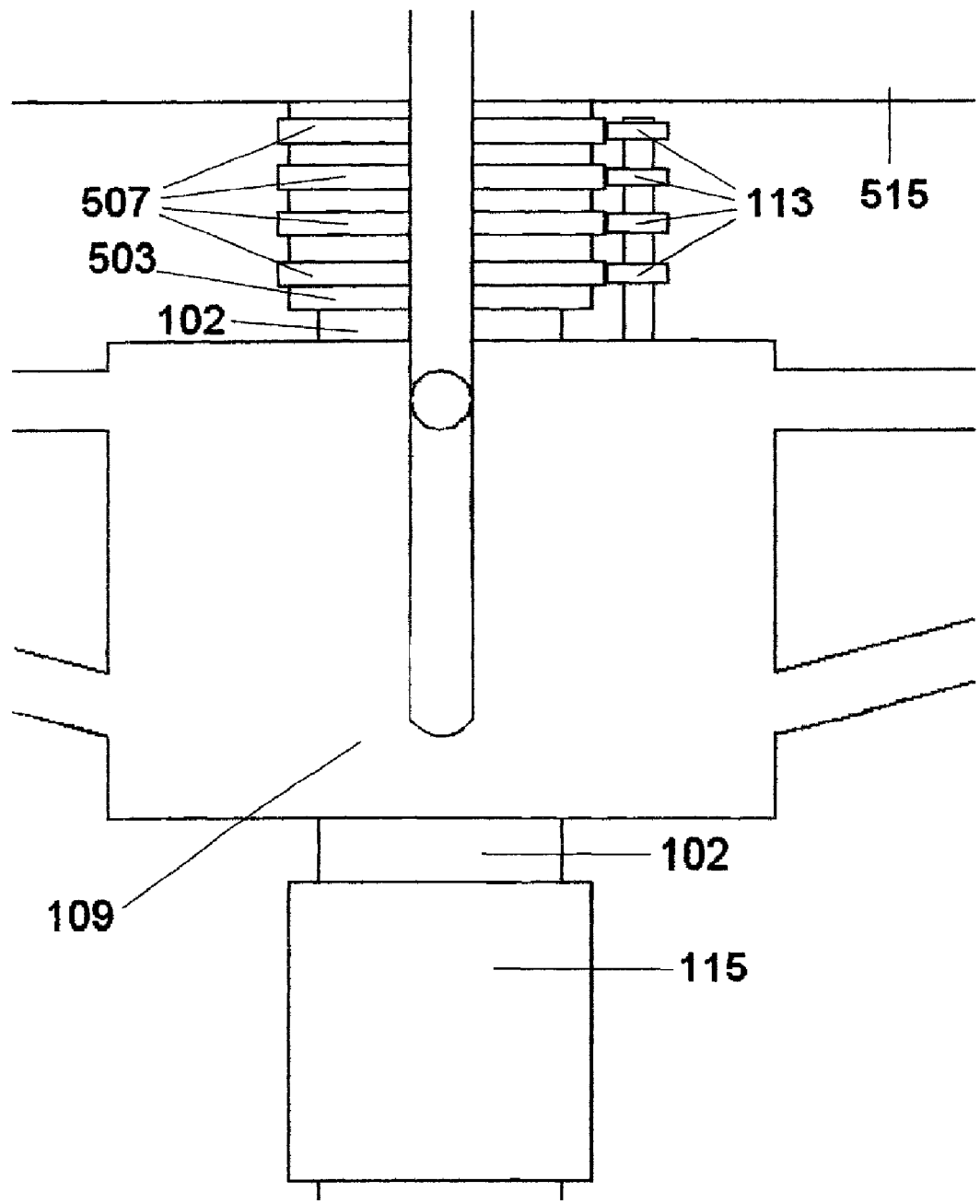

FIG. 35 shows an enlarged view of the power transfer/external communication sliprings and pickups.

Figure 36:
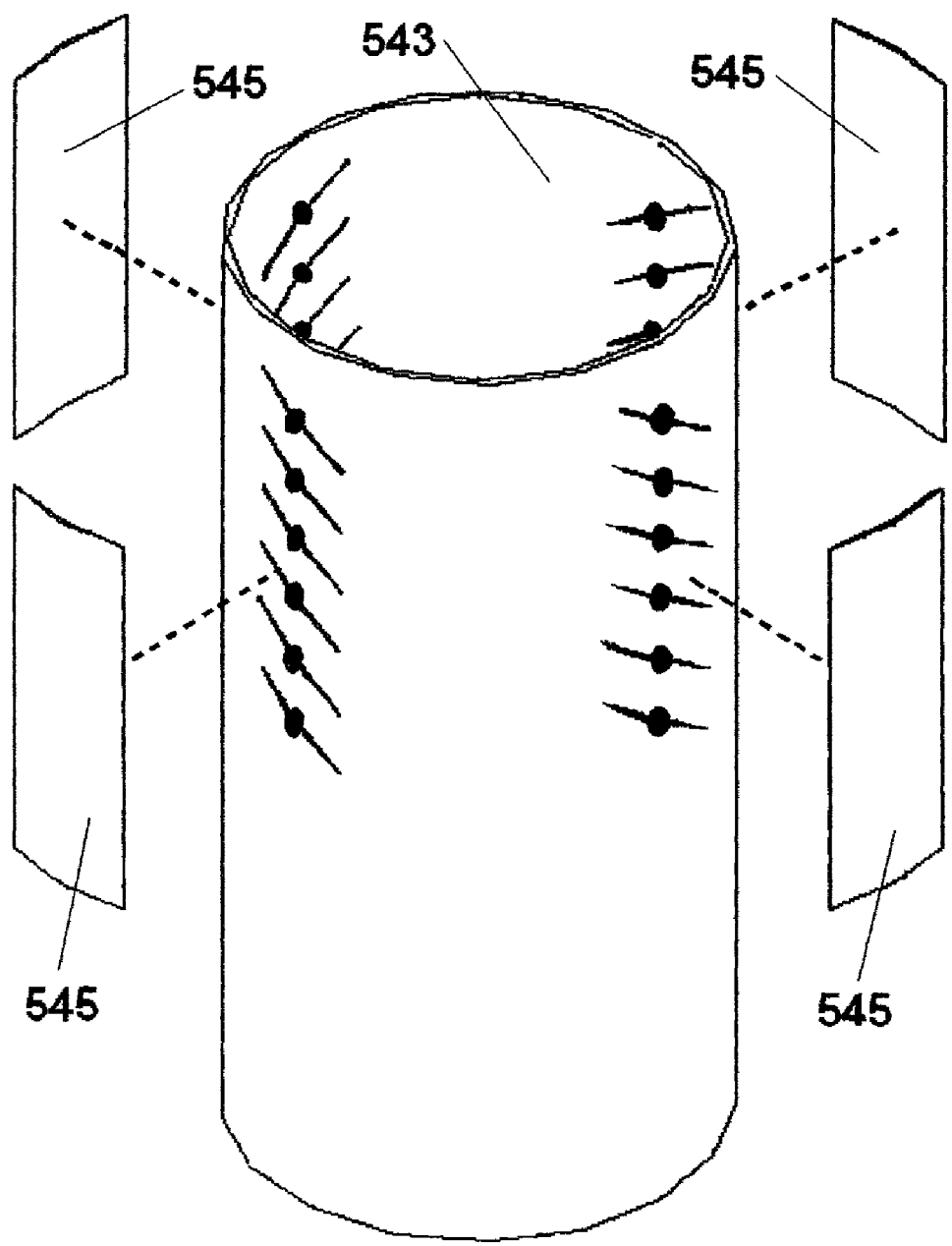

FIG. 36 shows a perspective view of the outer rotor structure depicted with mass shifter retention plates prior to installation.

Figure 37:
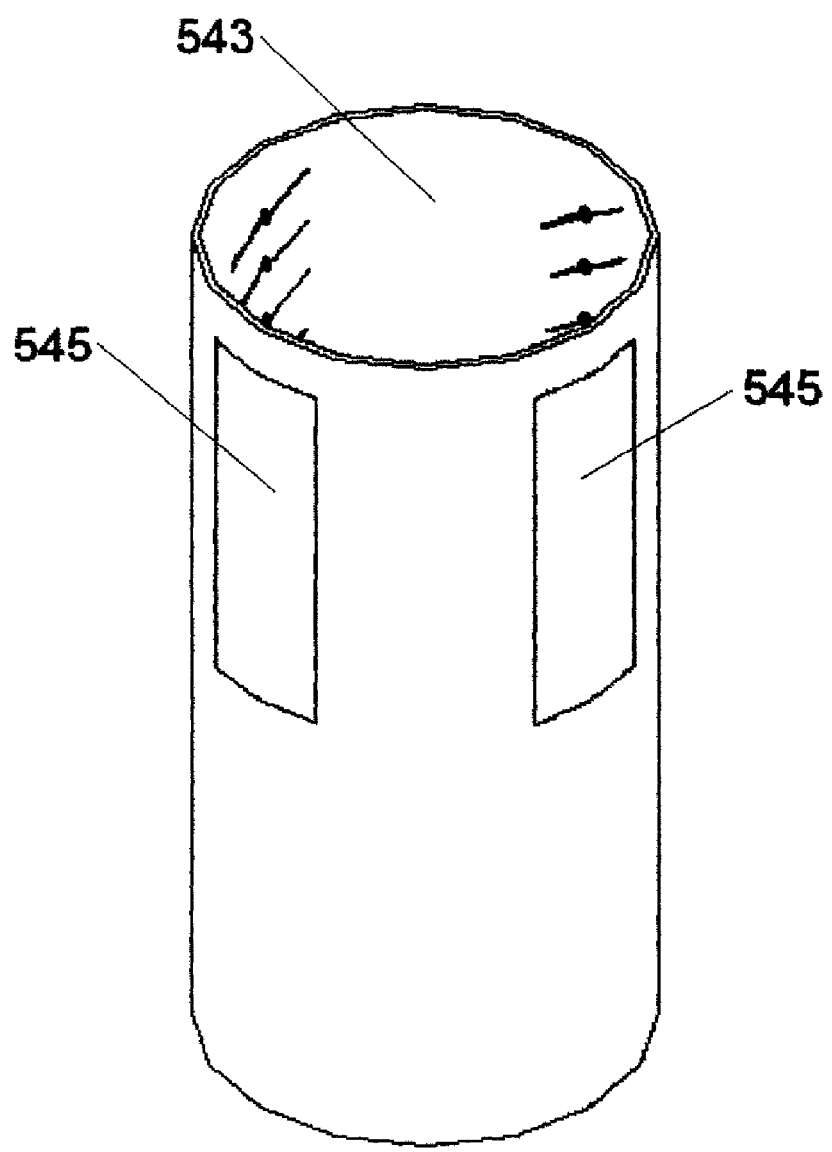

FIG. 37 shows a perspective view of the outer rotor structure depicted with mass shifter retention plates installed.

Figure 38:
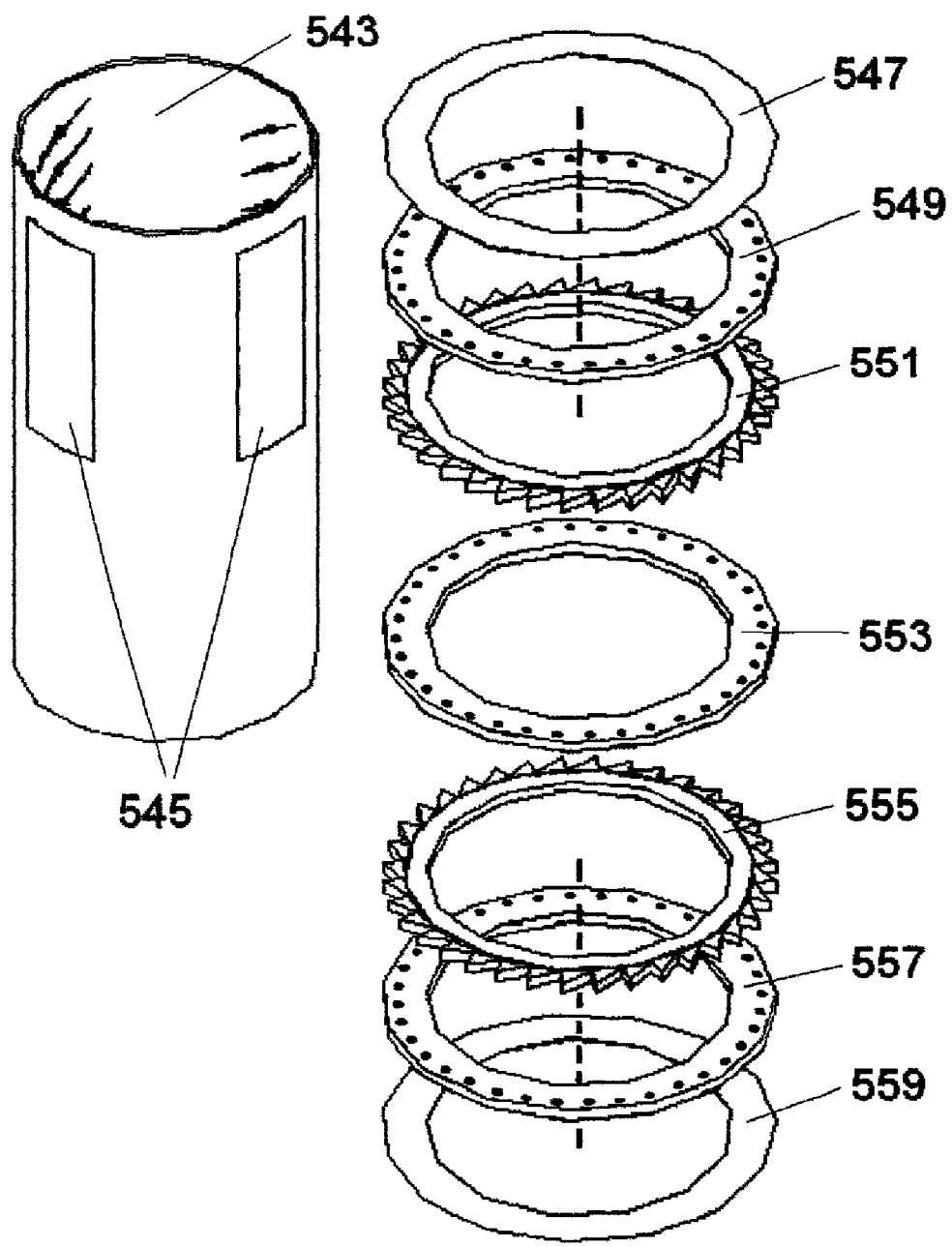

FIG. 38 shows a perspective view of the outer rotor structure and sail support structural components.

Figure 39:
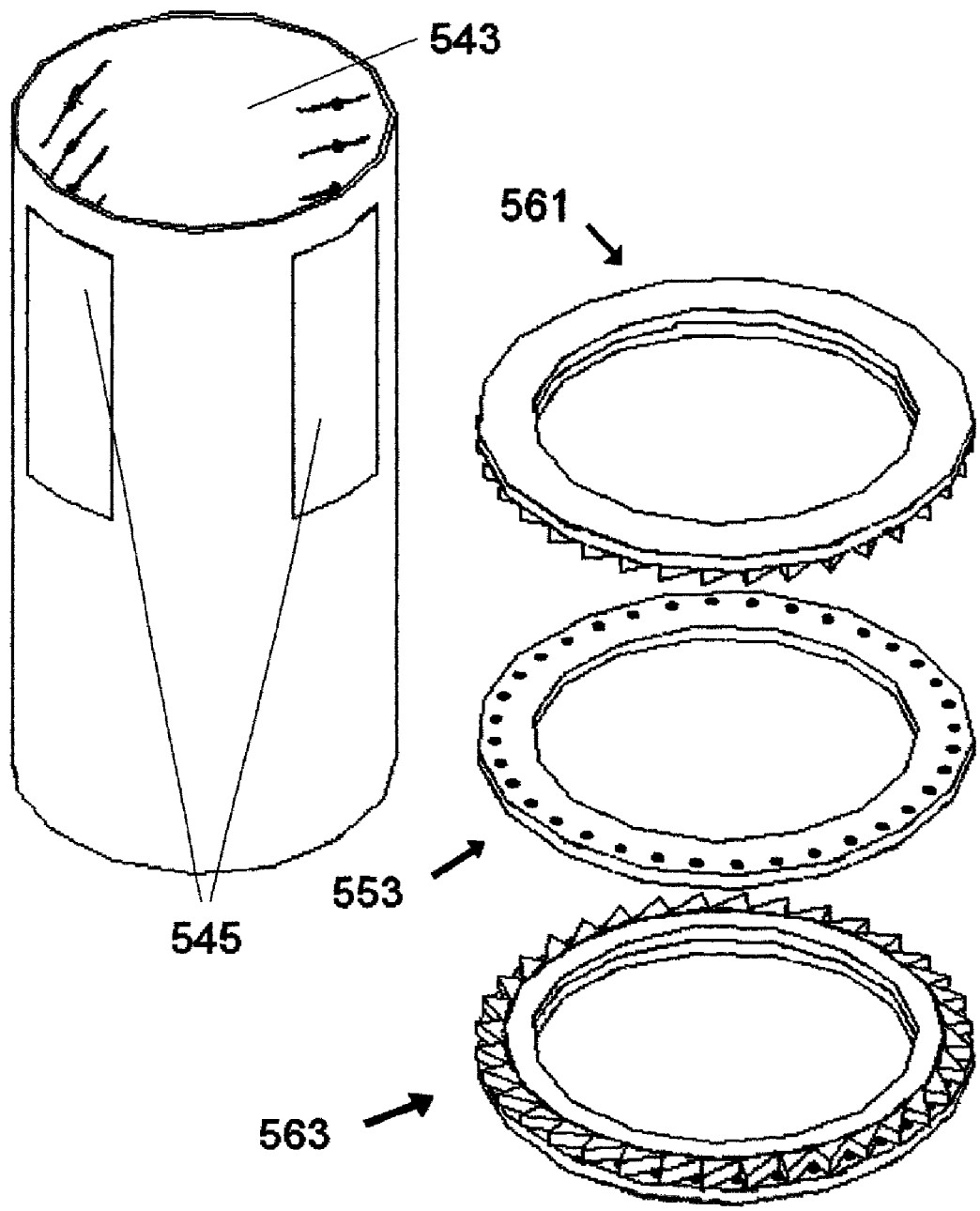

FIG. 39 shows a perspective view of the outer rotor structure and assembled sail support subassemblies.

Figure 40:
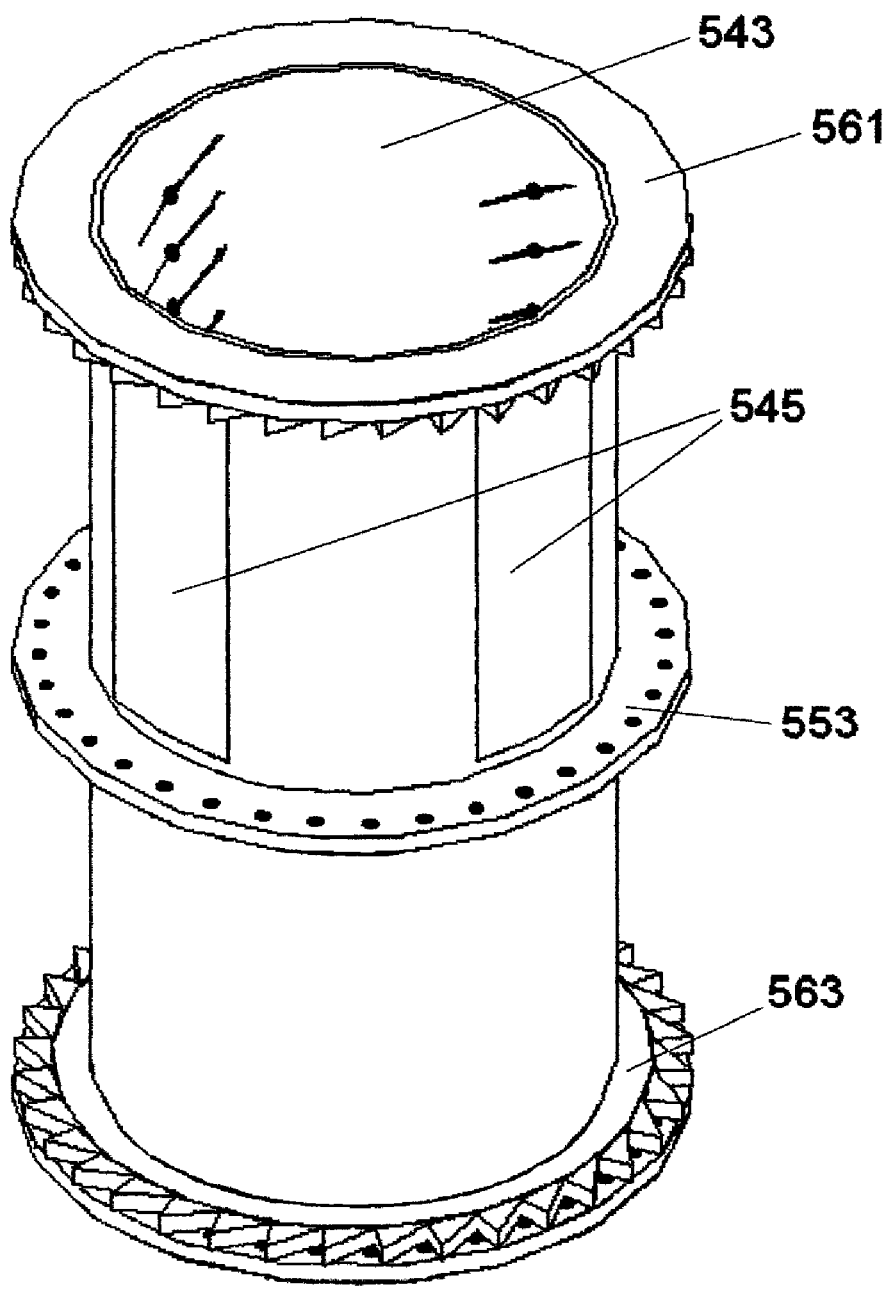

FIG. 40 shows a perspective view of the outer rotor structure with sail support subassemblies/structure installed.

Figure 41:
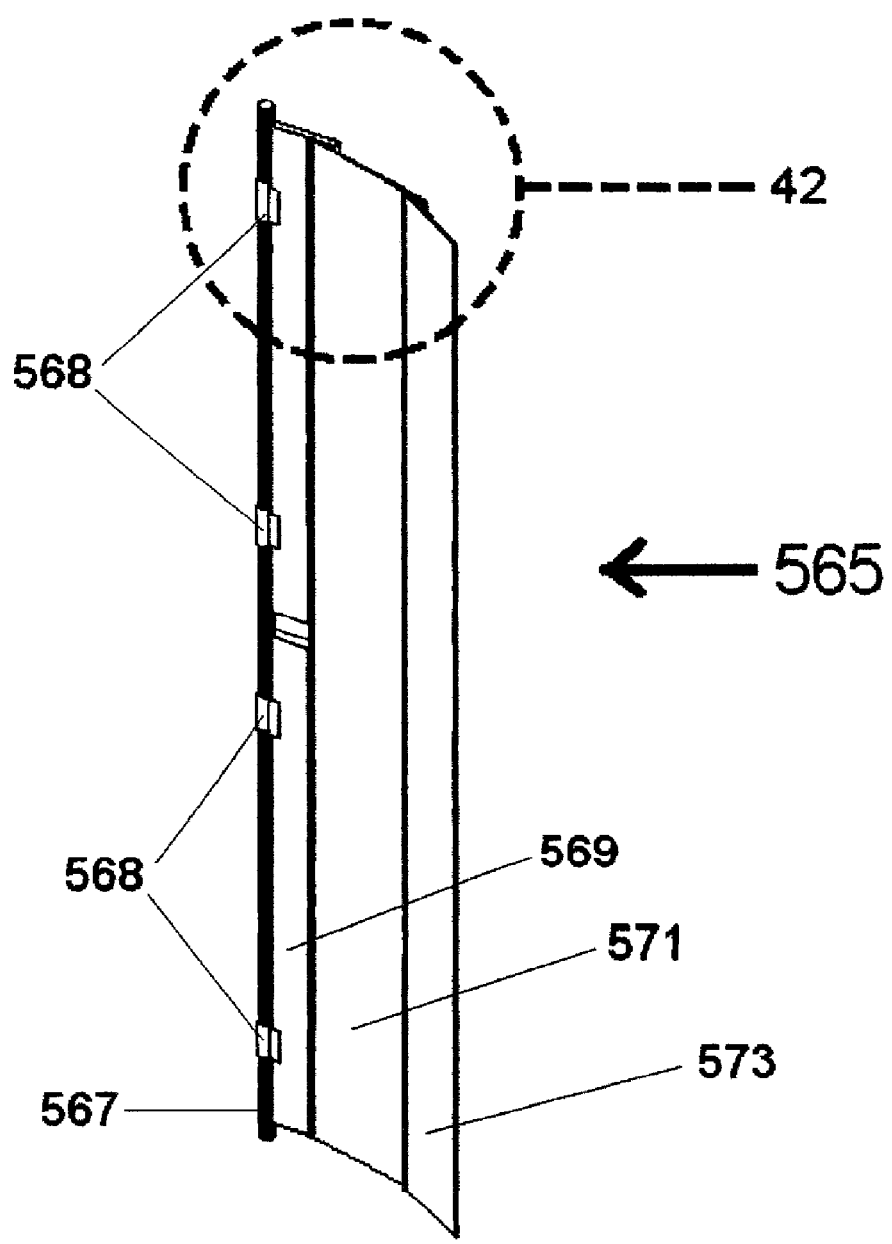

FIG. 41 shows a perspective view of a typical sail subassembly.

Figure 42:
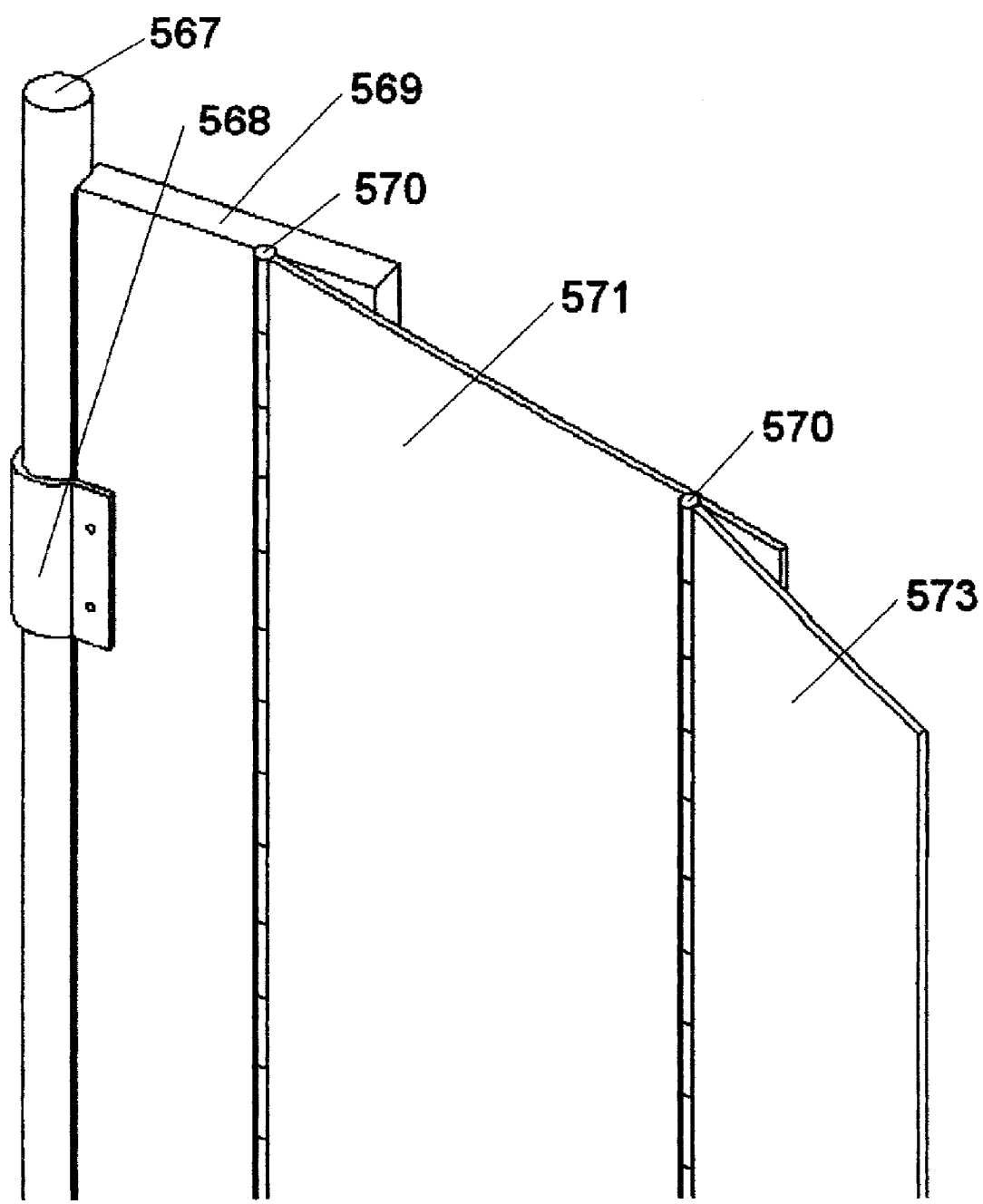

FIG. 42 shows an enlarged view of a typical sail subassembly components.

Figure 43:
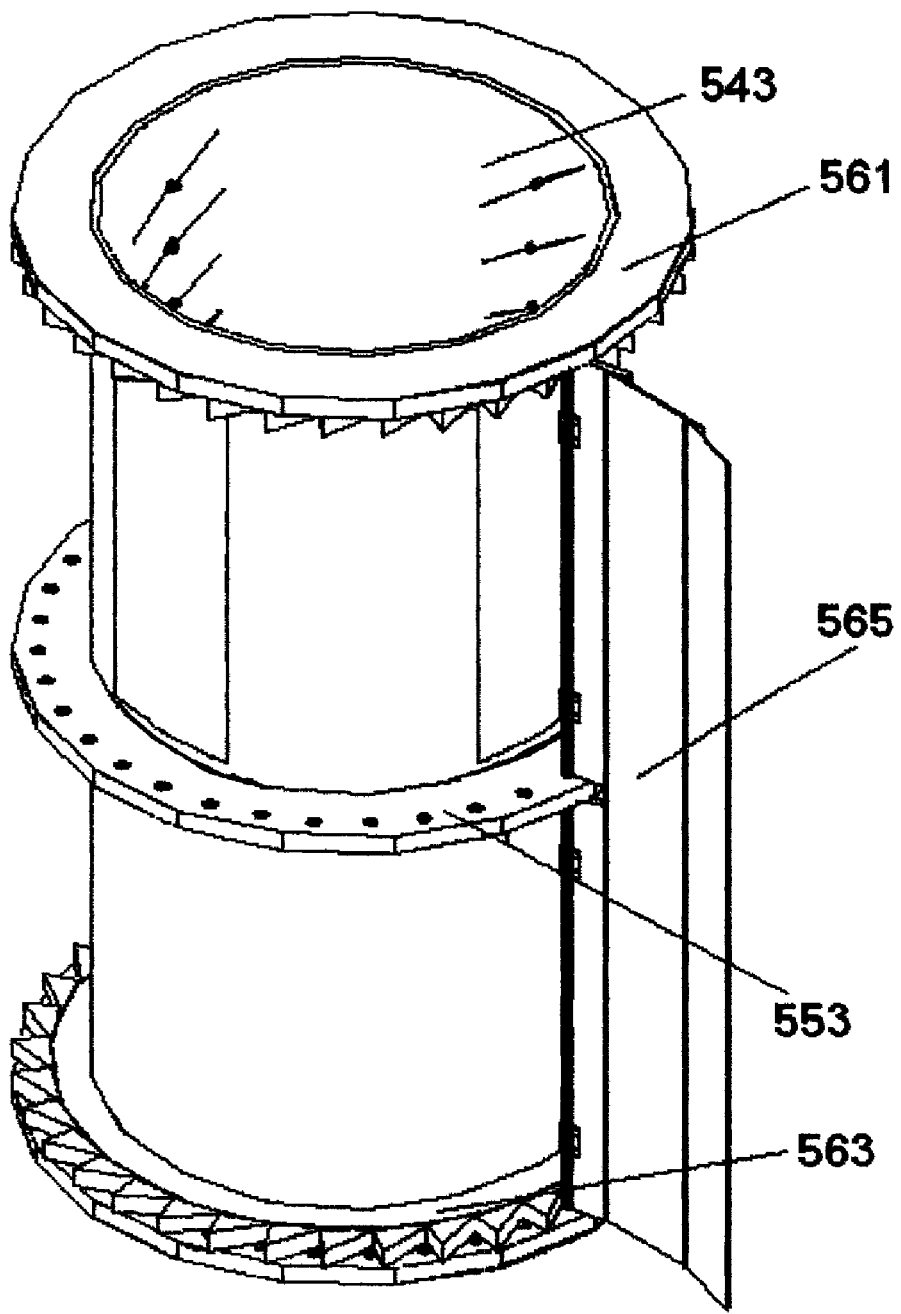

FIG. 43 shows a perspective view of the outer rotor structure with sail support subassemblies/structure and a typical sail subassembly installed.

Figure 44:
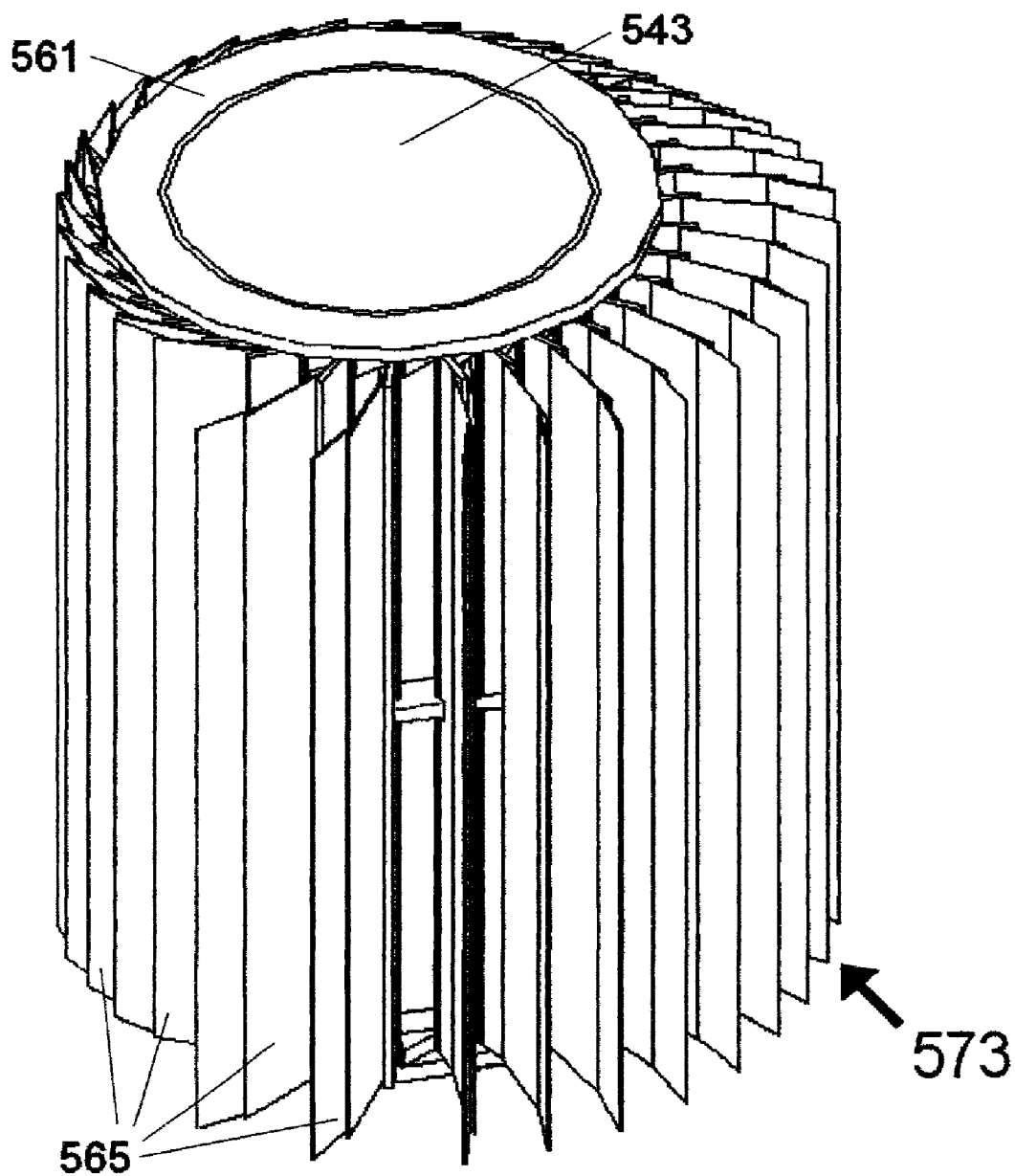

FIG. 44 shows a perspective view of the outer rotor subassembly.

Figure 45:
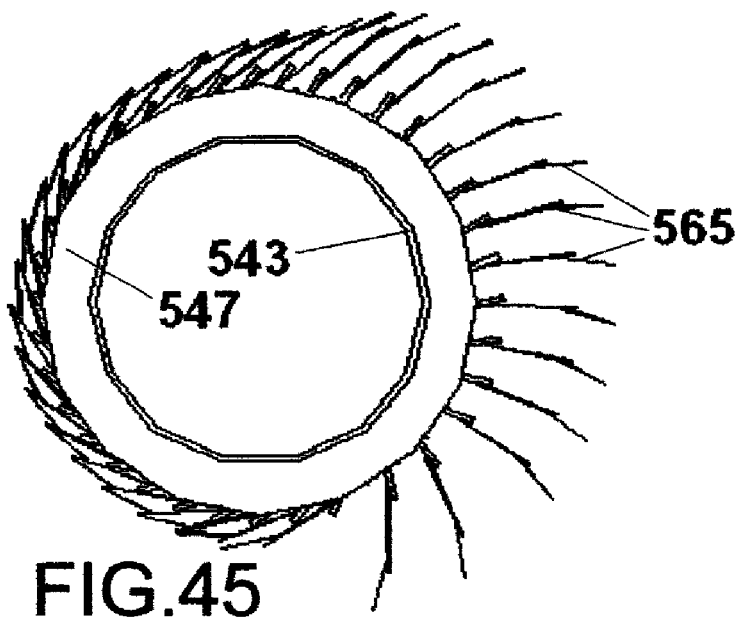
Figure 46:
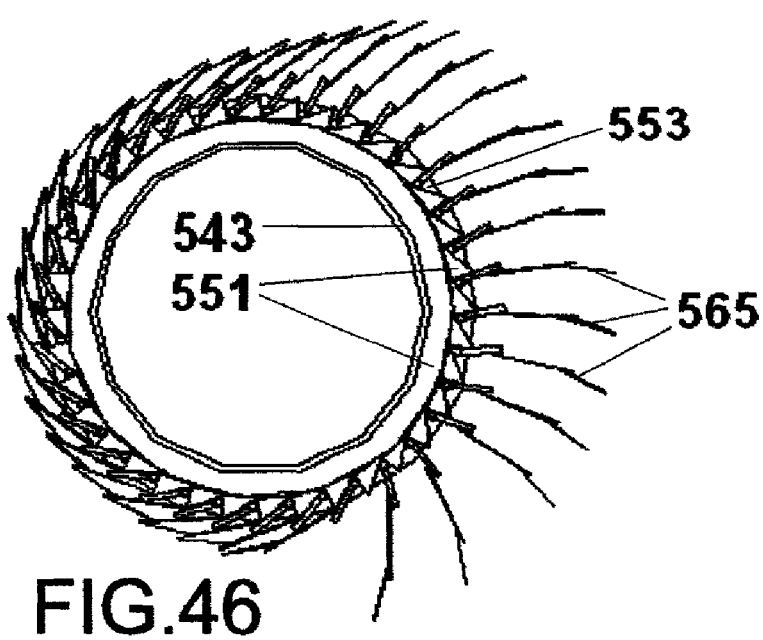

FIGS. 45 and 46 show a top side orthogonal view of outer rotor subassembly depicted with and without top sail retention structures respectively. Typical sail positions shown are those when subjected to the onset of wind in the direction indicated.

Figure 47:
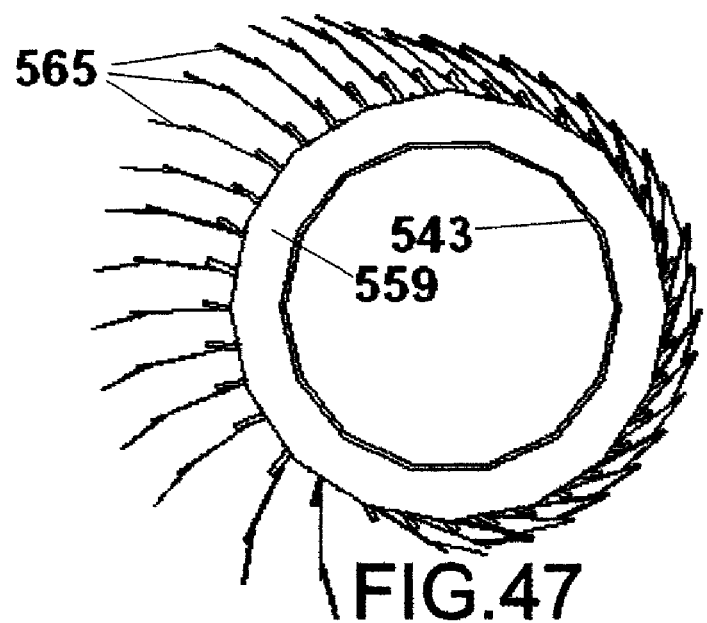
Figure 48:
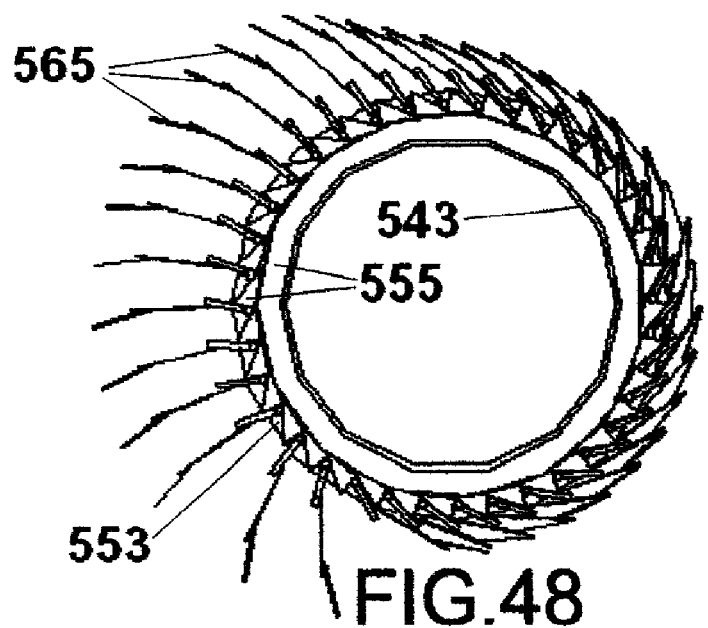

FIGS. 47 and 48 show a bottom side orthogonal view of the outer rotor subassembly depicted with and without bottom sail retention structures respectively. Typical sail positions shown are those when subjected to the onset of wind in the direction indicated.

Figure 49A:
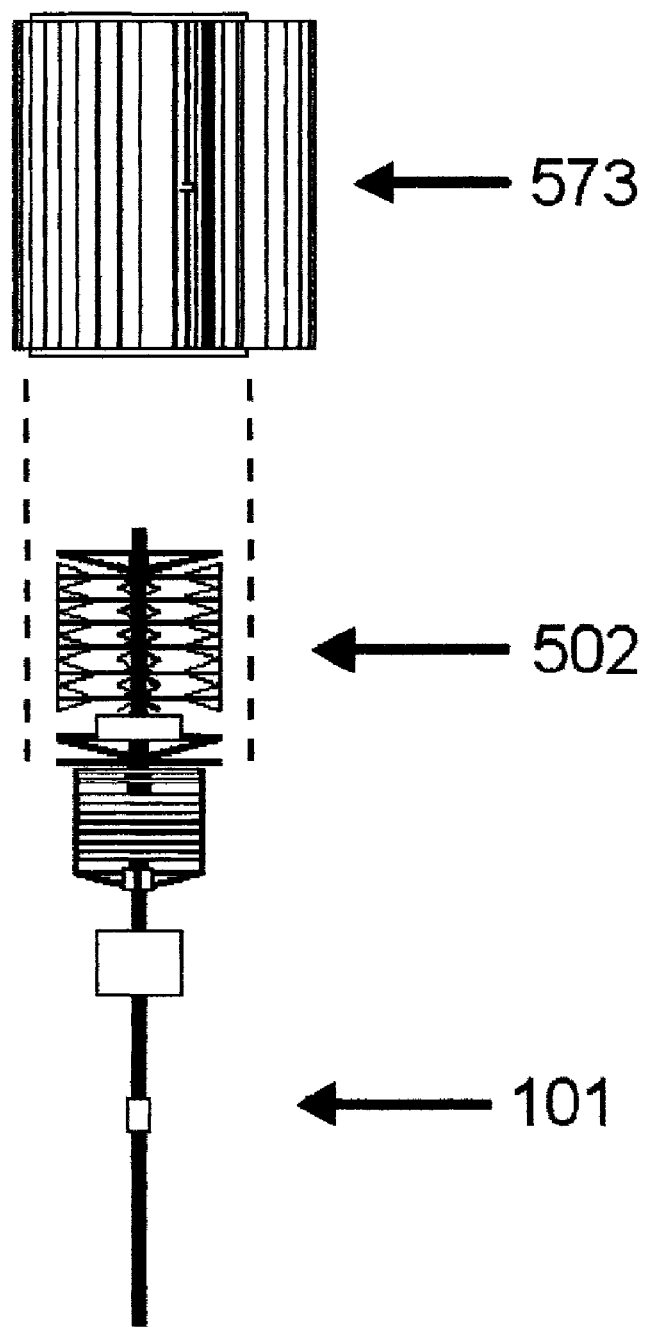

FIG. 49A shows a front side orthogonal view depicting the mounting of the outer rotor subassembly to the inner rotor subassembly.

Figure 49B:
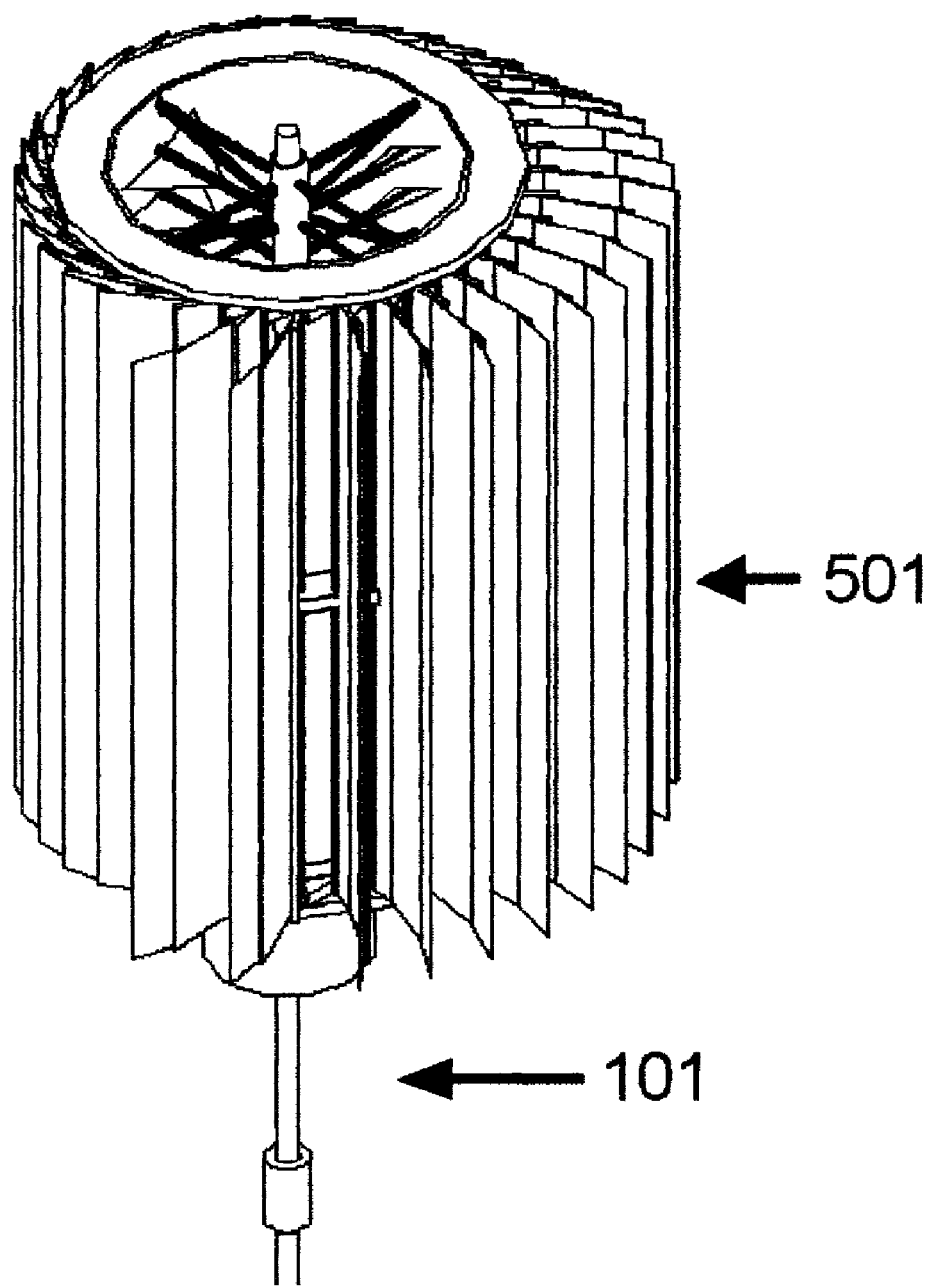

FIG. 49B shows a perspective view of the rotors assembly and the static assembly mounted together.

Figure 50A:
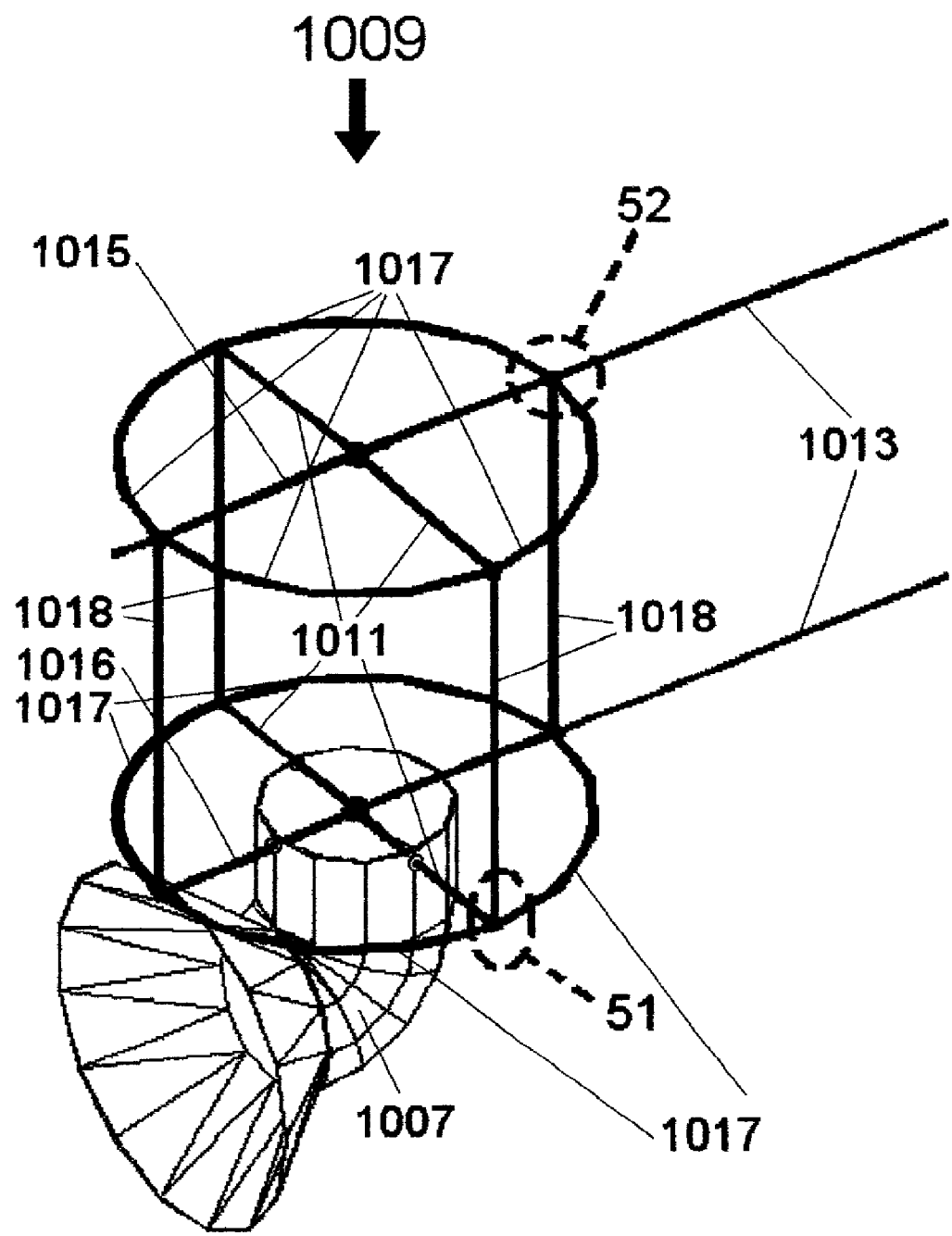

FIG. 50A shows a perspective view of the windshield support structure (WSS).

Figure 50B:
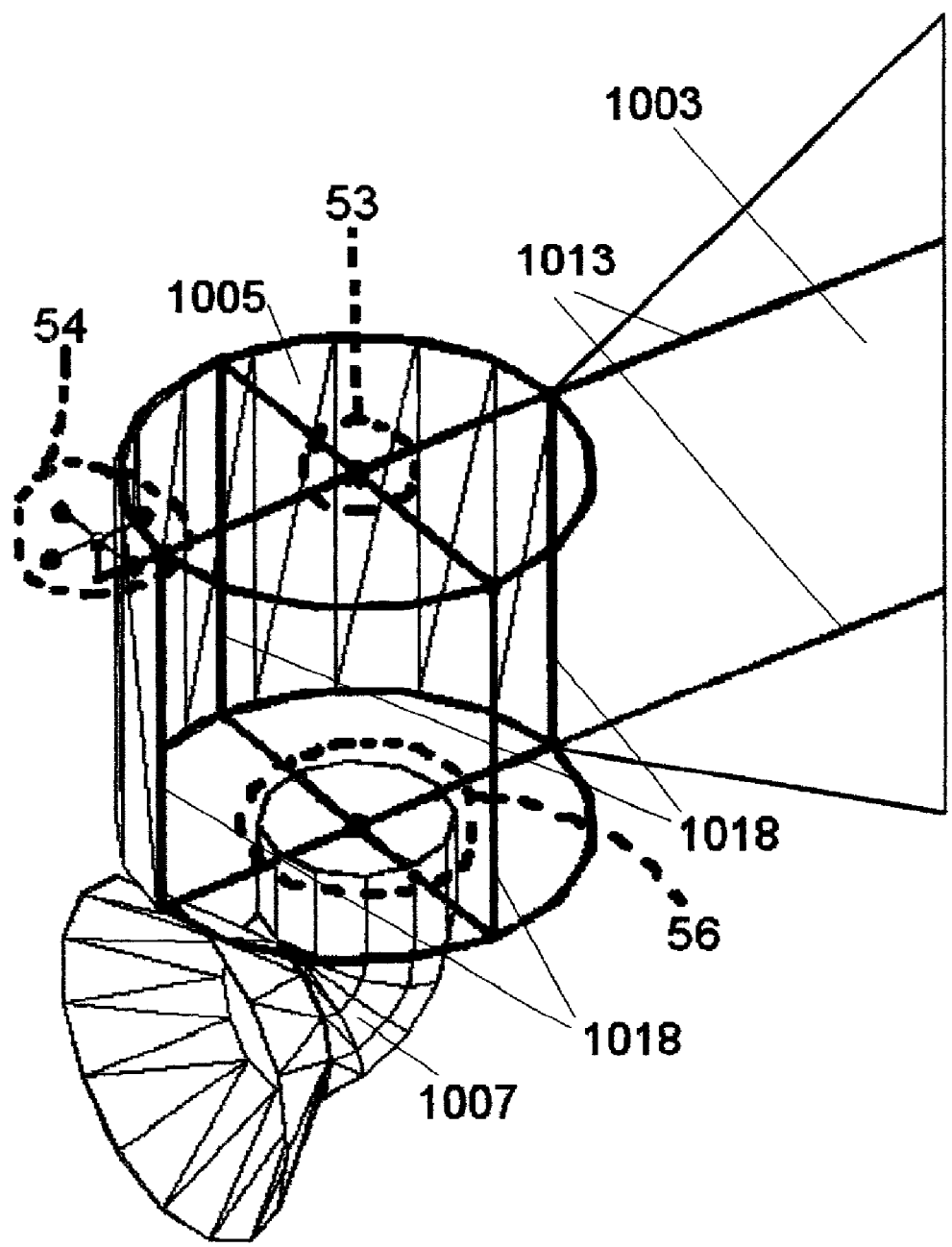

FIG. 50B shows a perspective view of the directional windshield assembly.

Figure 51:
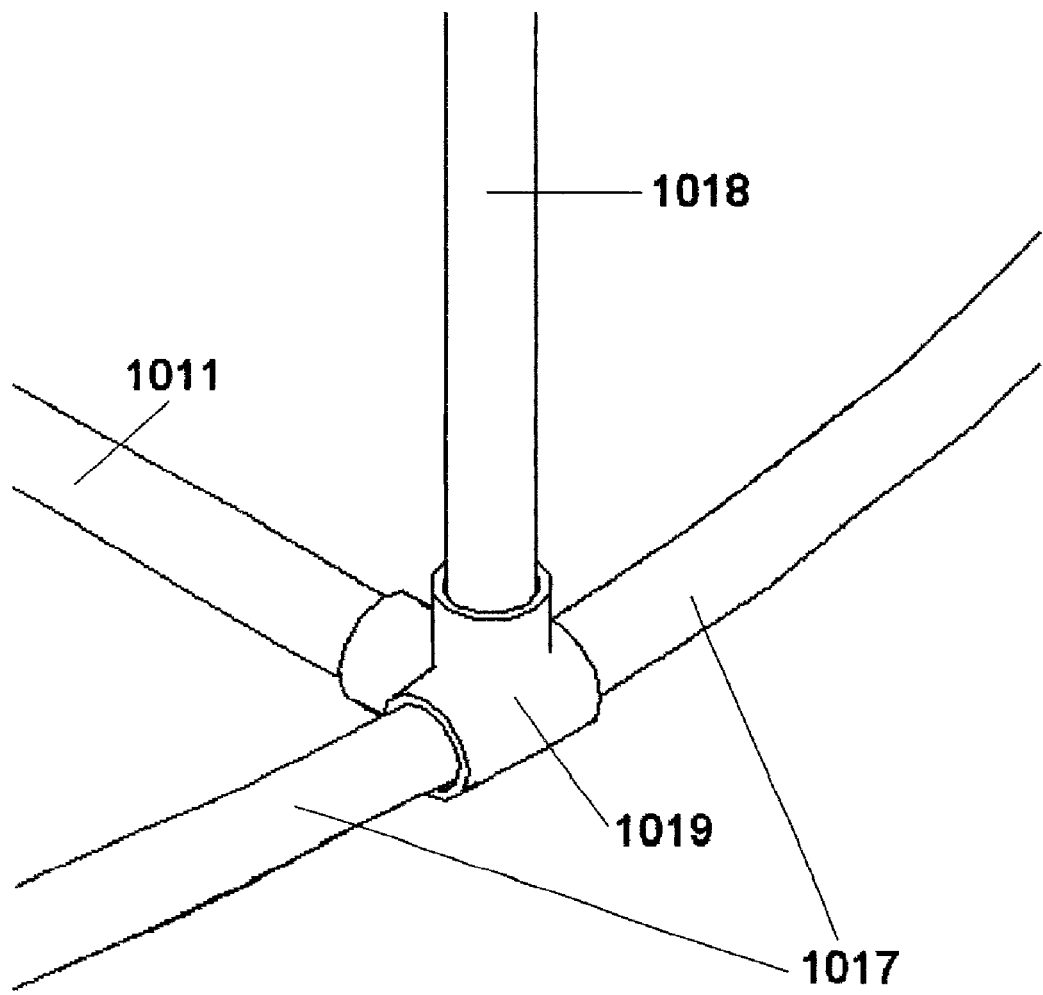

FIG. 51 shows an enlarged view of a typical type-A junction of structural components.

Figure 52:
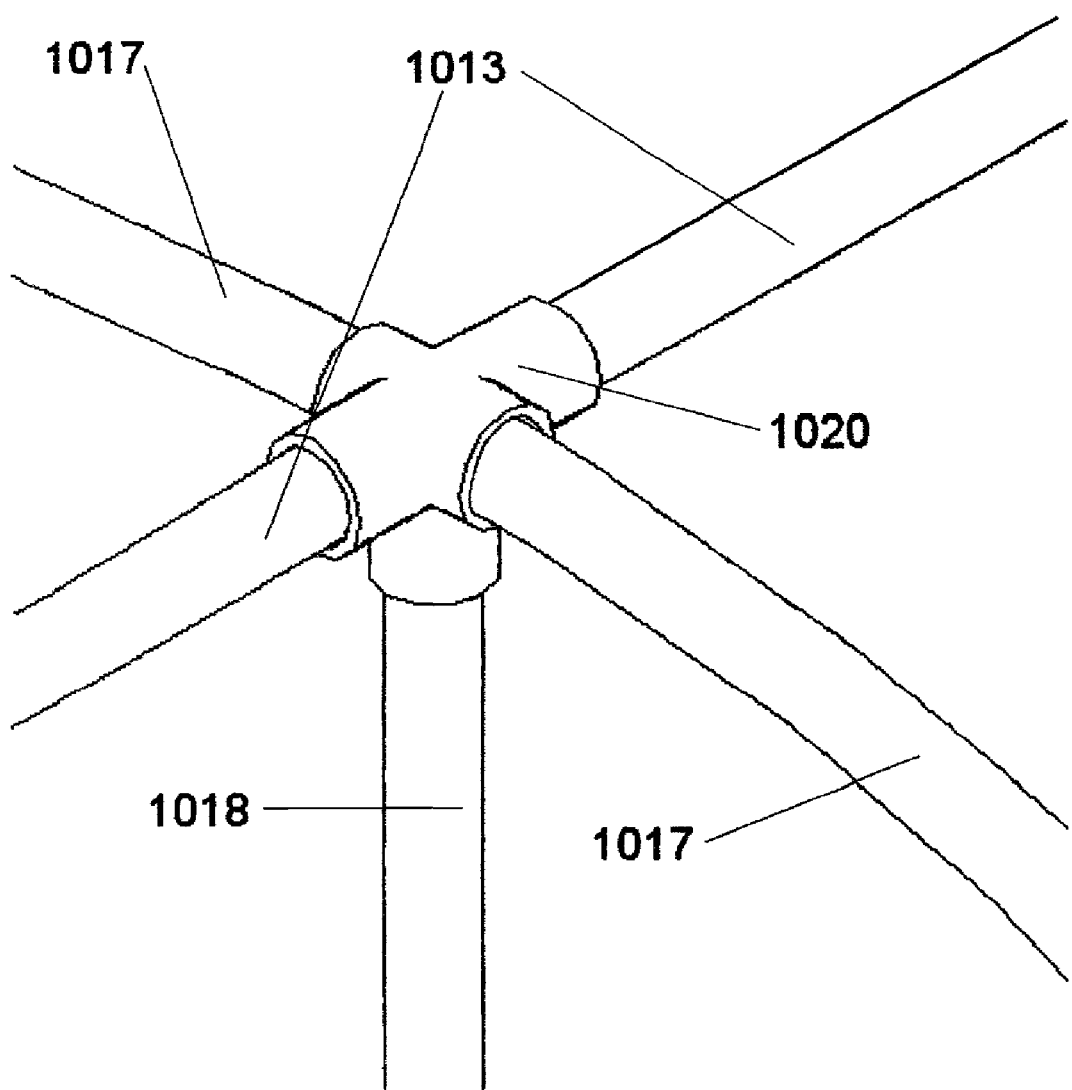

FIG. 52 shows an enlarged view of a typical type-B junction of structural components.

Figure 53:
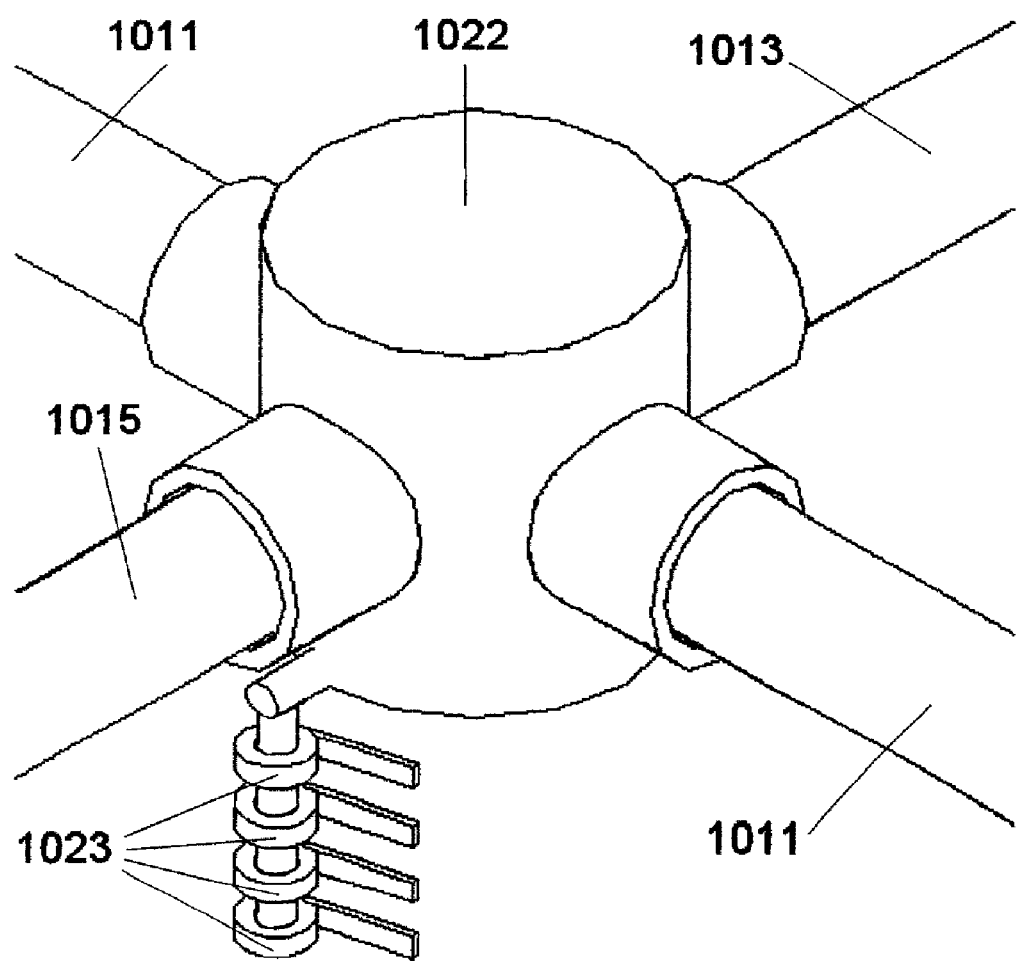

FIG. 53 shows an enlarged view of the top inner hub of the windshield support structure(WSS).

Figure 54:
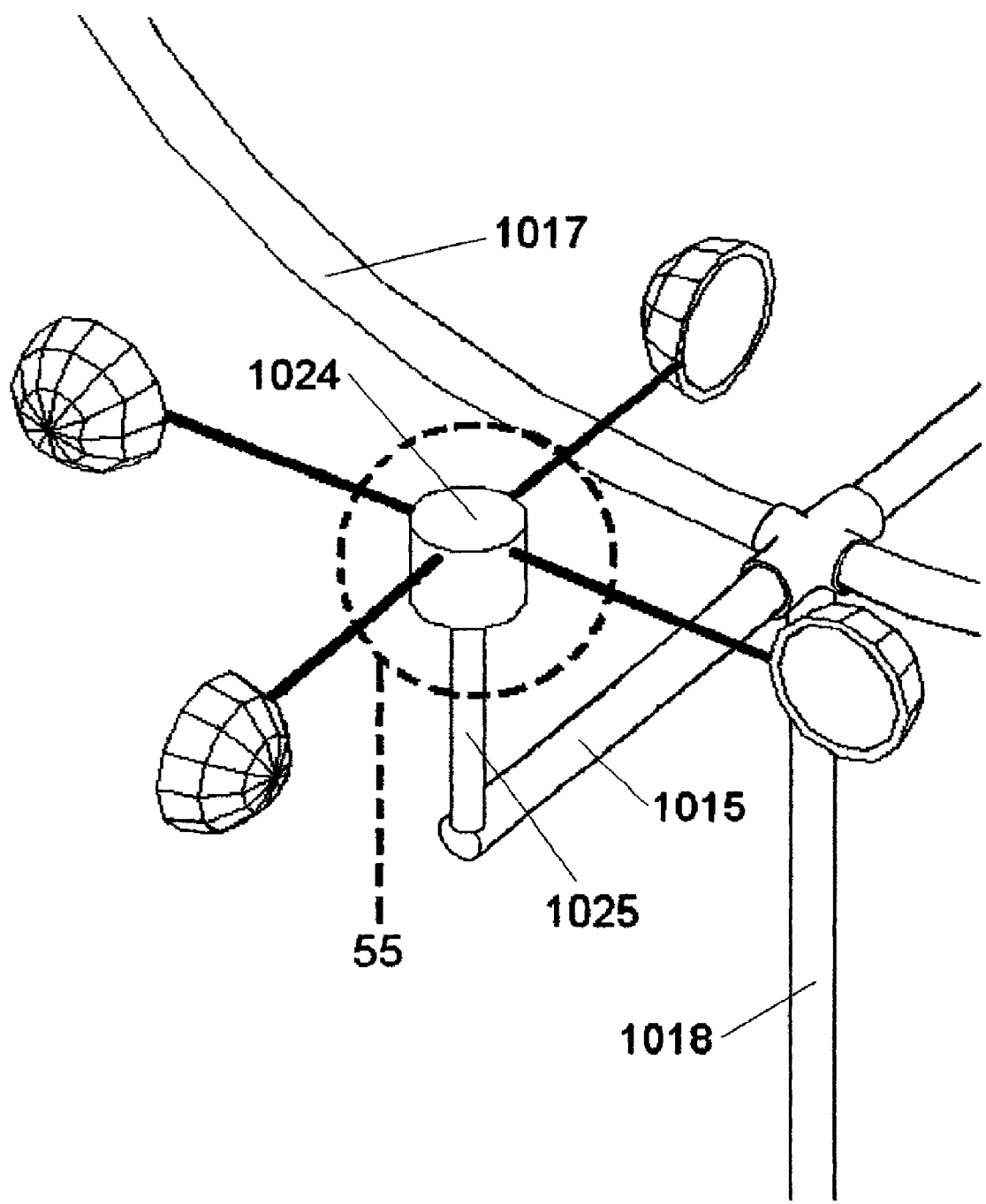

FIG. 54 shows an enlarged view of the anemometer subassembly.

Figure 55:
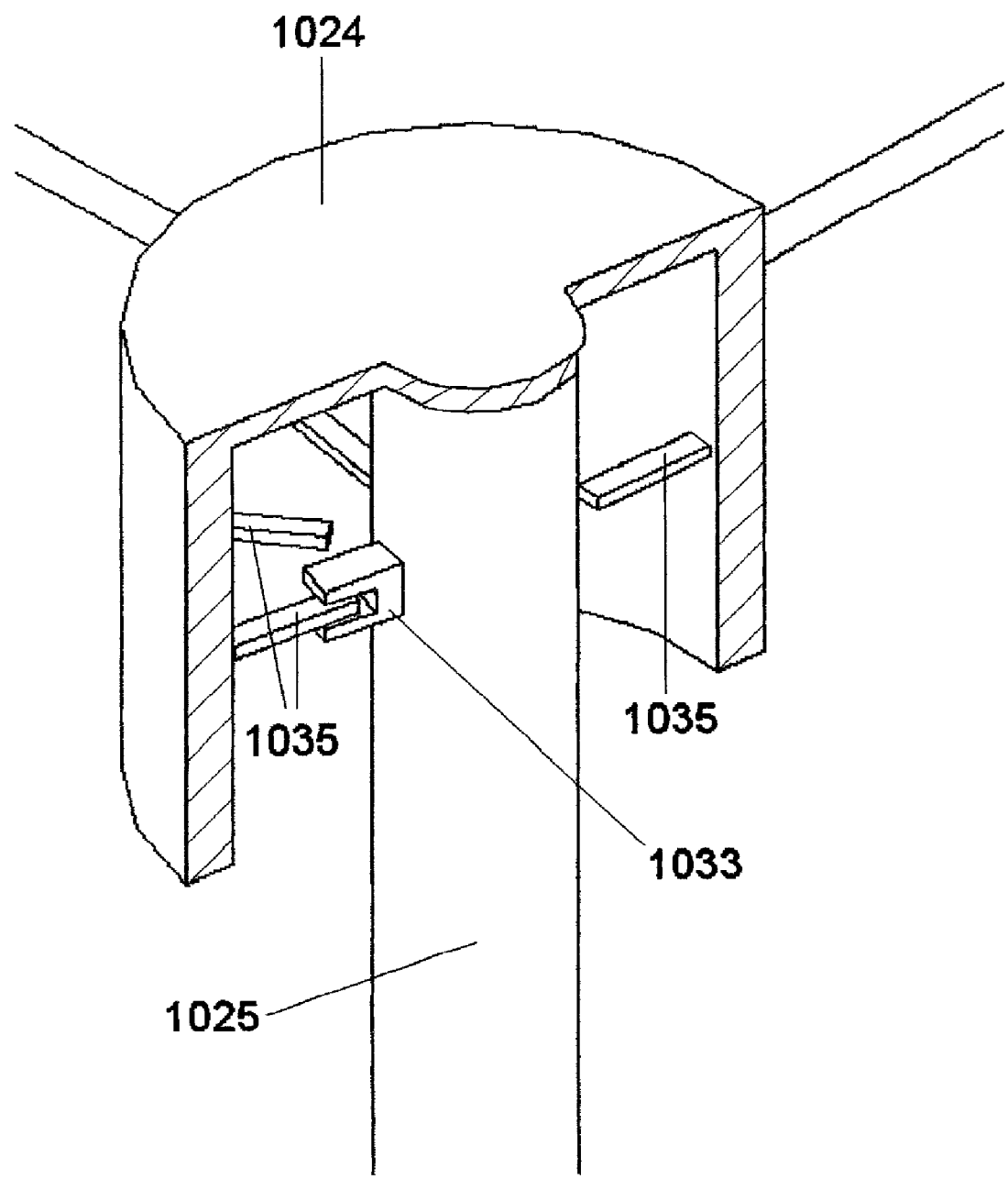

FIG. 55 shows an enlarged partial sectional view of the wind speed sensing mechanism.

Figure 56:
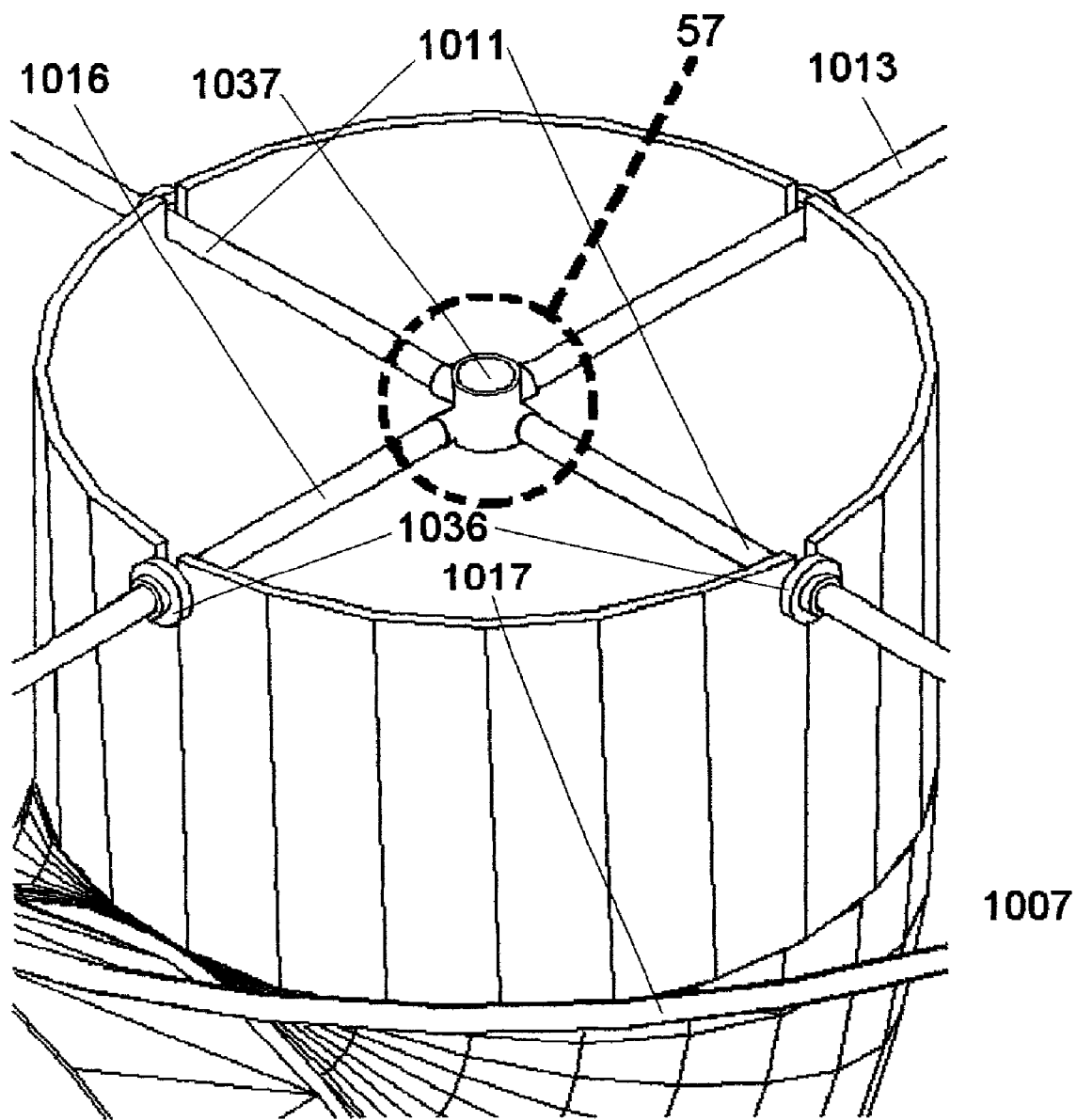

FIG. 56 shows an enlarged view of the top of the intake structure.

Figure 57:
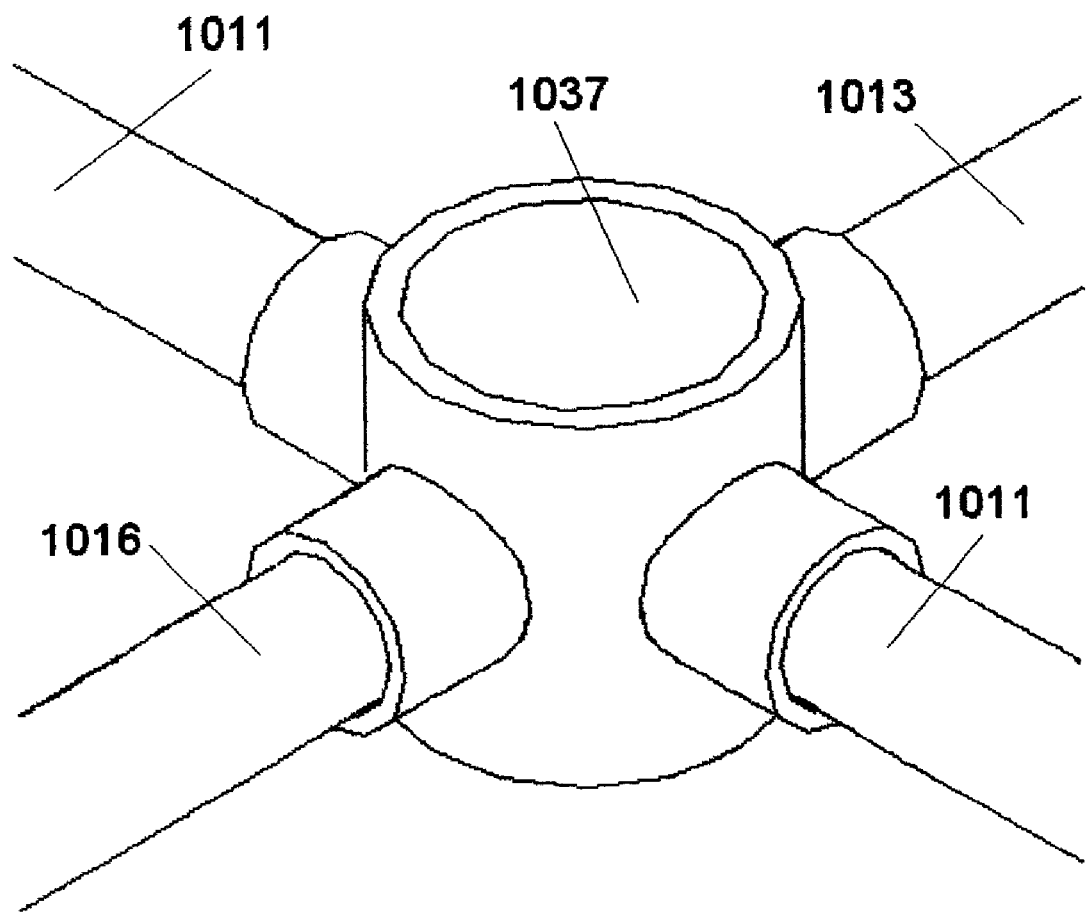

FIG. 57 shows an enlarged view of the bottom inner hub of the windshield support structure(WSS).

Figure 58:
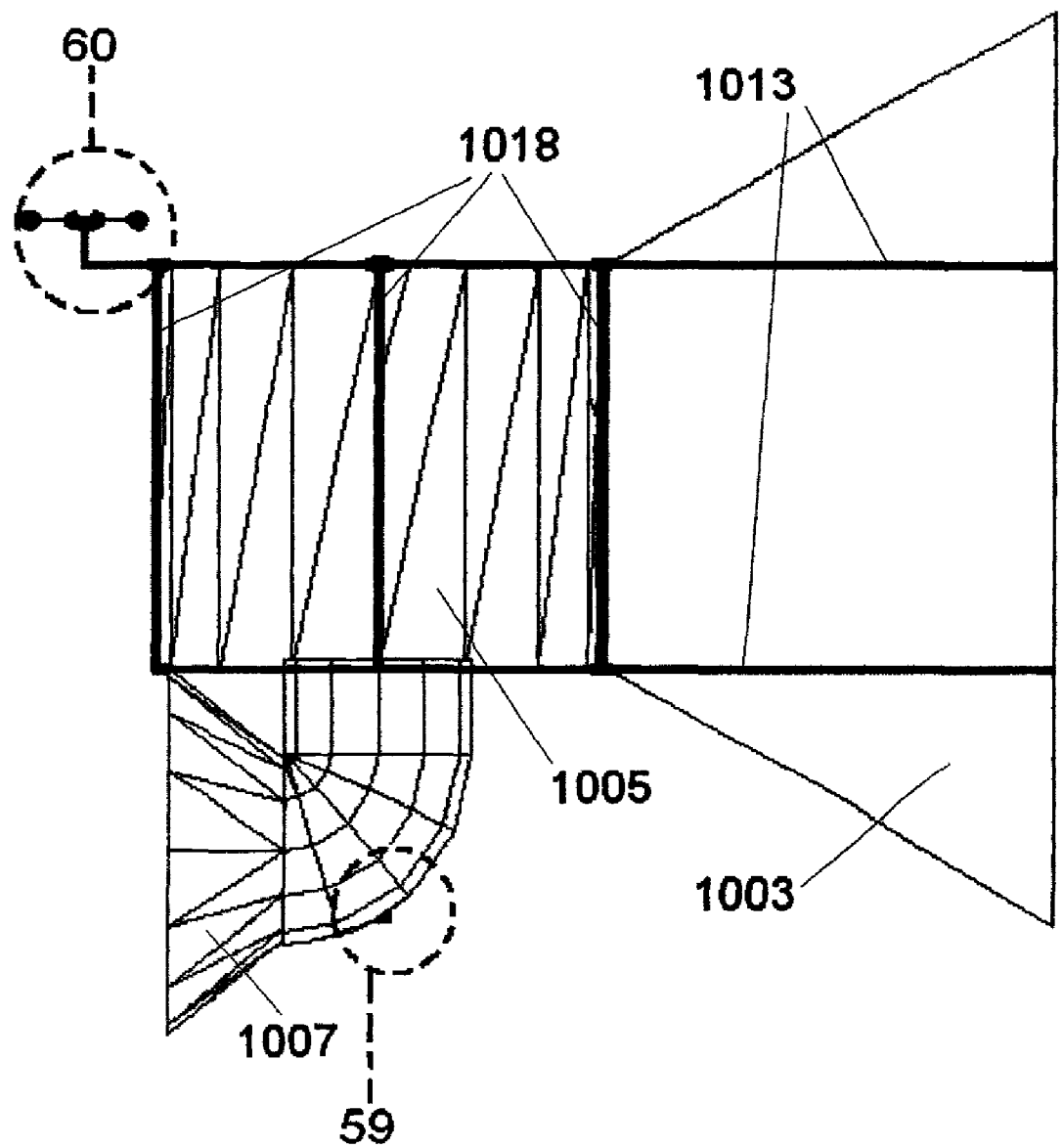

FIG. 58 shows a right side orthogonal view of the directional windshield assembly.

Figure 59:
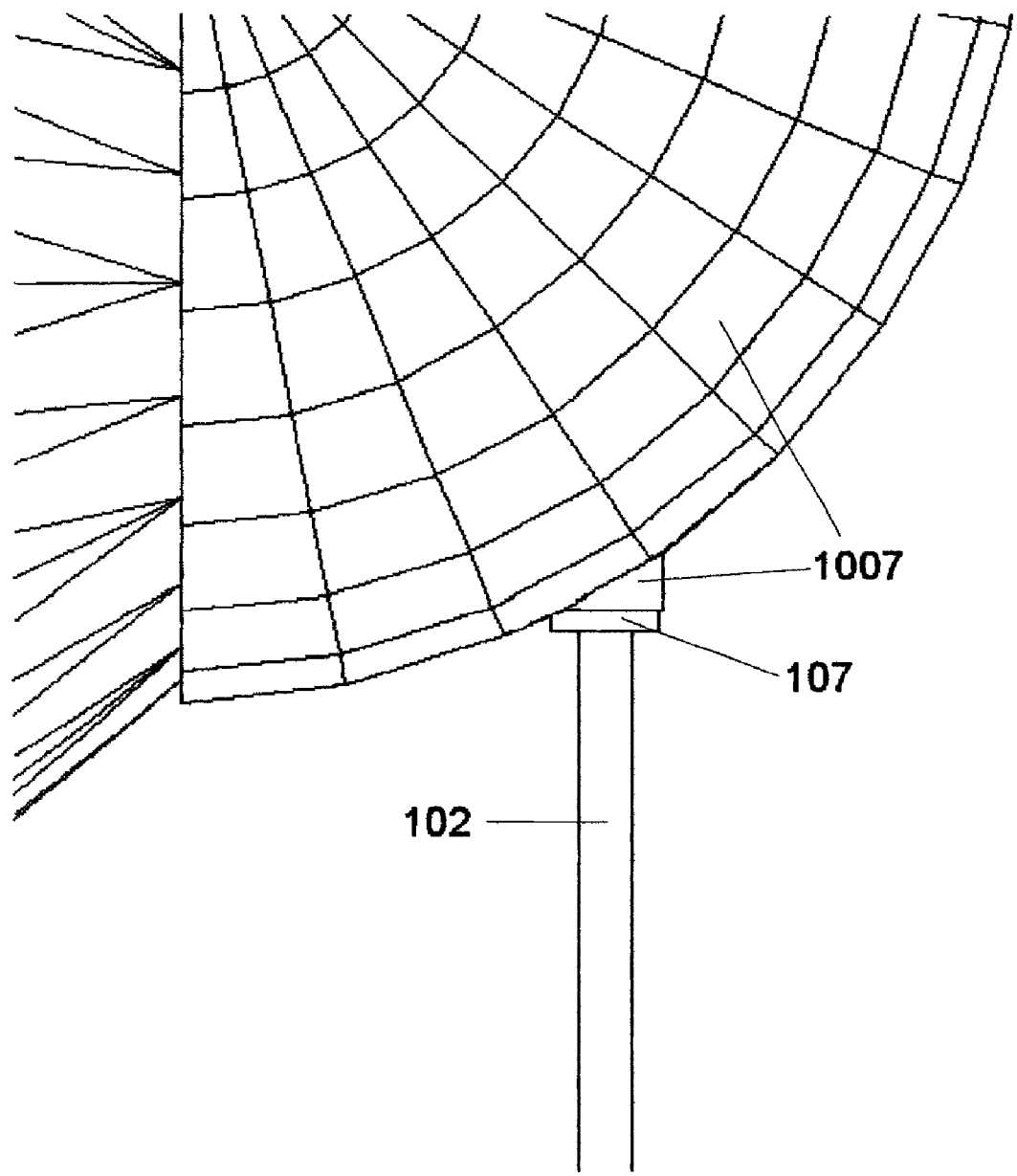

FIG. 59 shows an enlarged view of the intake structure mounting to the static assembly.

Figure 60:
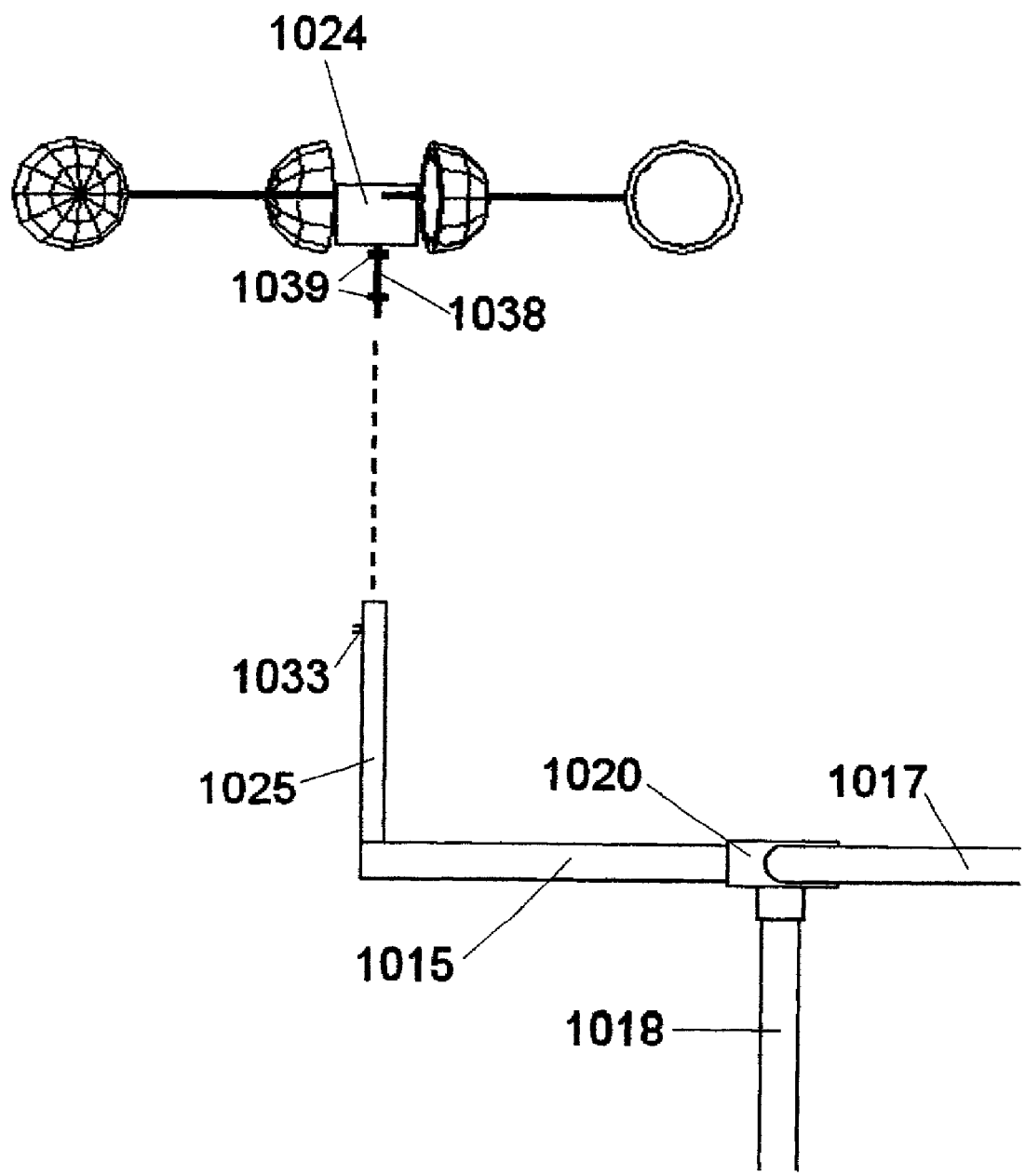

FIG. 60 shows an enlarged view of the anemometer rotor subassembly installation.

Figure 61:
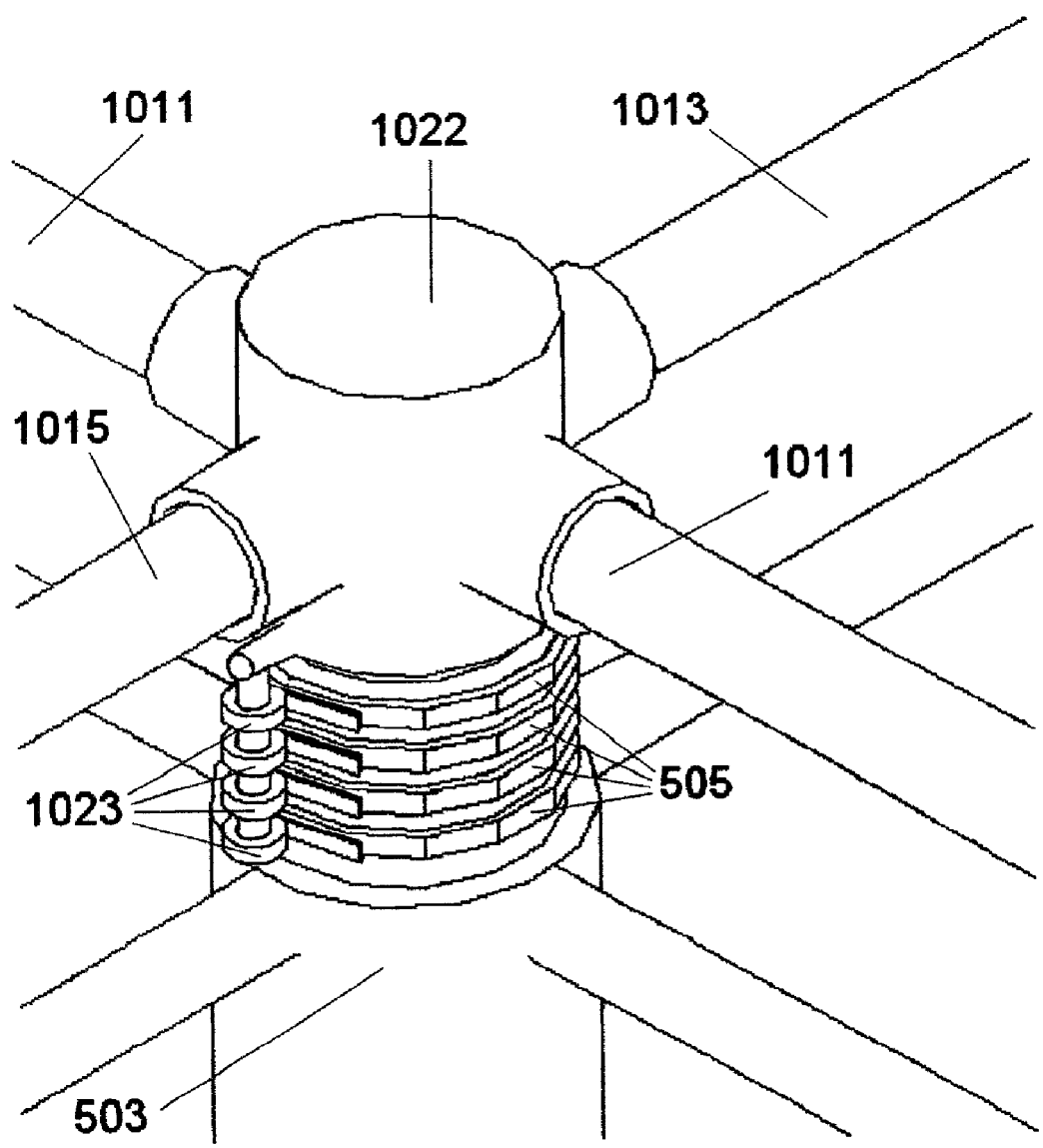

FIG. 61 shows an enlarged view of the anemometer electrical interface sliprings and pickups.

Figure 62:
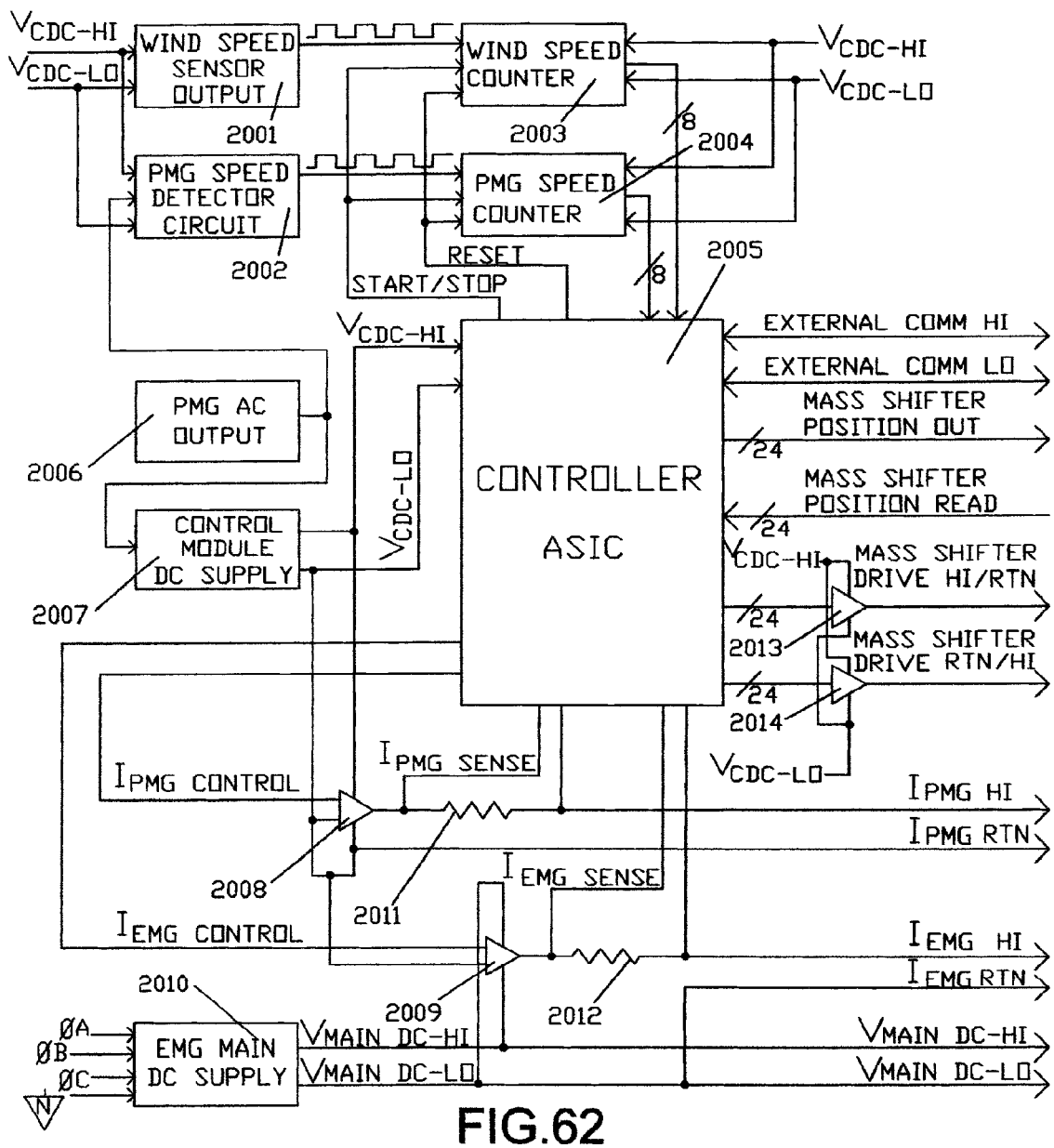

FIG. 62 shows a functional block diagram of the control module interfaces.

DRAWINGS—REFERENCE NUMERALS 101 static assembly
102 support structure for static assembly
103 upper bearing for directional windshield assembly
105 upper bearing for rotors assembly
106 electromagnetic generator(EMG) main DC supply
107 bearing for intake structure 109 generator stator support structure
111 lower bearing for rotors assembly
113 power transfer/external communication pickups subassembly
115 lower bearing for directional windshield assembly
117 permanent magnet generator(PMG) stator subassembly
119 electromagnetic generator(EMG) stator subassembly
501 rotors assembly
502 inner rotor subassembly
503 inner rotor hub structure
504 inner rotor to outer rotor connection point
505 anemometer electrical interface sliprings
506 mass shifter connection receptacle
507 power transfer/external communication sliprings
508 permanent magnet generator(PMG) actuator flyweight housing connection receptacle
509 mass shifter subassembly
511 control module
512 control module mounting collar
513 permanent magnet generator(PMG) rotor subassembly
515 permanent magnet generator(PMG) stator subassembly
516 electromagnetic generator(EMG) rotor mounting hub
517 mass shifter outer structure
518 mass shifter outer structure guide channel
519 mass shifter motor housing (stator)
520 mass shifter motor housing guide key
521 mass shifter motor rotor
522 mass shifter electrical interface pins
523 shifting mass home position detector
525 shifting mass
526 shifting mass guide key
527 mass shifter drive shaft
518 permanent magnet generator(PMG) actuator flyweight housing
529 permanent magnet generator(PMG) actuator flyweight
530 permanent magnet generator(PMG) actuator flyweight stop
531 permanent magnet generator(PMG) actuator flyweight pulley
533 permanent magnet generator(PMG) actuator drive cable
535 permanent magnet generator(PMG) actuator drive cable-to-rotor attachment ring
527 permanent magnet generator(PMG) rotor radial alignment wheel
539 permanent magnet generator(PMG) actuator disengagement spring
540 permanent magnet generator(PMG) actuator rotor-to-disengagement spring attachment ring
541 permanent magnet generator(PMG) actuator disengagement spring-to-inner rotor hub attachment ring
543 outer rotor structure
545 mass shifter subassembly retention plates
547 top longitudinal sail retention structure
549 top radial sail retention structure
551 top sail drive structure
553 middle sail radial sail retention structure
555 bottom sail drive structure
557 bottom radial sail retention structure
559 bottom longitudinal sail retention structure
561 top sail support subassembly
563 bottom sail support subassembly
565 sail subassembly
567 pivoting mast structure
568 mast-to-sail connecting bracket
569 inner sail structure
571 middle sail structure
573 outer sail structure
1001 directional windshield assembly
1003 directional control structure
1005 windshield
1006 anemometer subassembly
1007 intake structure
1009 windshield support structure(WSS)
1011 windshield support structure(WSS) lateral spar
1013 windshield support structure(WSS) aft longitudinal spar
1015 windshield support structure(WSS) top frontal longitudinal spar
1016 windshield support structure(WSS) bottom frontal longitudinal spar
1017 windshield support structure(WSS) outer hub circumferential segment
1018 windshield support structure(WSS) vertical support member
1019 windshield support structure((WSS) outer hub type-A connection fixture
1020 windshield support structure(WSS) outer hub type-B connection fixture
1022 windshield support structure(WSS) top inner hub
1023 anemometer electrical interface pickups subassembly
1024 anemometer rotor subassembly
1025 anemometer support structure
1033 photoelectric sensor
1035 photoelectric sensor activation tab
1036 intake structure-to-windshield support structure (WSS) mounting collar
1037 windshield support structure(WSS) bottom inner hub
1038 anemometer rotor shaft
1039 anemometer rotor shaft bearing
2001 wind speed sensor output
2002 PMG speed detector circuit
2003 wind speed counter
2004 PMG speed counter
2005 controller ASIC
2006 PMG AC output
2007 control module DC supply
2008 Ipmg current amplifier
2009 Iemg current amplifier
2010 EMG main DC supply
2011 Ipmg current sense resistor
2012 Iemg current sense resistor
2013 mass shifter drive amplifier HI/RTN
2014 mass shifter drive amplifier RTN/HI

DETAILED DESCRIPTION—FIGS. 1 THRU 44, 49A THRU 61—PREFERRED EMBODIMENT

The description of the apparatus may best be made by detailing the three main assemblies in turn and showing their connectivity to each other as logical opportunity permits.

Figure 1:
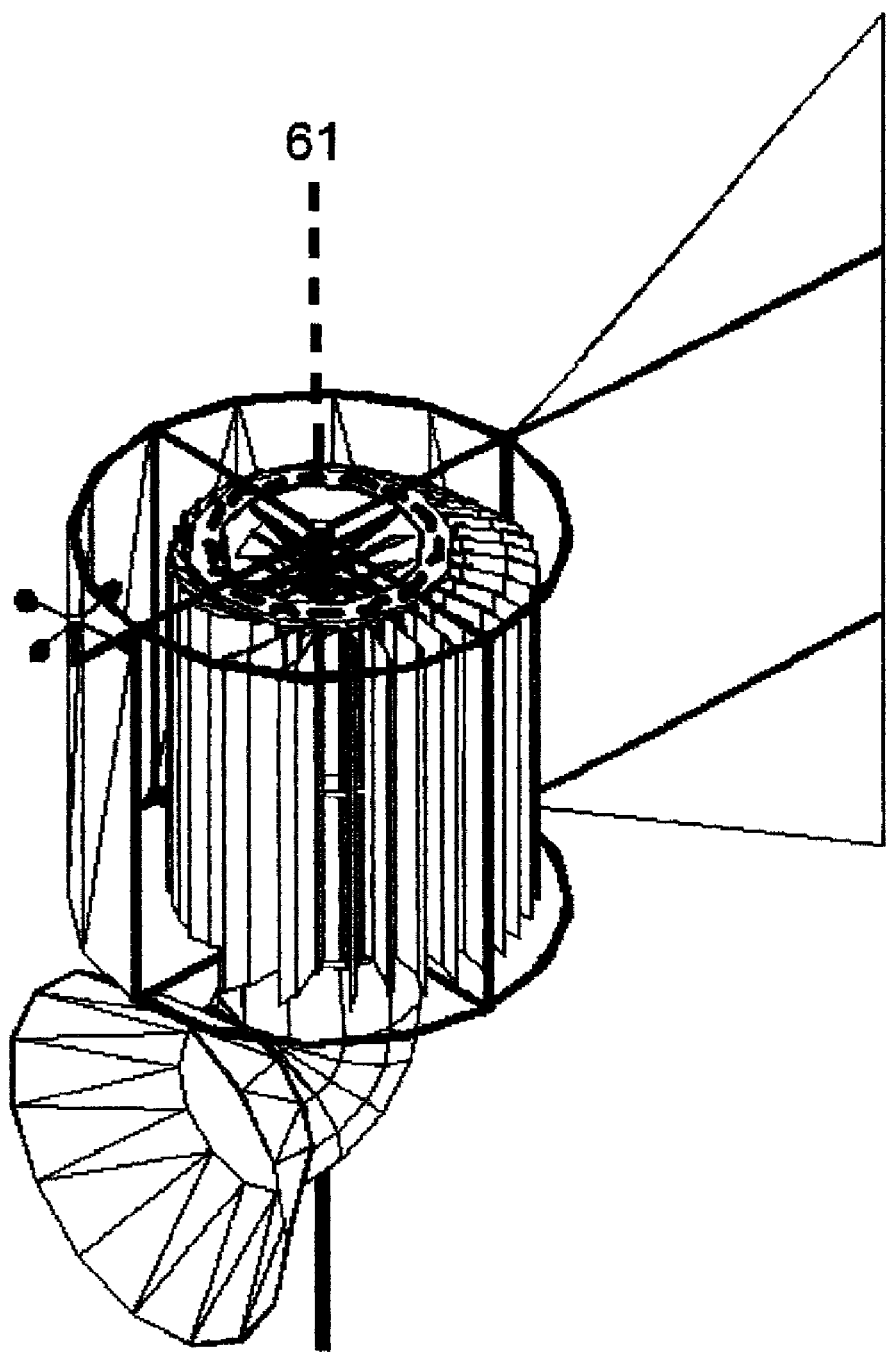
FIG. 1 shows a perspective view of the apparatus.
Figure 1A:
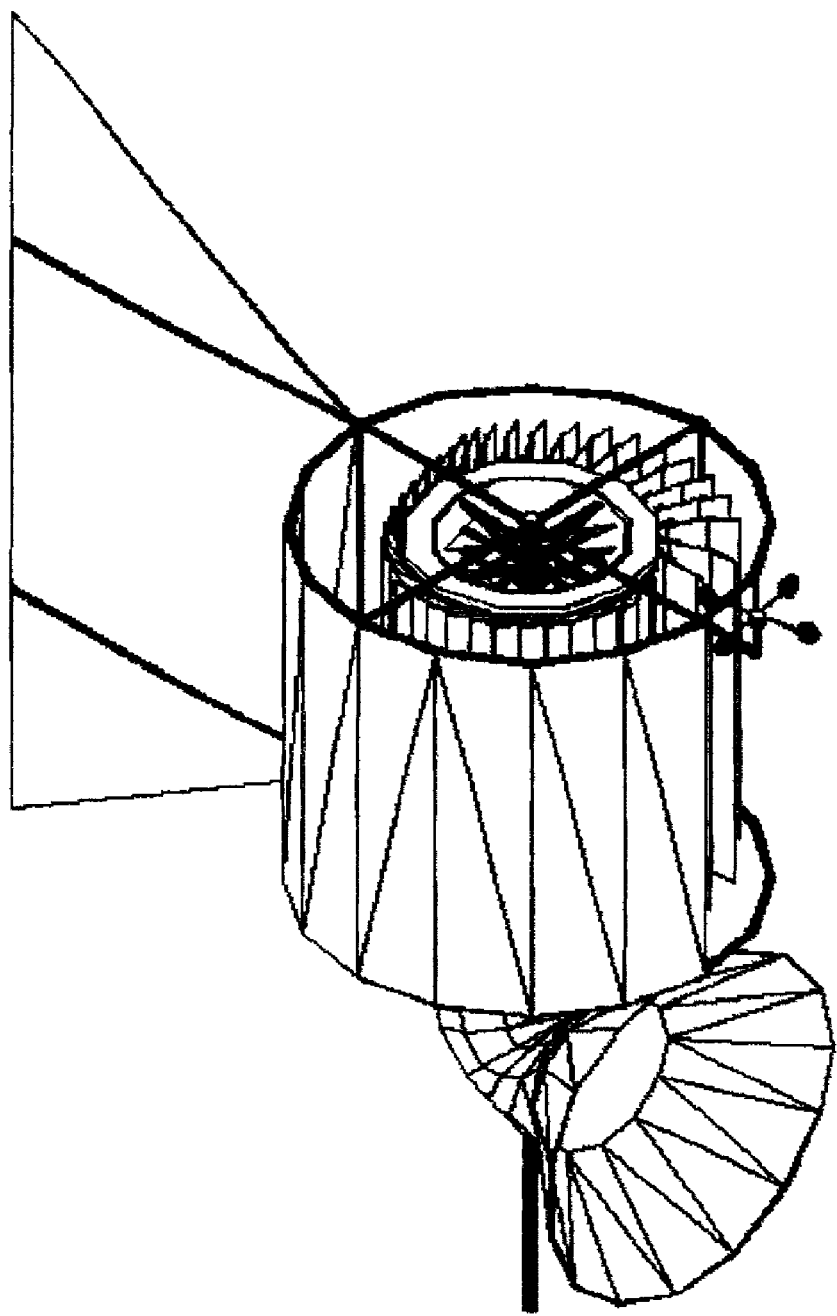
FIG. 1A shows an alternative view of the apparatus.
Figure 2:
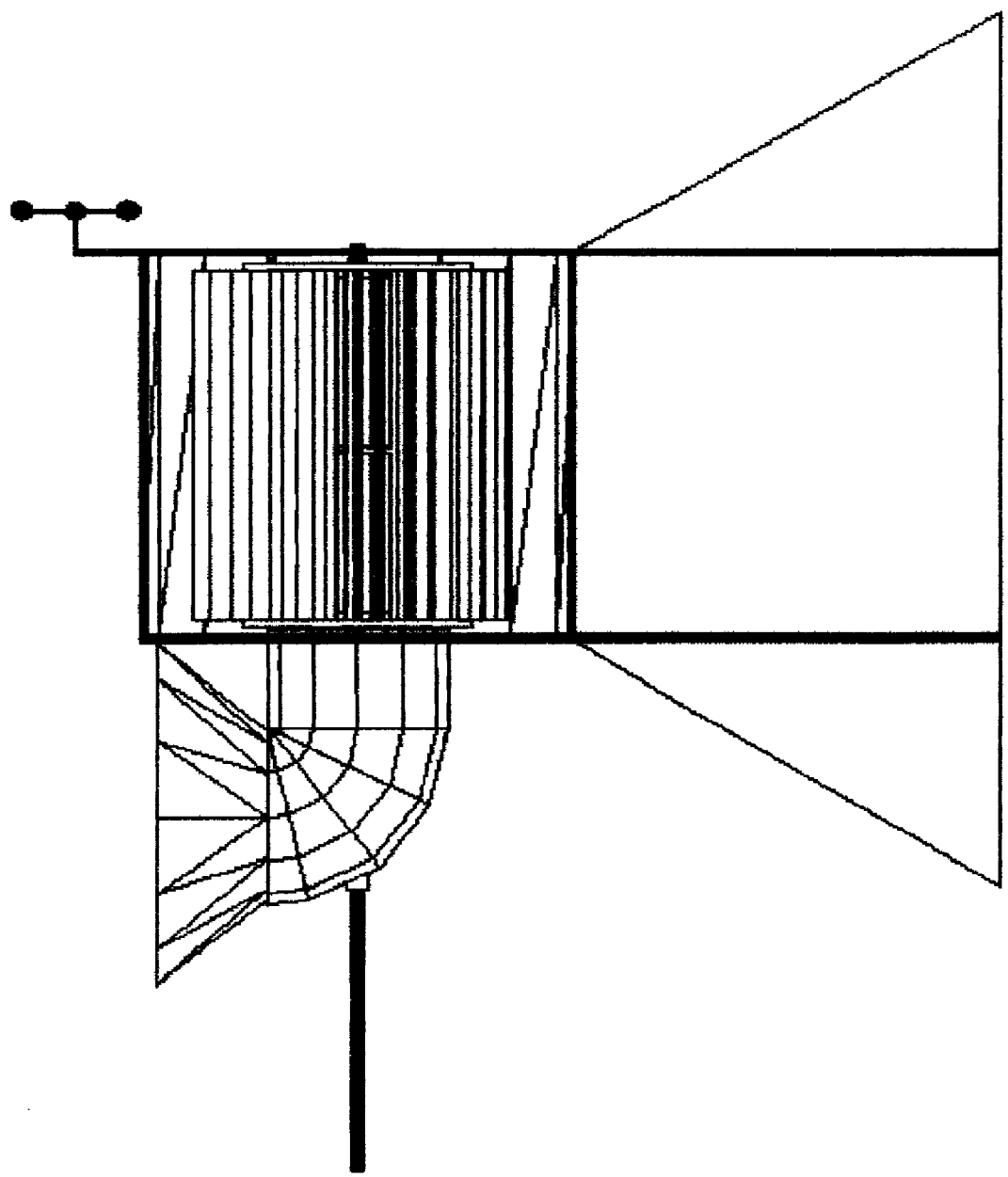
FIG. 2 shows a right side orthogonal view of the apparatus.
Figure 3:
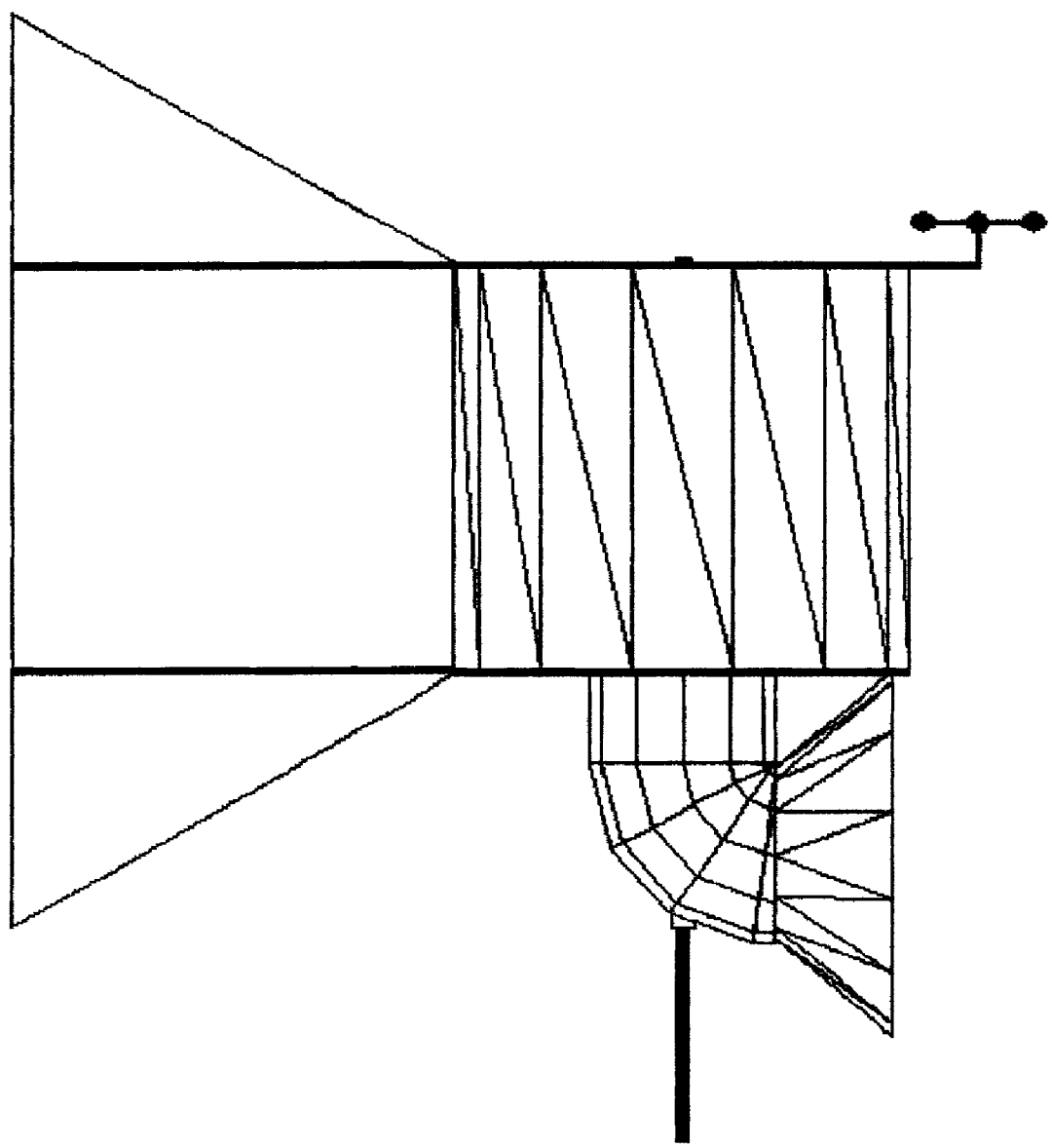
FIG. 3 shows a left side orthogonal view of the apparatus.
Figure 4:
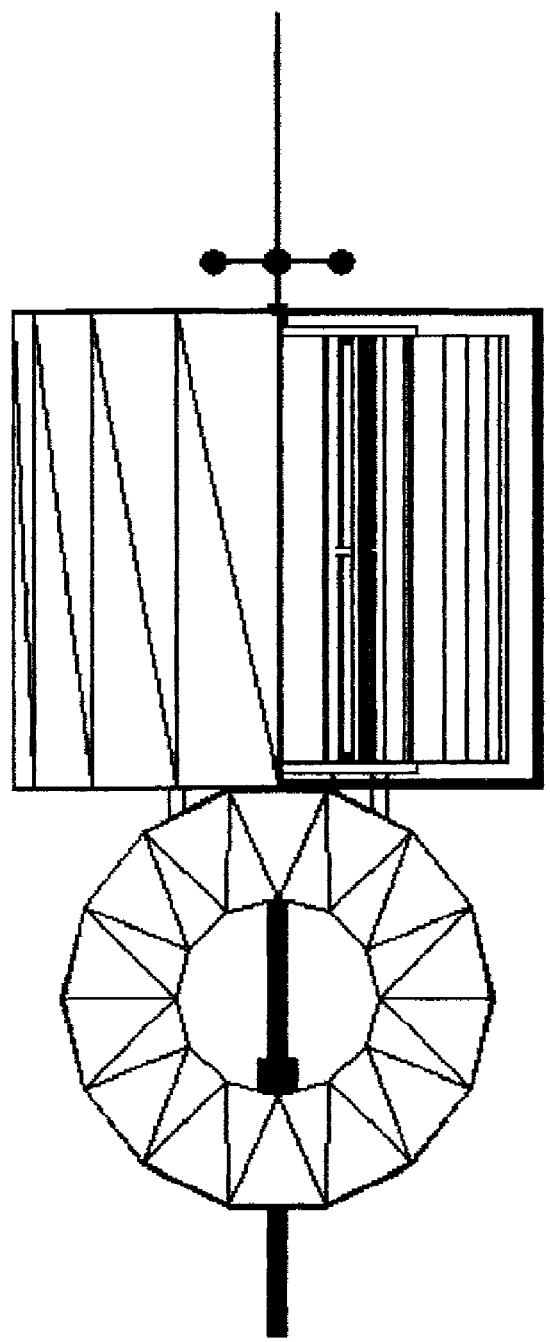
FIG. 4 shows a front side orthogonal view of the apparatus.
Figure 5:
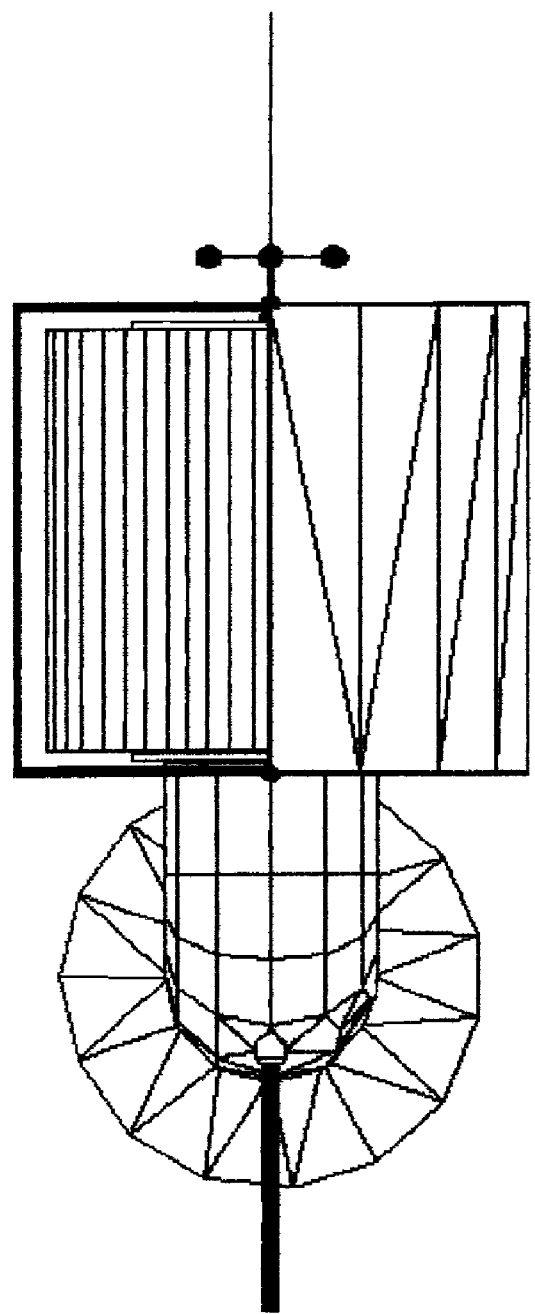
FIG. 5 shows a rear side orthogonal view of the apparatus.
Figure 6:
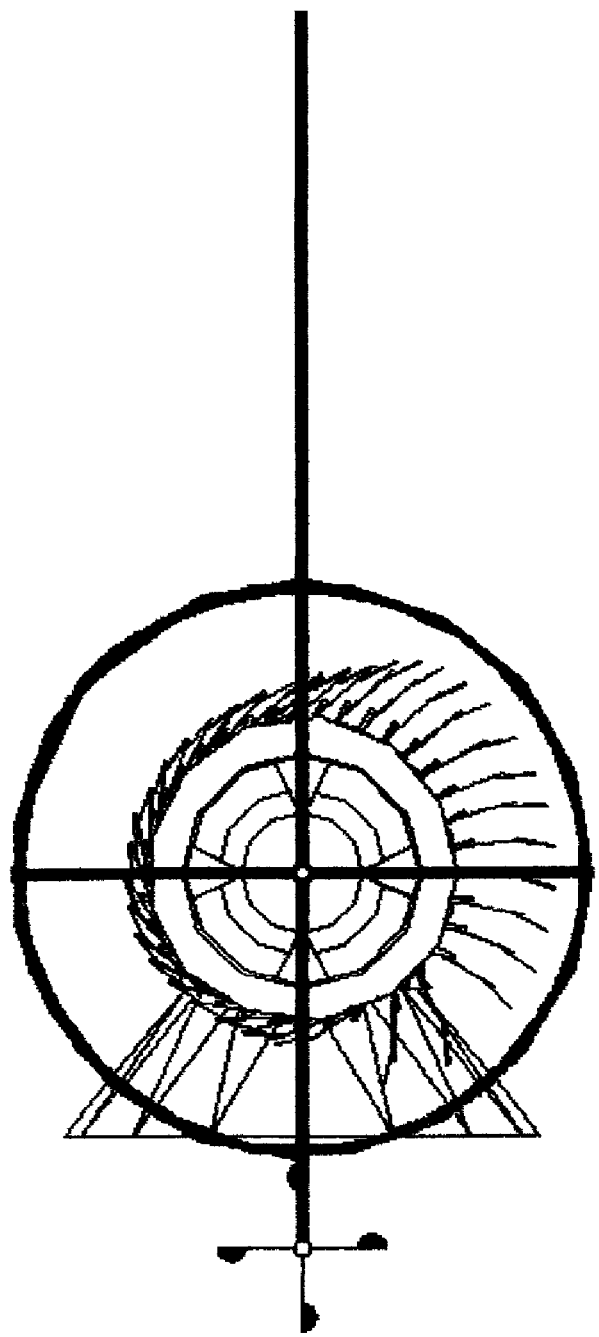
FIG. 6 shows a top side orthogonal view of the apparatus.
Figure 7:
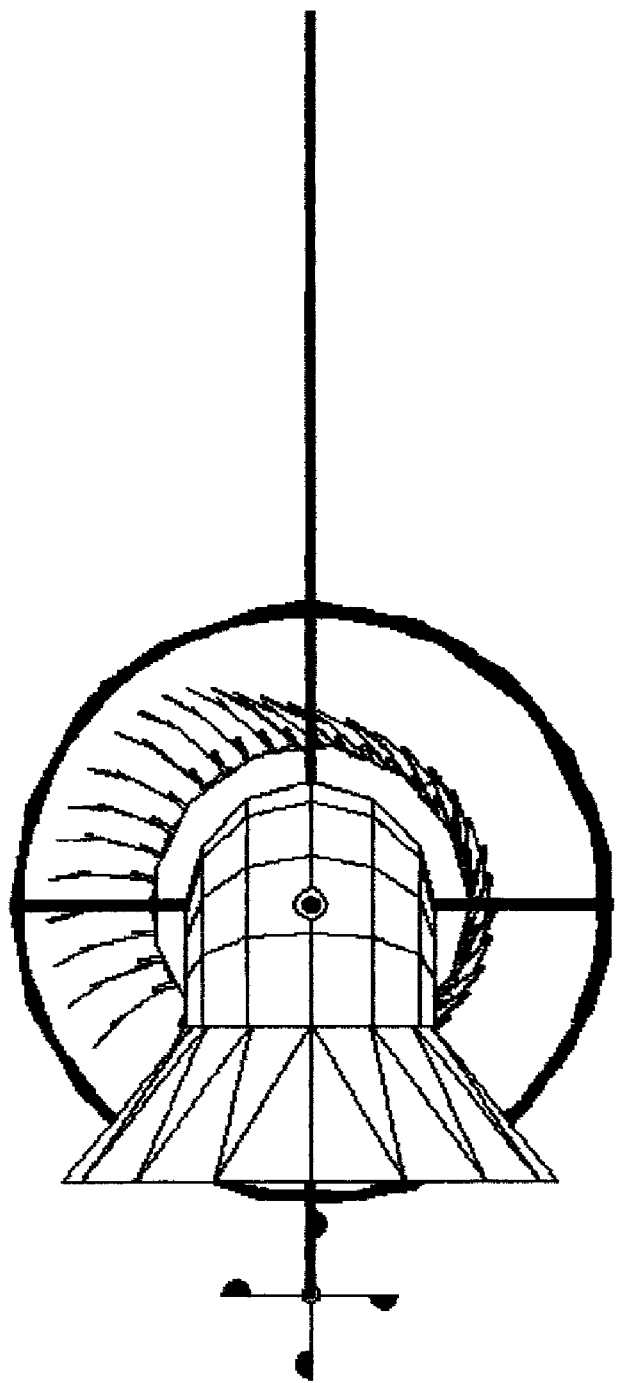
FIG. 7 shows a bottom side orthogonal view of the apparatus.

FIGS. 1 and 1A show perspective views of the apparatus.

FIGS. 2, 3, 4, 5, 6, and 7 show right, left, front, rear, top, and bottom side orthogonal views respectively of the apparatus.

Figure 8:
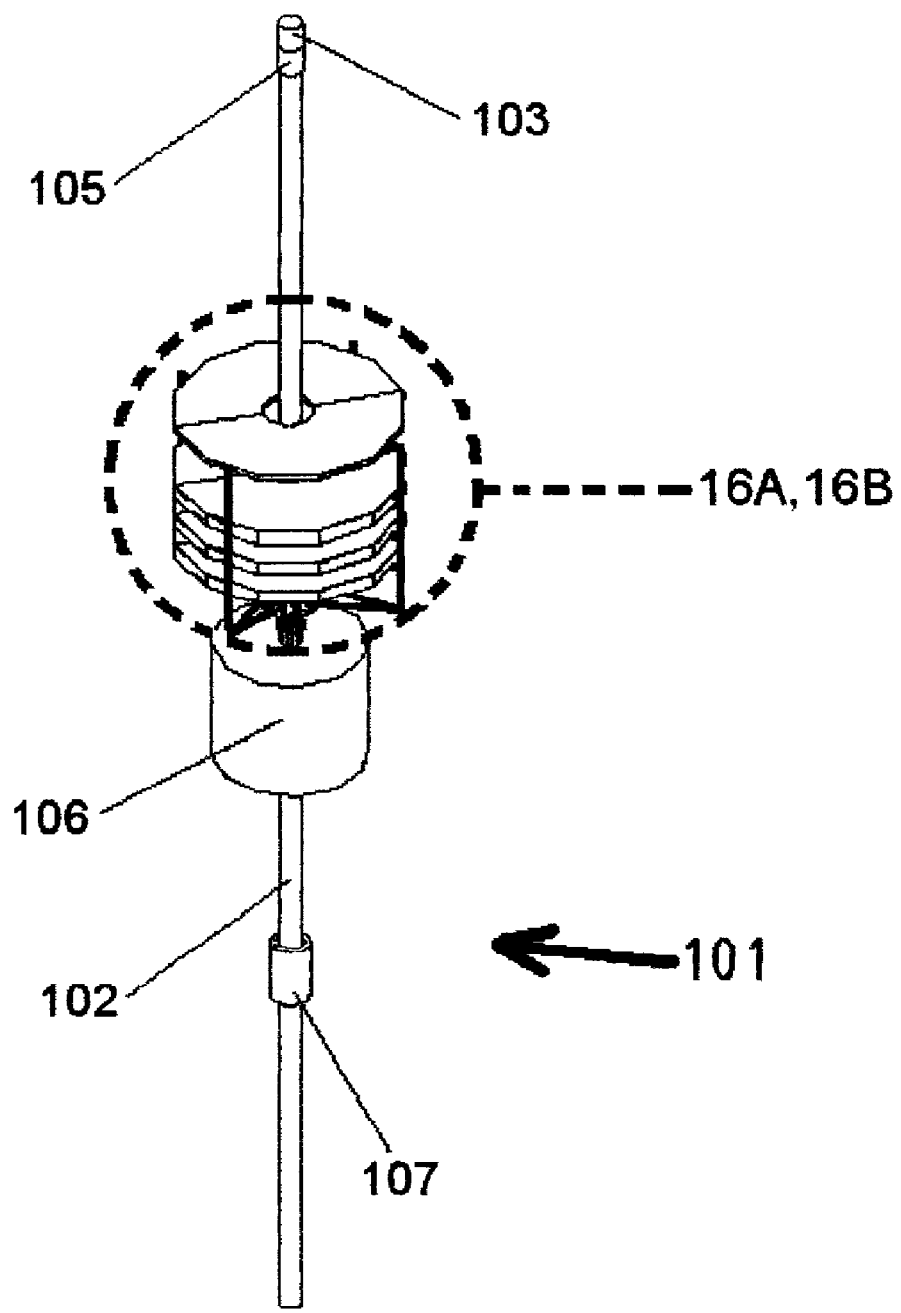
FIG. 8 shows a perspective view of the static assembly.
Figure 9:
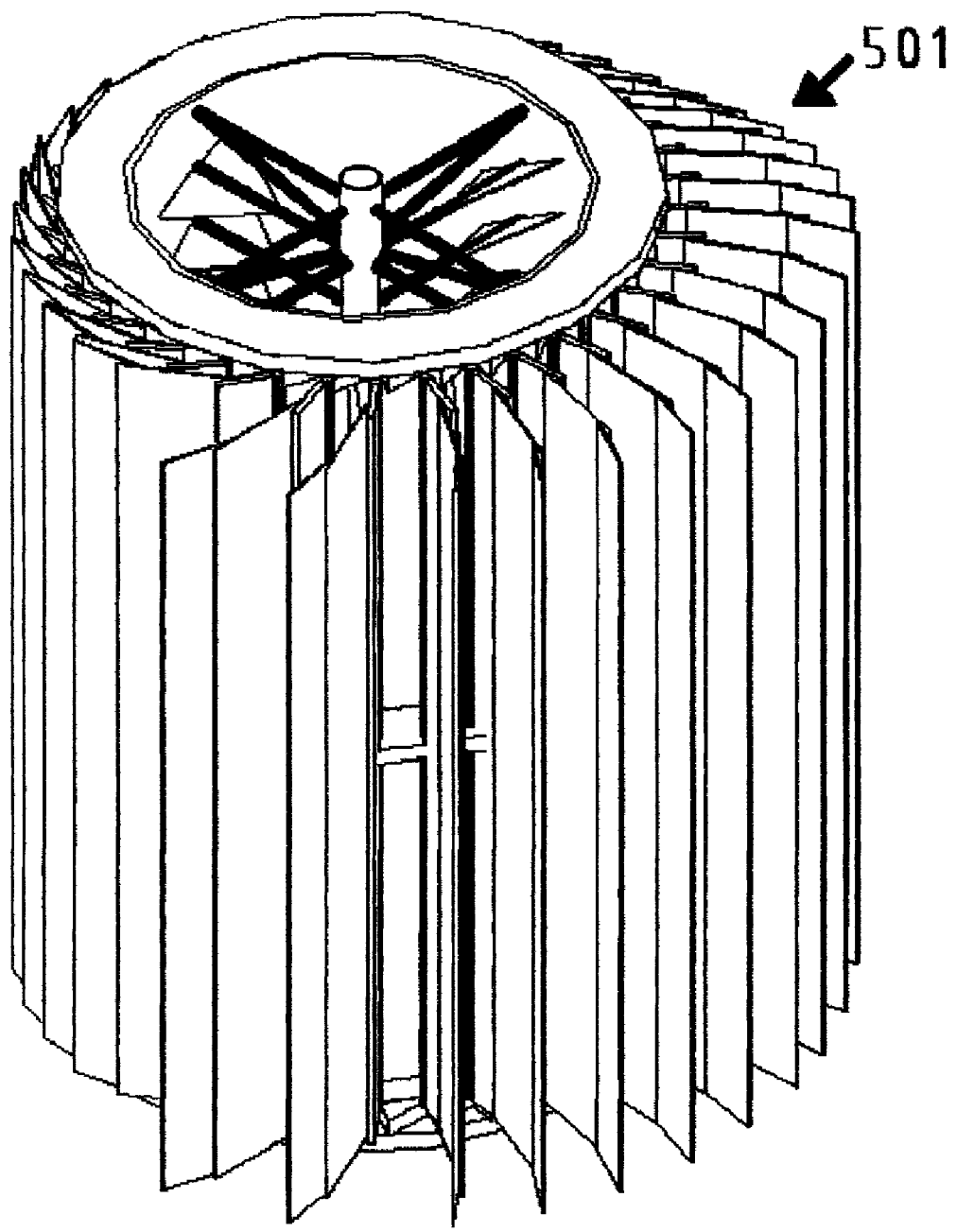
FIG. 9 shows a perspective view of the rotors assembly.
Figure 10:
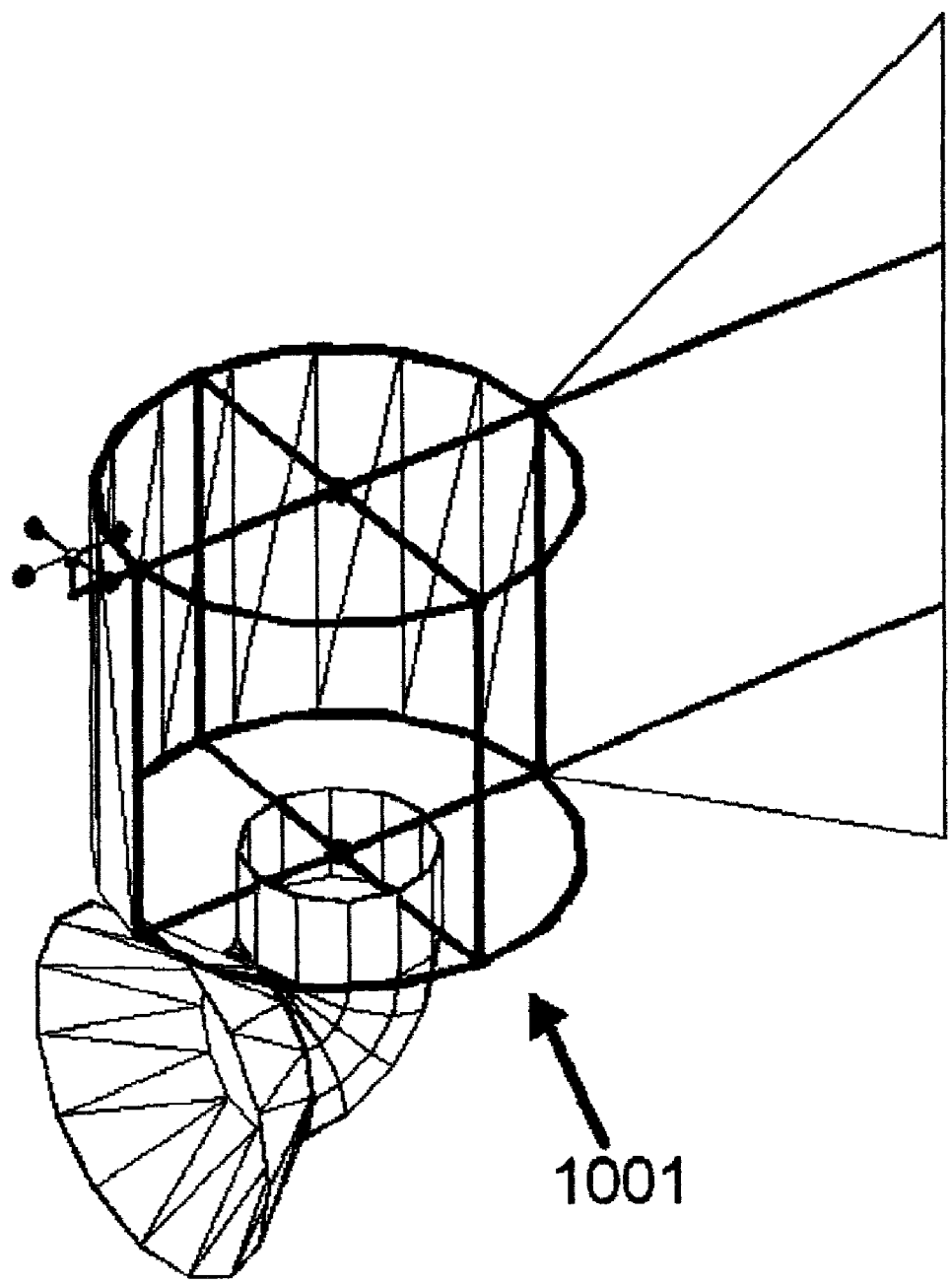
FIG. 10 shows a perspective view of the directional windshield assembly.

FIGS. 8, 9, and 10 show perspective views of the static assy. 101, rotors assy. 501, and directional windshield assy. 1001 respectively.

Figure 11:
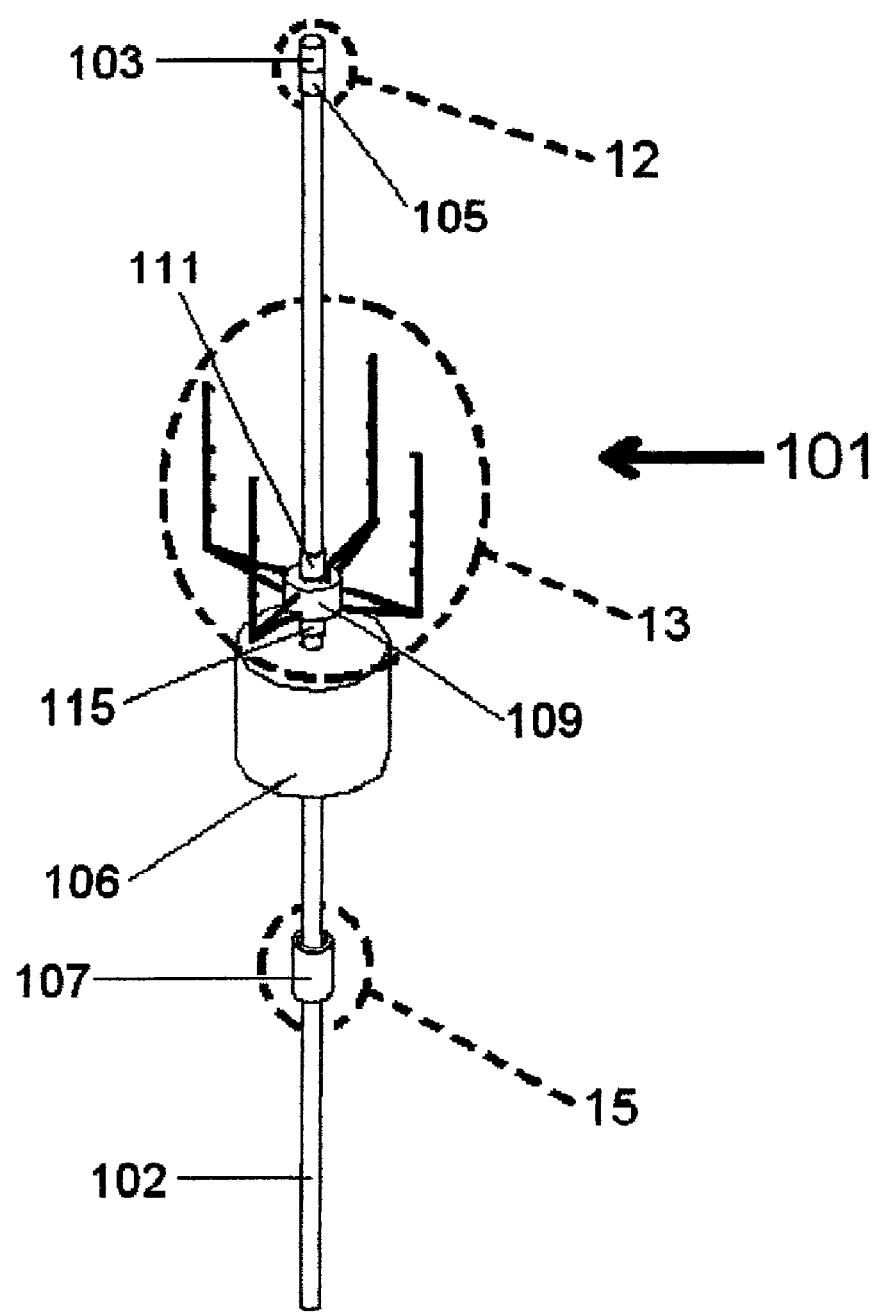
FIG. 11 shows a perspective view of the static assembly without generator stator subassemblies installed.

FIG. 11 shows a perspective view of the static assy. 101 without generator stator subassemblies 117 and 119 installed.

The subassemblies depicted in FIG. 11 are a support structure for static assy. 102, and upper bearing for directional windshield assy. 103, an upper bearing for rotors assy. 105, a lower bearing for rotors assy. 111, a generator stator support structure 109, a lower bearing for directional windshield assy. 115, a bearing for intake structure 107, and an electromagnetic generator(EMG) main DC supply 106. The EMG main DC supply 106 is comprised of electronic components capable of converting AC voltages generated by the EMG into rectified, filtered and regulated DC voltage with all components housed within an environmentally sealed chassis.

Figure 12:
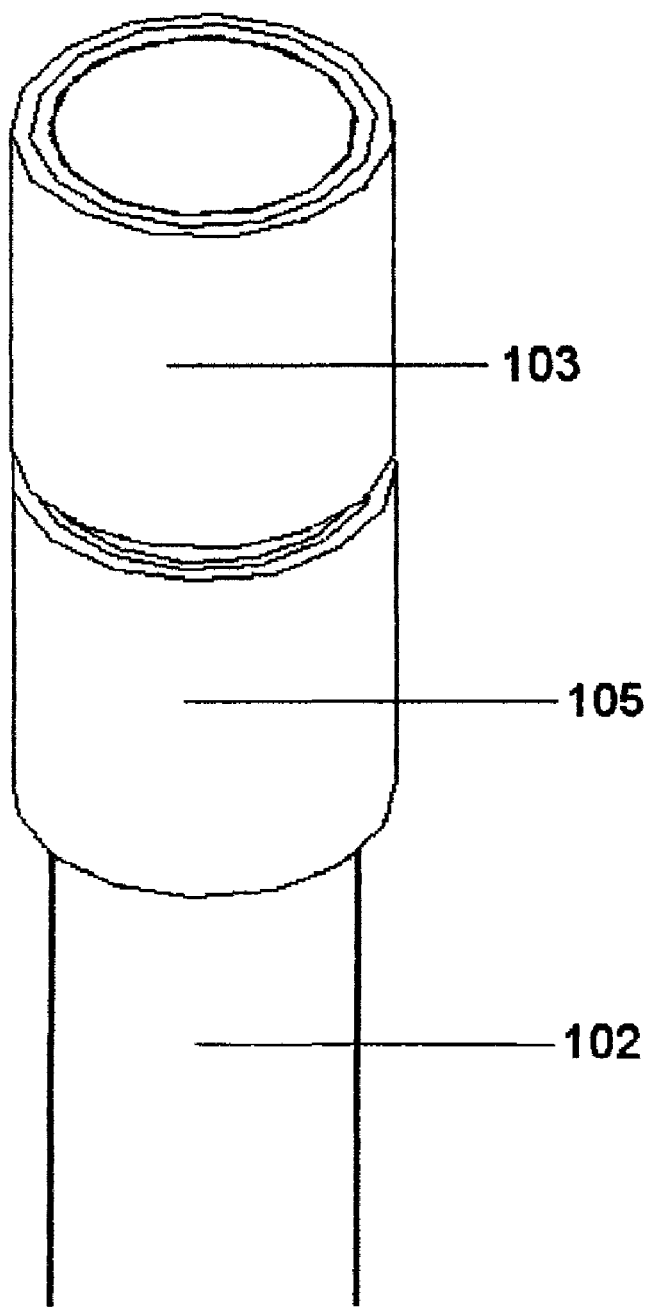
FIG. 12 shows an enlarged view of the top section of the static assembly.

FIG. 12 shows an enlarged view of the top section of static assy. 101. Support structure for static assy. 102 consists of a rigid cylindrical structure that may be solid or hollow, capable of supporting the entire apparatus with sufficient rigidity so as to preclude any inordinate twisting or swaying when subjected to horizontal winds with a maximum velocity of 75 miles per hour. Both upper bearing for directional windshield assy. 103 and upper bearing for rotors assy. 105 are shown in detail. Both of these bearings are comprised of inner and outer race components where the inner races are attached to support structure for static assy. 102 with screws (not shown). The outer races are free to rotate concentrically about the longitudinal axis of support structure for static assy. 102.

Figure 13:
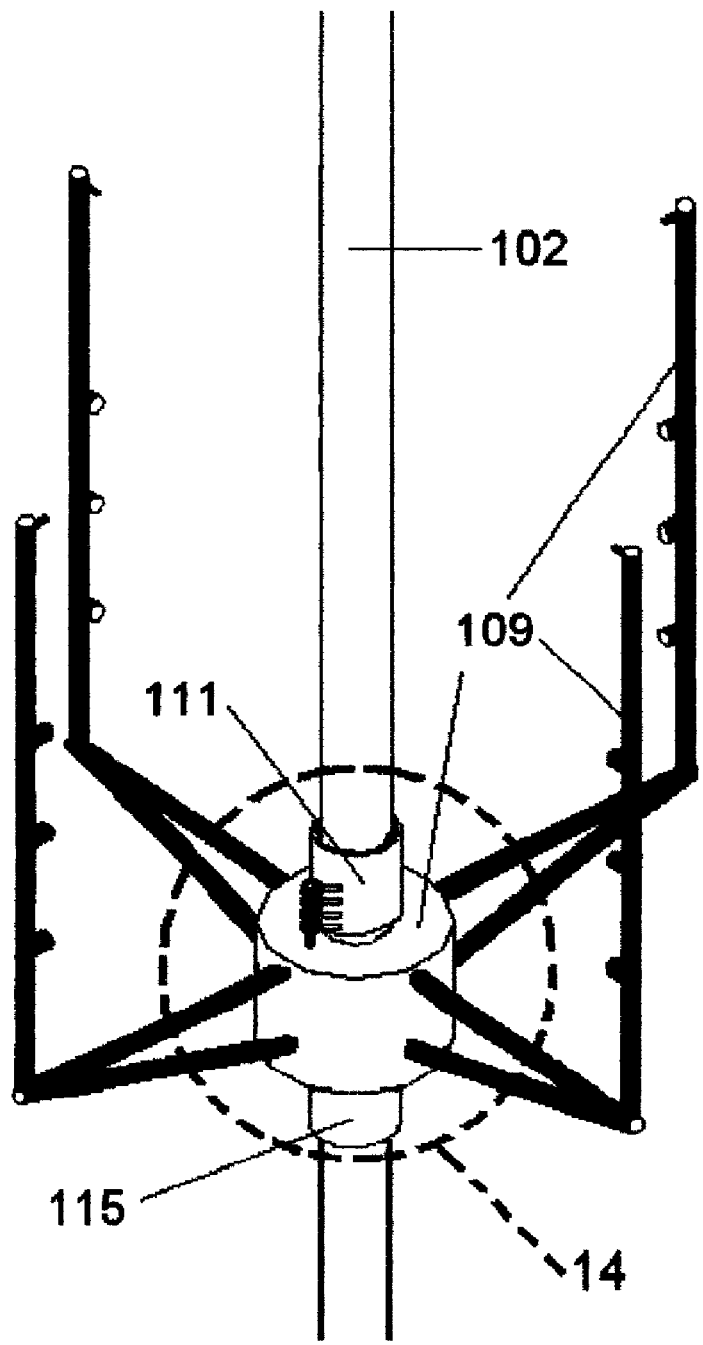
FIG. 13 shows an enlarged view of the middle section of the static assembly.

FIG. 13 shows an enlarged view of the middle section of static assy. 101 without generator stator subassemblies 117 and 119 installed. Generator stator support structure 109 is comprised of a central cylindrical hub with four horizontal beams emanating from it at 90 degree points of its circumference. In addition to these four beams there are another four beams that emanate from the hub slightly lower down vertically from the aforementioned horizontal beams. These four beams extend outward and upwards to connect with the ends of the horizontal beams to form a structure more able to carry vertical loads. Emanating from the outer ends of the horizontal beams are vertical beams that have a series of horizontal mounting stubs extending inwards toward support structure for static assy. 102. Generator stator structure 109 is solid in structure and monolithic in composition and secured to support structure for static assy. 102 with screws (not shown). Both generator stator support structure 109 and support structure for static assy. 102 are immobile.

Figure 14:
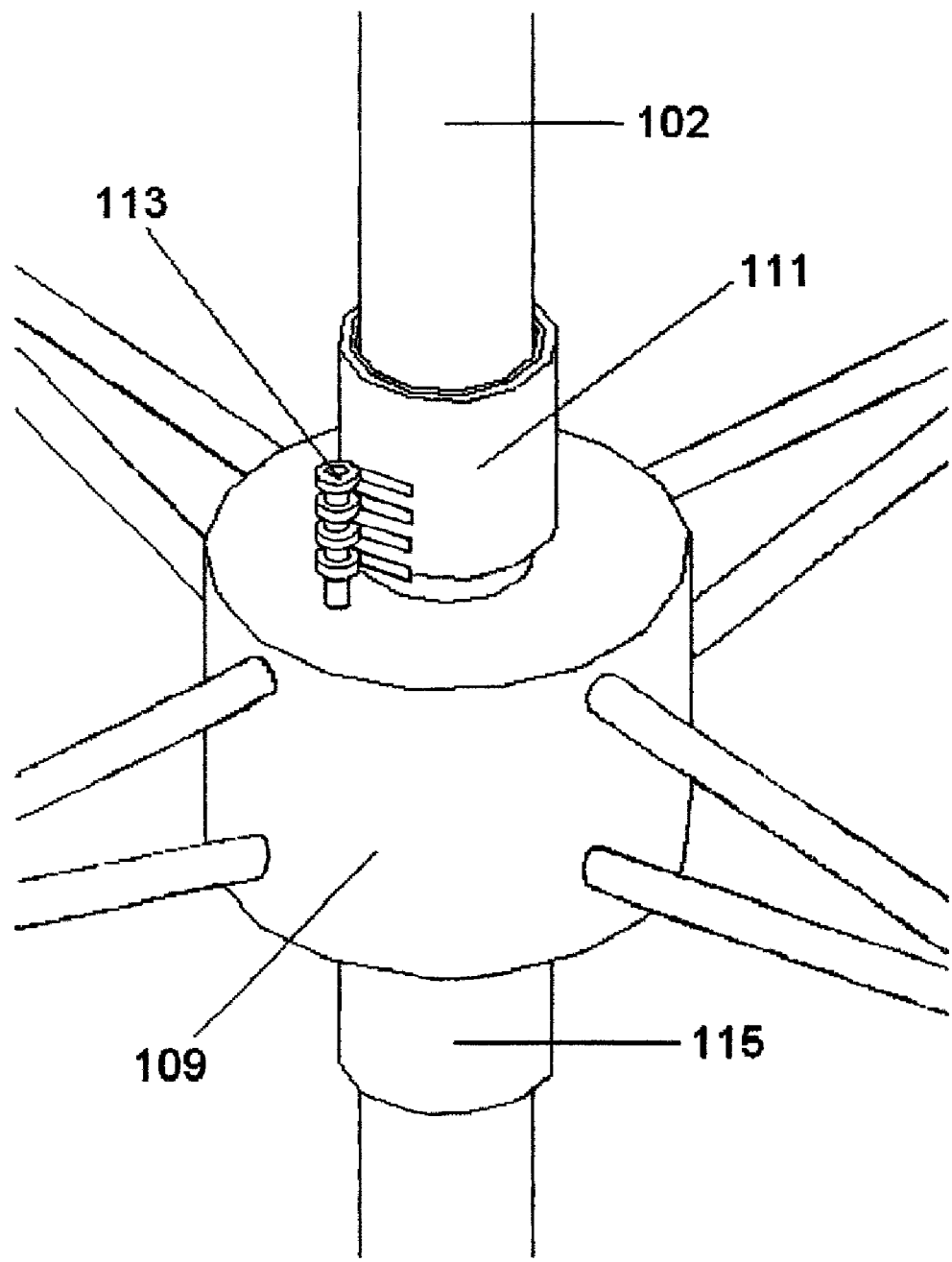
FIG. 14 shows an enlarged view of the generator stator subassemblies support structure.

FIG. 14 shows an enlarged view focusing on the subassemblies mounted on or near generator stator support structure 109. Both lower bearing for rotors assy. 111 and lower bearing for directional windshield assy. 115 are shown in detail. Both bearings consist of inner and outer race components where the inner races are attached to support structure for static assy. 102 with screws (not shown). A power transfer/external communication pickups subassy. 113 is comprised of a plurality of metallic strips connected to a vertical mounting mast with screws (not shown) and wound around the circumference of the mast in such a manner so as to form tightly wound coils with the free ends of the wound strips having an innate spring force inward toward the outer circumferential surface of lower bearing for rotors assy. 111. The composition of the mounting mast is of a material electrically insular in nature with the mast being mounted into a receptive hole in the top of the cylindrical hub of generator stator support structure 109. The mounting mast of power transfer/external communications pickups subassy. 113 is secured to generator stator support structure 109 with a suitable adhesive.

Figure 15:
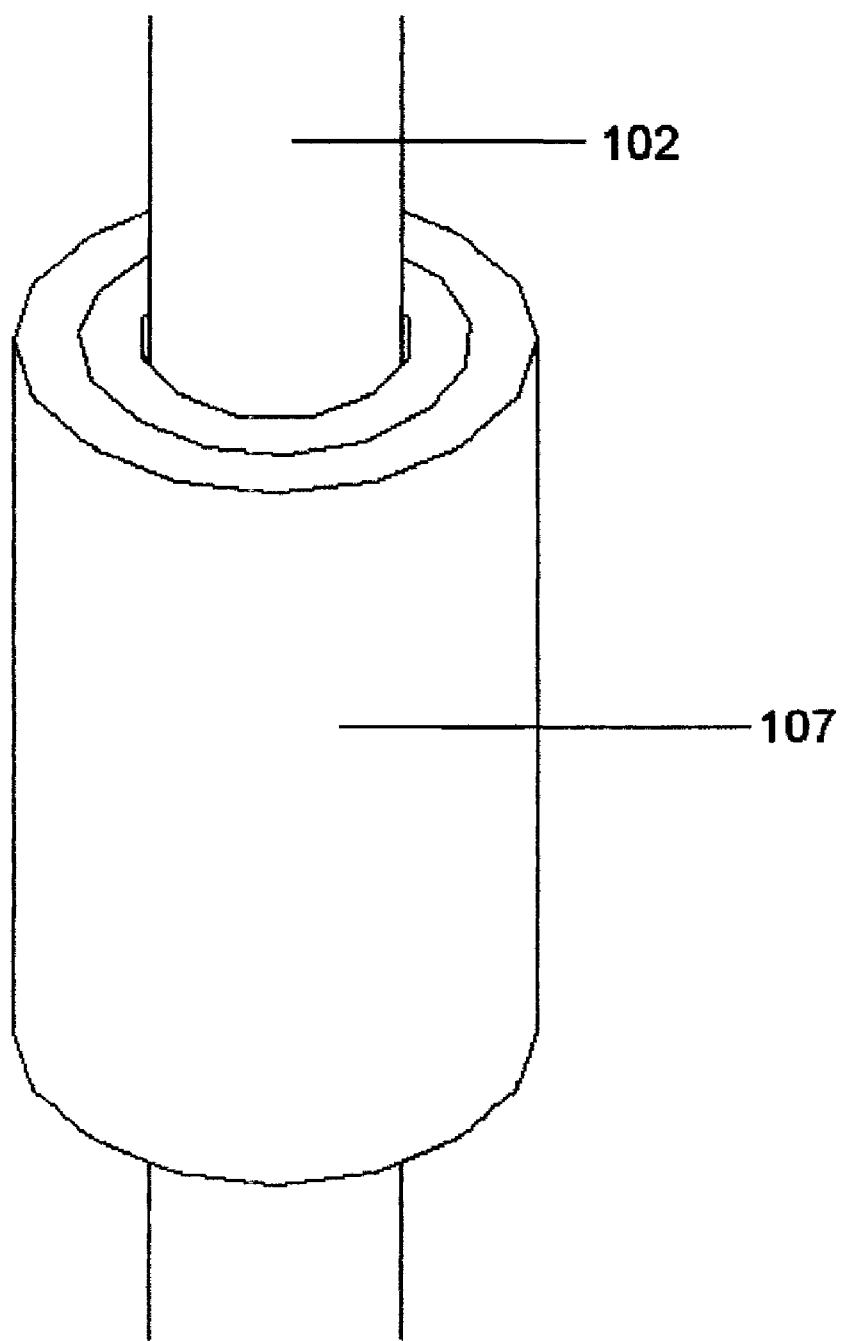
FIG. 15 shows an enlarged view of the bottom section of the static assembly.

FIG. 15 shows an enlarged view of the bottom of static assy. 101. The bearing for intake structure 107 is shown in detail. The bearing is comprised of inner and outer race components where the inner race is attached to support structure for static assy. 102 with screws (not shown). The outer race is free to rotate concentrically about the longitudinal axis of support structure for static assy. 102.

Figure 16A:
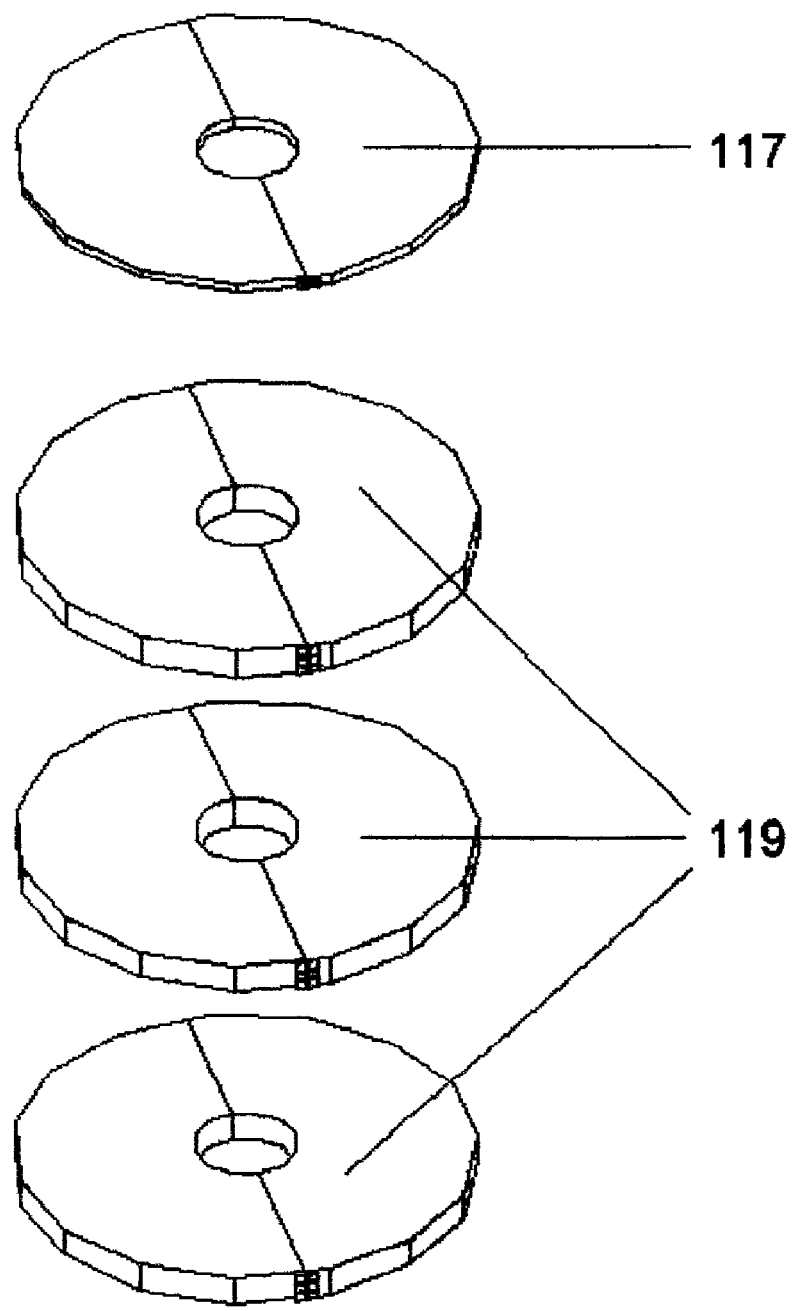
FIG. 16A shows a perspective view of the generator stator subassemblies depicted in the installed, closed position.
Figure 16B:
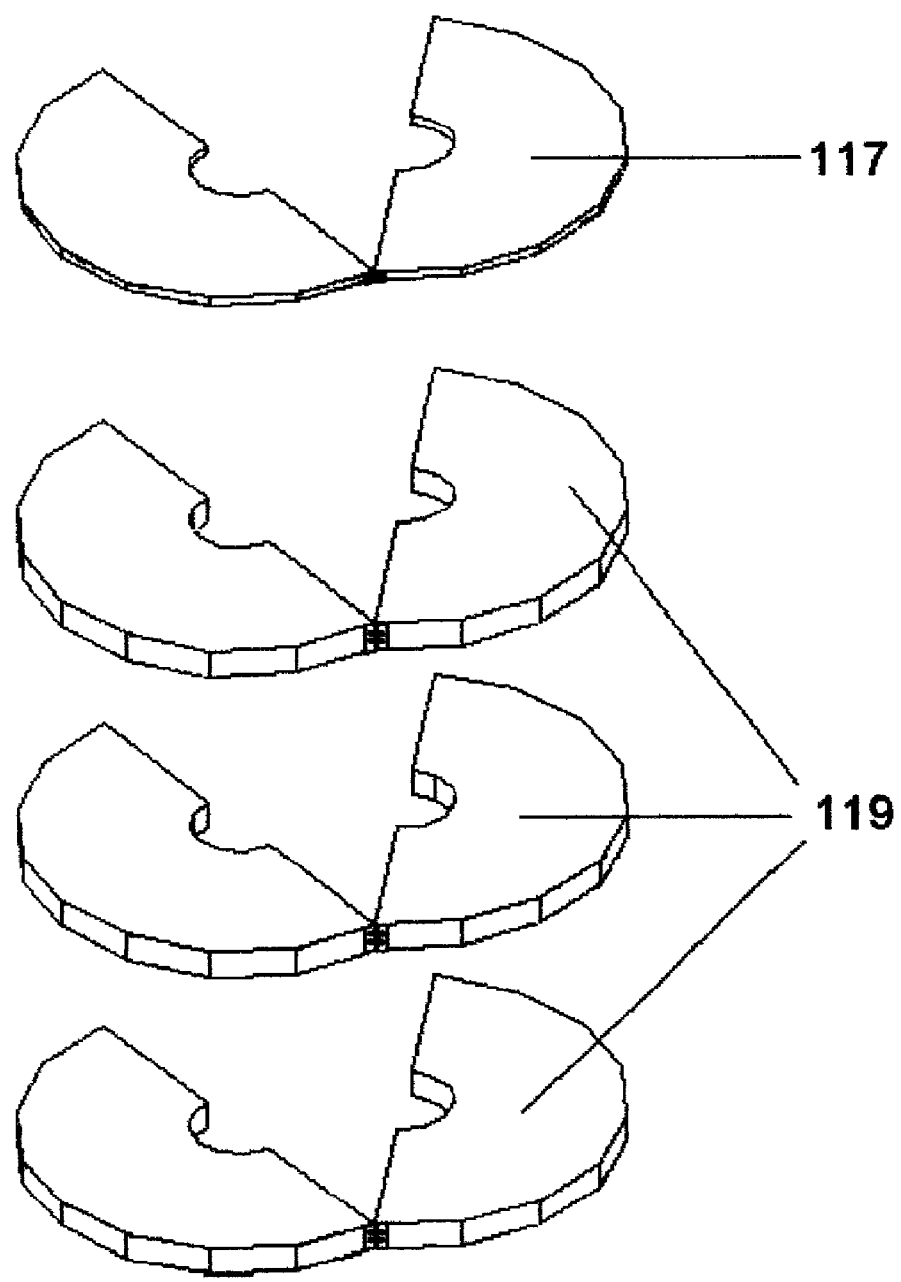
FIG. 16B shows a perspective view of the generator stator subassemblies depicted in the pre-installed, open position.

FIG. 16A shows a perspective view of permanent magnet generator(PMG) stator subassembly 117 and electromagnetic generator(EMG) stator subassembly 119. FIG. 16A shows the pre-installation of these stator subassemblies. Both permanent magnet generator(PMG) stator subassembly 117 and electromagnetic generator(EMG) stator subassembly 119 consist structurally of two halves that are connected together by a hinge (not referenced) and are secured furthermore in the closed circular configuration by means of screws (not shown). FIG. 16B shows permanent magnet generator (PMG) stator subassembly 117 and electromagnetic generator(EMG) stator subassembly 119 in the closed position. The two configurations are necessary due to nature of the assembly of the apparatus that requires these two stator subassemblies to be installed after other subassemblies. The permanent magnet generator stator subassembly 117 is composed of individual permanent magnets housed within a non-ferromagnetic substrate shaped into a disk. Because of the variety of conventional designs for permanent magnet generators, each based upon specific applications; the size, number, and orientation of the individual magnets are not addressed within this specification. The only requirement is that the magnets contained within permanent magnet generator(PMG) stator subassembly 117 create magnetic fields which will induce electrical currents in windings of conductive wire contained within a structure placed in close proximity to and moving with some relative velocity with respect to the stator. The permanent magnet generator(PMG) stator subassembly 117 is mounted to the topmost set of horizontal mounting stubs of generator stator support structure 109 using screws (not shown). The electromagnetic generator(EMG) stator subassembly 119 is composed of individual coils of conductive wire housed within a substrate of non-conductive material shaped into a disk. Because of the variety of conventional designs of electromagnetic generators, each based upon specific applications, the size, number, and orientation of the individual coils are not addressed within this specification. The only requirement is that an electrical current be induced within these coils when they are in close proximity to a source of magnetic field that is moving with some relative velocity with respect to the coils. A plurality (three in this example) of electromagnetic generator(EMG) stator subassemblies 119 are mounted to generator stator support structure 109 at the three lower sets of horizontal mounting stubs using screws (not shown).

Figure 17:
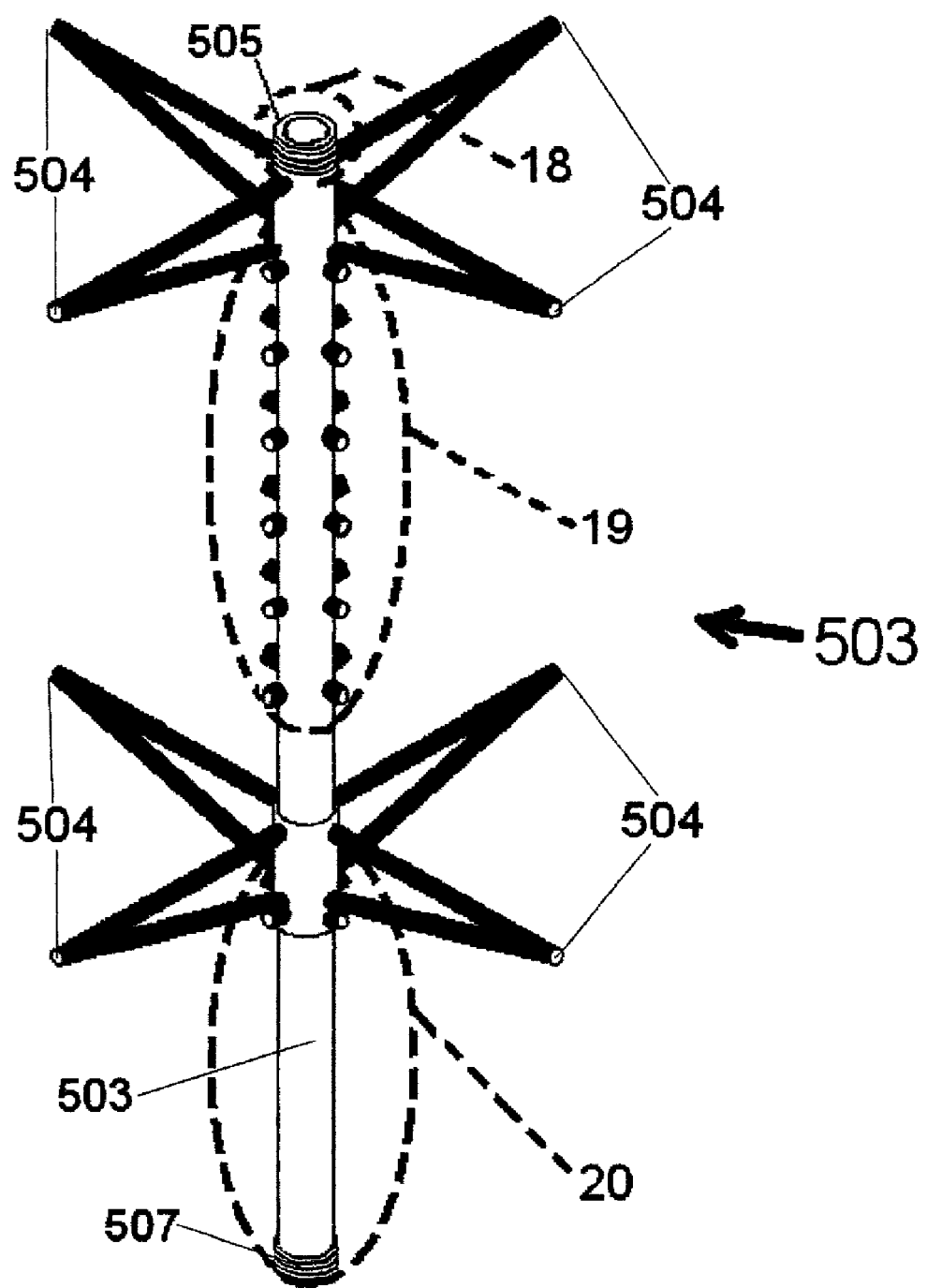
FIG. 17 shows a perspective view of the inner rotor hub structure.

FIG. 17 shows a perspective view of inner rotor hub structure 503. The inner rotor hub structure 503 is composed of a single piece of non-conductive material with conductive anemometer electrical interface sliprings 505 and power transfer/external communication sliprings 507 mounted to the top and bottom of the structure respectively with suitable adhesive. The inner rotor hub structure 503 has two sets of four horizontal beams emanating from the hub structure at 90 degree points of its outer circumference. In addition to these two sets of beams, there are another two sets of beams emanating from the hub structure slightly lower down and extending outward and upward to connect with the ends of the aforementioned horizontal beams to form structures better able to carry vertical loads. At the ends of all the aforementioned horizontal beams there are holes drilled to accept screws (not shown). These points are identified as inner rotor-to-outer rotor connection points 504. At its core inner rotor hub structure 503 is comprised of a hollow cylinder whose inside diameter allows for concentric mounting of inner rotor hub structure 503 around the outside diameter of support structure for static assembly 102.

Figure 18:
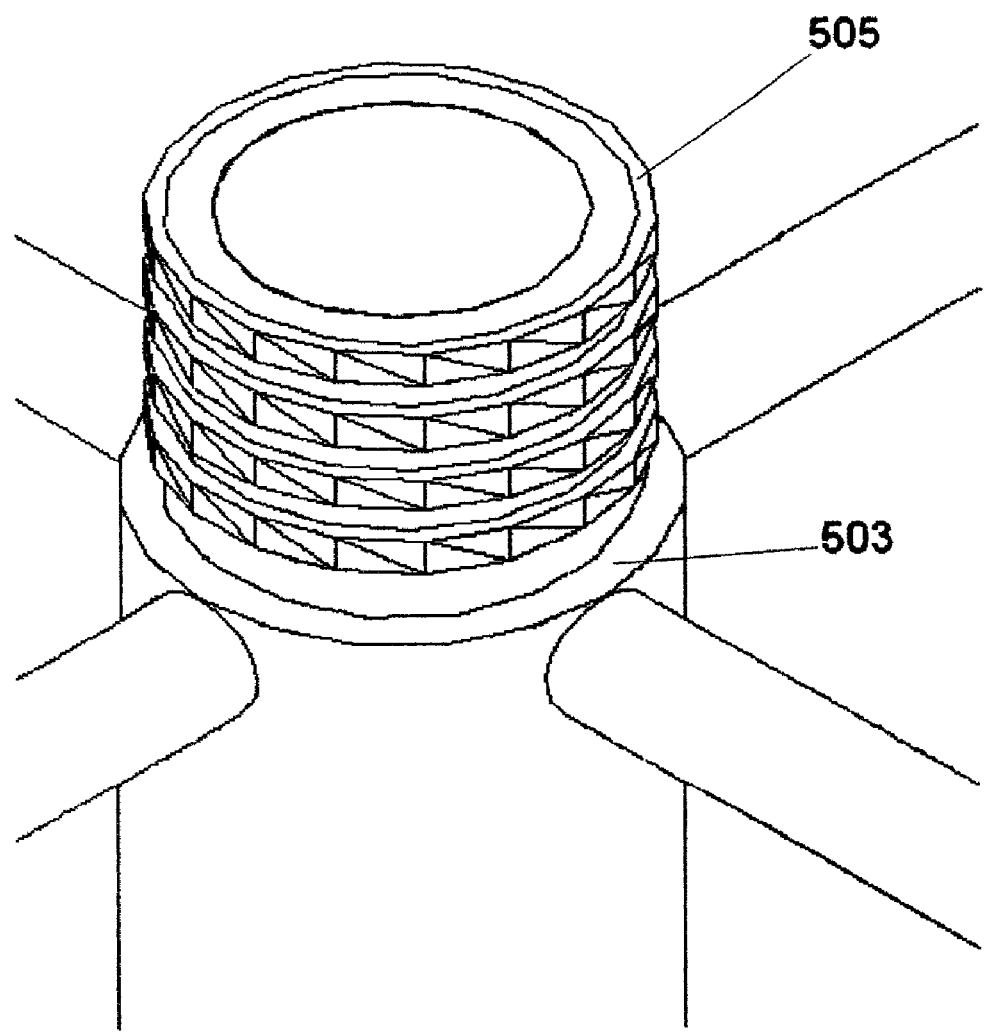
FIG. 18 shows an enlarged view of the top section of the inner rotor hub structure.

FIG. 18 shows an enlarged view of the top section of inner rotor hub structure 503. This view details anemometer electrical interface sliprings 505.

Figure 19:
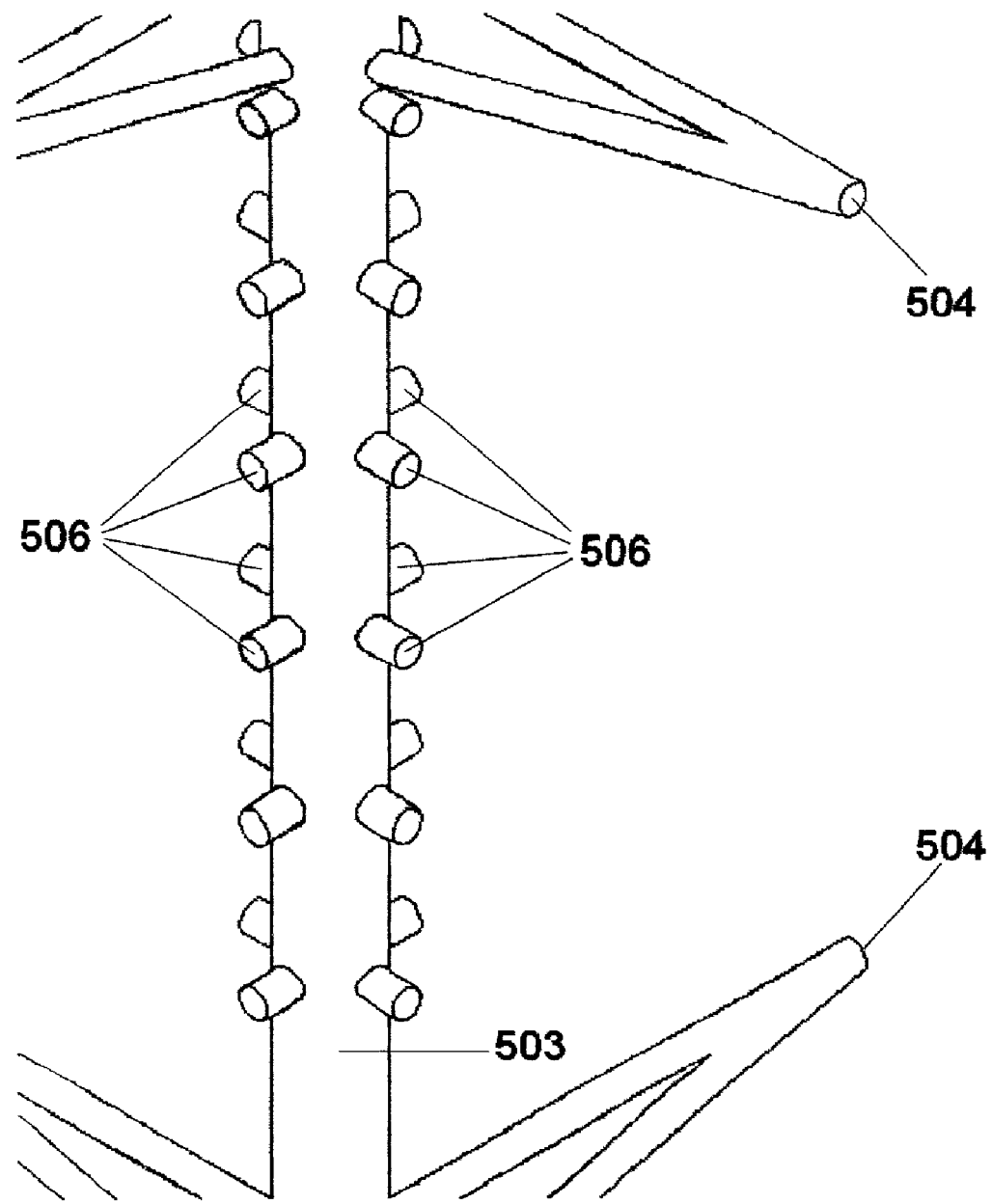
FIG. 19 shows an enlarged view of the middle section of the inner rotor hub structure.

FIG. 19 shows an enlarged view of the middle section of inner rotor hub structure 503. This view details the plurality (24 in this example) of mass shifter connection receptacles 506. The typical mass shifter connection receptacle 506 is formed into a hollow horizontal cylinder that will accept and secure one end of a mass shifter subassembly (FIG. 21,Ref.509).

Figure 20:
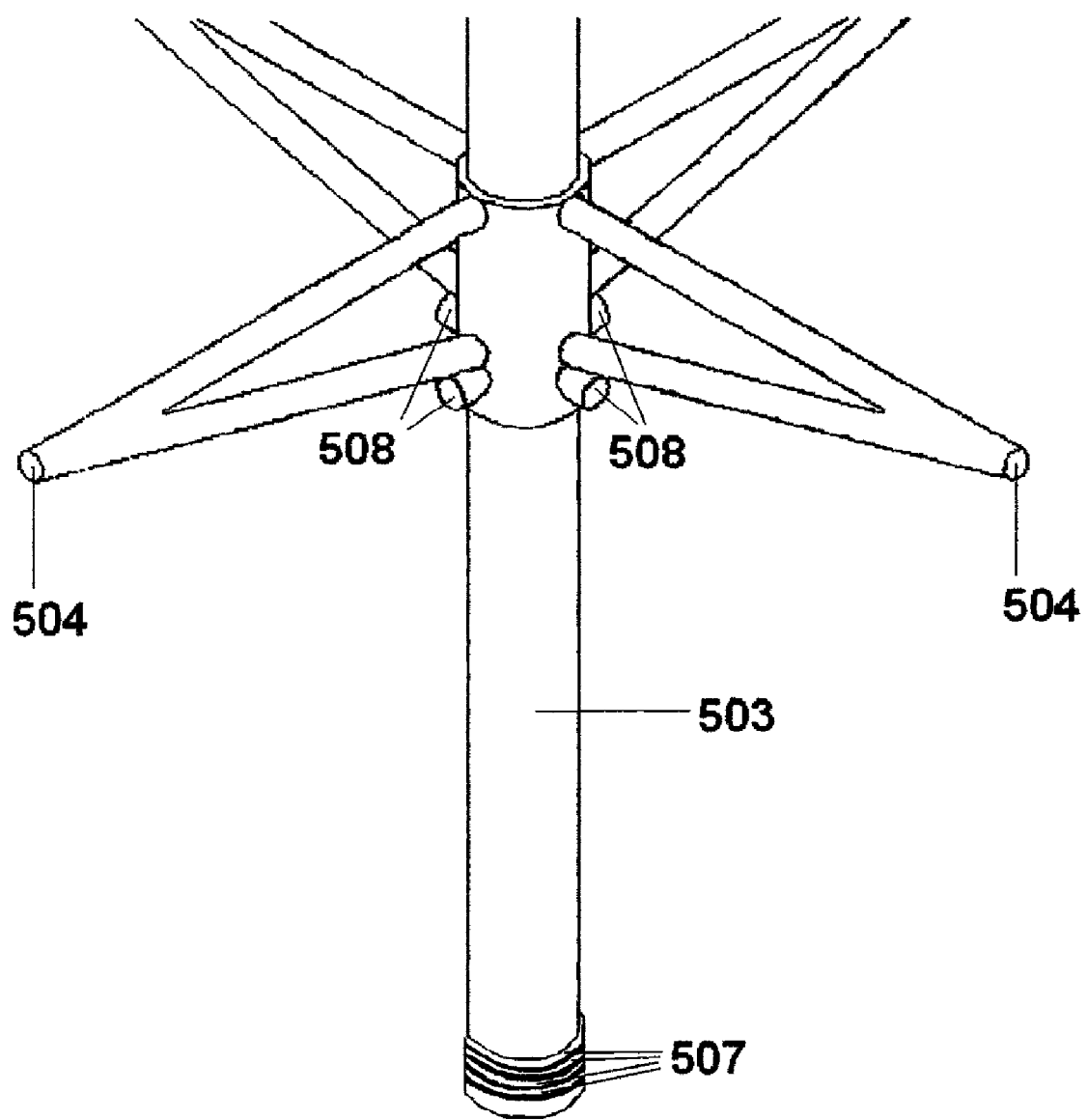
FIG. 20 shows an enlarged view of the bottom section of the inner rotor hub structure.

FIG. 20 shows an enlarged view of the bottom section of inner rotor hub structure 503. This view details power transfer/external communication sliprings 507, and the plurality (four in this example) of PMG actuator flyweight housing connection receptacles 508. The typical PMG actuator flyweight housing connection receptacle 508 is formed into a hollow horizontal cylinder that will accept and secure one end of a PMG actuator flyweight housing (FIG. 21,Ref.528).

FIG. 21 shows a perspective view of inner rotor subassembly 502. This view details a plurality (24 in this example) of mass shifter subassemblies 509, a control module 511, a PMG rotor subassembly 513, a plurality (four in this example, three are shown in view) of PMG actuator flyweight housings 528, and a plurality (four in this example) of EMG rotor subassemblies 515. Mass shifter subassemblies 509 are mounted to inner rotor hub structure 503 through insertion into mass shifter connection receptacles (FIG. 19,Ref.506). Control module 511 is comprised of electrical components mounted within an environmentally sealed chassis. The bottom of control module 511 has channels which allow it to conform to the lower set of horizontal support beams of inner rotor hub structure 503. The top of control module 511 is secured to inner rotor hub structure 503 with control module mounting collar 512 and screws (not shown). PMG rotor subassembly 513 is composed of individual coils of conductive wire housed within a substrate of non-conductive material shaped into a disk. Because of the variety of conventional designs for permanent magnet generators, each based upon specific applications; the size, number, and orientation of the individual coils are not addressed within this specification. The only requirement is that an electrical current be induced in these coils when they are in close proximity to a source of magnetic field and have some relative velocity with respect to this magnetic field. EMG rotor subassemblies 515 are composed of individual electromagnets housed within a non-conductive, non-ferromagnetic substrate shaped into a disk. Because of the variety of conventional designs for electromagnetic generators, each based upon specific applications; the size, number, and orientation of the individual electromagnets are not addressed within this specification. The only requirement is that the electromagnets contained within EMG rotor subassemblies 515 create magnetic fields which will induce electrical currents in windings of conductive wire contained within a structure placed in close proximity to and having some relative velocity with respect to the magnetic fields created.

FIG. 22 shows a perspective view of a typical mass shifter subassembly 509, with inner rotor hub connection oriented toward viewer. This view introduces the features of a mass shifter outer structure 517 which is composed of a hollow cylindrical body with integral impellor vanes formed on one end. The composition of mass shifter outer structure 517 has no restriction other than that of rigidity.

FIG. 23 shows an enlarged view of typical mass shifter subassembly 509 with inner rotor hub connection end featured. This view details a mass shifter outer structure 517, mass shifter outer structure guide channels 518, a mass shifter motor housing(stator) 519, a mass shifter motor rotor 521, and mass shifter electrical interface pins 522. Mass shifter electrical interface pins 522 facilitate the extension of power to mass shifter motor housing(stator) 519 as well as serving as a conduit for an electrical signal between a mass shifter home position detection component (FIG. 25,Ref.523) and control module (FIG. 21,Ref.511).

FIG. 24 shows a perspective view of a typical mass shifter subassembly 509 with outer rotor hub connection oriented toward viewer.

FIG. 25 shows an enlarged partial sectional view of a typical mass shifter subassembly 509. The top half of mass shifter outer structure 517 has been removed in this view in order to detail the internal components. This view details mass shifter motor housing(stator) 519, mass shifter motor housing guide key 520, mass shifter motor rotor 521, a shifting mass home position detector 523, a shifting mass 525, shifting mass guide keys 526, and a mass shifter drive shaft 527. Mass shifter motor housing(stator) 519 and mass shifter motor rotor 521 together form a simple direct current motor. The motor is inserted into mass shifter outer structure 517 with guide key 520 meshing into mass shifter outer structure guide channel (FIG. 23,Ref.518). The motor housing is held in place using a suitable adhesive. Mass shifter drive shaft 527 is connected to mass shifter motor rotor 521 using set screws (not shown). Mass shifter drive shaft 527 is a threaded rod that is supported on one end by connection to mass shifter motor rotor 521 and supported on the other end by being threaded through the hollow cylindrical shifting mass 525. Shifting mass 525 is composed of a dense material, such as lead, that is shaped into a hollow cylinder with end caps having threaded holes of the same diameter and thread pitch as mass shifter drive shaft 527. Shifting mass 525 is threaded onto mass shifter drive shaft 527 with shifting mass guide keys 526 meshing into mass shifter outer structure guide channel (FIG. 23,Ref.518). Shifting mass home position detector is composed of a non-conductive material shaped into disk with the outside diameter being inserted into a channel cut into and extending around the inner circumference of mass shifter outer structure 517 and held in place with a suitable adhesive. Shifting mass home position detector 523 has a hole in the center of its disk to allow for clearance of mass shifter drive shaft 527. Mounted on the side of shifting mass home position detector 523 nearest shifting mass 525 are two metallic switch contacts that facilitate a closed electrical circuit path when a metallic end cap of shifting mass 525 makes simultaneous contact with both.

FIG. 26 shows a perspective view of two typical mass shifter subassemblies 509.

FIG. 27A shows a right side orthogonal sectional view of a typical mass shifter subassembly 509 detailing a view of shifting mass 525 in the fully extended position along the longitudinal axis of mass shifter drive shaft 527.

FIG. 27B shows a right side orthogonal sectional view of a typical mass shifter subassembly 509 detailing a view of shifting mass 525 in the fully retracted position along the longitudinal axis of mass shifter drive 527.

FIG. 28 shows an enlarged sectional view of the mass shifting mechanism of a typical mass shifter subassembly 509. This view details mass shifter outer structure 517, mass shifter motor housing (stator) 519, mass shifter motor housing guide keys 520, mass shifter motor rotor 521, mass shifter electrical interface pins 522, shifting mass home position detector 523, shifting mass guide keys 526, and mass shifter drive shaft 527.

FIG. 29A shows a front side orthogonal enlarged sectional view of the permanent magnet generator(PMG) actuator mechanism in the disengaged position. Because of the inherent symmetry of the configuration of inner rotor subassembly 502, this same depiction could serve as the right, rear, or left side orthogonal enlarged sectional view as well. This view introduces the details of the plurality (4 in this example, 2 are shown in view) of the following components, PMG actuator flyweight housings 528, PMG actuator flyweights 529, PMG actuator flyweight stops 530, PMG actuator flyweight pulleys 531, PMG actuator drive cables 533, PMG actuator drive cable-to-rotor attachment rings 535, PMG actuator radial alignment wheels 537, PMG actuator disengagement springs 539, PMG actuator rotor-to-disengagement spring attachment rings 540, and PMG actuator disengagement spring-to-inner rotor hub attachment rings 541.

A typical PMG actuator flyweight housing 528 is composed of any rigid material formed into a hollow cylinder with a closed bulkhead near one end. A hole is drilled through this bulkhead to form the structure identified as PMG actuator flyweight stop 530. The PMG actuator flyweight drive cable 533 passes through the hole afforded in the PMG actuator flyweight stop 530. A typical PMG actuator flyweight 529 is composed of a dense material, such as lead, that is formed into a solid cylindrical shape whose outside diameter is such so as to allow unimpeded movement along the longitudinal axis of and inside a typical PMG flyweight housing 528. A typical PMG actuator flyweight pulley 531 is composed of a material that will resist abrasive erosion of its circumferential surface and shaped so that it affords a "V" shaped surface on its circumferential face to allow correct tracking of PMG actuator drive cable 533. A typical PMG actuator pulley 531 revolves around an axle whose ends are inserted into the inner wall of PMG actuator flyweight housing 528. A typical PMG actuator drive cable 533 is composed of a non-elastic material and is used to connect PMG actuator flyweight 529 to PMG actuator drive cable-to-rotor attachment ring. 535. PMG actuator drive cable-to-rotor attachment ring 535 is composed of an eyebolt type component whose mounting shaft is screwed into the substrate on the top of PMG rotor 513. A typical PMG actuator rotor-to-disengagement spring attachment ring 540 is composed of an eyebolt type component whose mounting shaft is screwed into the substrate on the bottom of PMG rotor 513. A typical PMG actuator disengagement spring 539 is connected between a typical rotor-to-disengagement ring 540 and a typical PMG actuator disengagement spring-to-rotor hub attachment ring 541. A typical PMG actuator disengagement spring-to-rotor hub attachment ring 541 is composed of an eyebolt type component whose mounting shaft is screwed into the substrate of inner rotor hub structure 503.

A more detailed examination of PMG rotor subassembly 513 reveals that it is comprised of three formations. PMG rotor subassembly 513 has an aforementioned main disklike structure with a hole in the center and emanating vertically from the inside diameter of the main disk is a hollow cylinder with a smaller disk like structure mounted to the top of it. The entire PMG rotor subassembly 513 encircles inner rotor hub structure 503. The inside diameter of PMG rotor subassembly 513 is such so as to allow clearance of inner rotor hub structure 503 in order to allow unimpeded movement up and down along the longitudinal axis of inner rotor hub structure 503. Fitted at 90 degree points of the outer circumference of the small cylinder structure of PMG rotor subassembly 513 are PMG rotor radial alignment wheels 537. The wheels are composed of an electrically conductive metal and are fitted so that their axles are secured within the walls of the small cylinder structure of PMG rotor subassembly 513. The diameter of PMG radial alignment wheels 537 are such so as to allow penetration into channels cut into the substrate of inner rotor hub structure 503 with the intent to limit radial movement between PMG rotor subassembly 513 relative to inner rotor hub structure 503, irregardless of the position of PMG rotor subassembly 513 along the longitudinal axis of inner rotor hub structure 503.

The channels in which PMG radial alignment wheels 537 travel are composed of electrically conductive metal inlaid into the substrate of inner rotor hub structure 503. The travel of PMG rotor subassembly 513 along the longitudinal axis of inner rotor hub structure 503 is limited in the lower (disengaged) position by PMG actuator flyweight stop 530. The travel of PMG rotor subassembly 513 along the longitudinal axis of inner rotor hub structure 503 is limited in the upper (engaged) position by the top of PMG rotor subassembly 513 contacting the larger diameter superstructure of inner rotor hub structure 503 as shown on FIG. 29B.

FIG. 30 shows a front side orthogonal view of inner rotor subassembly 502.

FIG. 31A shows an enlarged view of the PMG actuator mechanism shown in the disengaged position.

FIG. 31B shows an enlarged view of the PMG actuator mechanism shown in the engaged position.

FIG. 32 shows an enlarged view of the bottom section of inner rotor sub-assembly 502. This view details a typical electromagnetic generator(EMG) rotor mounting hub 516. A typical EMG mounting hub 516 is composed of a rigid material and serves to connect two EMG rotor subassemblies 515 to inner rotor hub structure 503 using screws (not shown).

FIG. 33 shows a perspective view of inner rotor subassembly 502 and static assembly 101 mounted together. The top and bottom of inner rotor hub structure 503 are connected to upper bearing for rotors assembly 105 and lower bearing for rotors assembly 111 respectively with screws (not shown).

FIG. 34A shows a front side orthogonal view of inner rotor subassembly 502 and static assembly 101 mounted together.

FIG. 34B shows an enlarged view depicting the physical positional relationship between PMG rotor subassembly 513 and PMG stator subassembly 117 when the PMG actuator mechanism is in the disengaged position.

FIG. 34C shows an enlarged view depicting the physical positional relationship between PMG rotor subassembly 513 and PMG stator subassembly 117 when the PMG actuator mechanism is in the engaged position.

FIG. 35 shows an enlarged view featuring power transfer/external communication sliprings 507 and power transfer/external communication pickups subassembly 113.

FIG. 36 shows a perspective view of outer rotor structure 543 and the installation details of mass shifter subassembly retention plates 545. Outer rotor structure 543 is composed of a rigid material formed into a hollow cylinder. Outer rotor structure 543 has a plurality (24 in this example) of voids formed in columns spaced at 90 degree points of its outer circumference. The dimensions of the voids in outer rotor structure 543 are such so as to allow insertion of the outer ends of mass shifter subassemblies (FIG. 21,Ref.509) through outer rotor structure 543. Mass shifter subassembly retention plates 545 are composed of a rigid material formed into plates having an inner surface with the same curvature as the outer circumference of outer rotor structure 543.

FIG. 37 shows a perspective view of outer rotor structure 543 with mass shifter subassembly retention plates 545 installed. Mass shifter subassembly retention plates are secured to outer rotor structure with screws (not shown).

FIG. 38 shows a perspective view of outer rotor structure 543 and sail support structural components. Introduced in this view are the components that comprise the sail support and retention structures to include a top longitudinal sail retention structure 547, a top radial sail retention structure 549, a top sail drive structure 551, a middle radial sail retention structure 553, a bottom sail drive structure 555, a bottom radial sail retention structure 557, and a bottom longitudinal sail retention structure 559. The top and bottom longitudinal sail retention structures (547 and 559 respectively) are composed of a rigid material shaped into rings. The top, middle, and bottom radial sail retention structures (549, 553, and 557 respectively) are composed of a rigid material shaped into rings with a plurality (36 in this example) of holes drilled through each structure along the middle circumference of each structure. The top and bottom sail drive structures (551 and 555 respectively) are composed of a rigid material shaped into rings with the outer circumference comprised of triangular-like features similar to those comprising a typical gear.

FIG. 39 shows a perspective view of outer rotor structure 543 and top sail support subassembly 561, middle radial sail retention structure 553, and bottom sail support subassembly 563. Top sail support subassembly 561 is formed by attaching top longitudinal sail retention structure 547, top sail drive structure 551, and top radial sail retention structure 549 together using screws (not shown). Bottom sail support subassembly 563 is formed by attaching bottom longitudinal sail retention structure 559, bottom sail drive structure 555, and bottom radial sail sail retention structure together using screws (not shown).

FIG. 40 shows a perspective view of outer rotor structure 543 with top sail support subassembly 561, middle radial sail retention structure 553, and bottom sail support subassembly 563 attached as shown using screws (not shown).

FIG. 41 shows a perspective view of a typical sail subassembly 565. The components that make up a typical sail subassembly 565 include a pivoting mast structure 567, an inner sail structure 569, a plurality (four in this example) of mast-to-sail connecting brackets 568, a middle sail structure 571, and an outer sail structure 573. Pivoting mast structure 567 is composed of any rigid material formed into a rod that is connected to inner sail structure 569 using mast-to-sail connecting brackets 568 and screws (not shown). Inner, middle, and outer sail structures (569, 571, and 573 respectively) are composed of a rigid material shaped into slats. Inner sail structure 569 should be thicker (by a multiple of three in this example) than middle and outer sail structures (571 and 573 respectively). The length of pivoting mast structure 567 is equal to the length of outer rotor structure (FIG. 38,Ref.543) minus some distance to allow for clearance to operate. In this example, this distance is equal to four times the thickness of top longitudinal sail retention structure (FIG. 38,Ref.547). The diameter of pivoting mast structure 567 is to be slightly less than that of the holes found in top, middle, and bottom radial sail retention structures (FIG. 38, Refs. 549, 553, and 557 respectively) to allow clearance to rotate freely within the holes.

FIG. 42 is an enlarged view of the top section of a typical sail subassembly 565. Inner sail structure 569 is connected to middle sail structure 571 using a sail connecting hinge 570. Middle sail structure 571 is connected to outer sail structure 573 using a sail connecting hinge 570.

FIG. 43 is a perspective view of outer rotor structure 543 with top and bottom sail support subassemblies (561 and 563 respectively) and middle radial sail support structure 553 installed. Also shown installed is a typical sail subassembly 565. Any typical sail subassembly 565 is attached by means of insertion of its pivoting mast structure 567 through top, middle, and bottom radial sail retention structures (FIG. 38, Refs. 549, 533, and 557 respectively). Pivoting mast structure 567 is limited in its travel longitudinally by means of both top and bottom longitudinal sail retention structures (FIG. 38, Refs. 547 and 559 respectively). Pivoting mast structure 567 is limited in its rotation radially by virtue of contact with the toothed features of top and bottom sail drive structures (FIG. 38, Refs.551 and 555 respectively).

FIG. 44 is a perspective view of outer rotor subassembly 573, showing its full complement (36 in this example) of sail subassemblies 565 installed.

FIG. 49A is a front side orthogonal view detailing the mounting of outer rotor subassembly 573 to inner rotor subassembly 502. Outer rotor subassembly 573 is fitted over inner rotor subassembly 502 and attached at inner rotor to outer rotor connection points (FIG. 17,Ref.504) using screws (not shown).

FIG. 49B shows a perspective view of rotors assembly 501 and static assembly 101 mounted together.

FIG. 50A shows a perspective view of a windshield support structure(WSS) 1009. Detailed within this view are WSS lateral spars 1011, WSS aft longitudinal spars 1013, WSS top frontal longitudinal spar 1015, WSS bottom frontal longitudinal spar 1016, WSS outer hub circumferential segments 1017, and WSS vertical support members 1018. Windshield support structure(WSS) 1009 is composed of the above-mentioned components connected together to form a cage-like structure. The details of the connections are shown in FIG. 51 and FIG. 52. The various WSS spars and vertical support members are composed of rigid material formed into cylinders. WSS outer hub circumferential segments 1017 are composed of semi-rigid material formed into cylinders pliable enough to form the 90 degree arc segments shown. FIG. 50A also shows an intake structure 1007. Intake structure 1007 is a single piece of rigid material formed into a funnel-like shape merging into a ducting tube whose path forms a 90 degree elbow.

FIG. 50B shows a perspective view of directional wind shield assembly 1001. Introduced within this view is a directional control structure 1003, and windshield 1005. Directional control structure 1003 consists of a single piece of rigid material formed into a flat planar surface that is secured to both windshield support structure(WSS) aft longitudinal spar 1013 with screws (not shown). Windshield 1005 is composed of a flexible material deployed along one-half the outer circumference of windshield support structure(WSS) and attached to the associated WSS vertical support members 1018 with screws (not shown). While windshield 1005 should be pliable enough to conform to the shape indicated, it should nevertheless be of sufficient rigidity to preclude undue deformation due to wind pressure being exerted upon it.

FIG. 51 is an enlarged view of a typical type-A junction of windshield support structure(WSS) 1009 components. This view details a connection facilitated by use of a WSS outer hub type-A connection fixture 1019. This connection is typical in all instances where WSS lateral spars 1011, WSS outer hub circumferential segments 1017, and WSS vertical support members 1018 are joined. This type connection is also employed in joining WSS outer hub circumferential segments 1017, WSS vertical support member 1018, and bottom longitudinal frontal spar 1016. All connections are facilitated by insertion of one end of a component into a WSS outer hub type-A connection fixture and secured with screws (not shown). WSS outer hub type-A connection fixture 1019 is composed of a single piece of rigid material.

FIG. 52 is an enlarged view of a typical type-B junction of windshield support structure(WSS) 1009 components. This view details a connection facilitated by use of a WSS outer hub type-B connection fixture 1020. This connection is typical in the instances where WSS aft longitudinal spars 1013, WSS outer hub circumferential segments 1017, and WSS vertical support members 1018 are joined This type connection is also employed in joining the WSS outer hub circumferential segments 1017, WSS vertical support member 1018, and the top longitudinal frontal spar 1015. Connections are facilitated either by insertion of one end of a component into a WSS outer hub type-B connection fixture 1020 (in the case of WSS vertical support members and WSS outer hub circumferential segments 1017), or by insertion through the WSS outer hub type-B connection fixture 1020 (in the case of WSS aft longitudinal spars 1013 and WSS top frontal longitudinal spar 1016). All connections are secured with screws (not shown). The WSS outer hub type-B connection fixture 1020 is composed of a single piece of rigid material.

FIG. 53 is an enlarged view of windshield support structure (WSS) top inner hub 1022. WSS top inner hub 1022 is composed of a single piece of rigid material formed into a cylinder open on one end and closed on the other with four smaller cylinders open at one end emanating at 90 degree points along its outer circumference as shown. The inner diameter of the larger cylinder structure of WSS top inner hub 1022 is such so as to allow installation over upper bearing for directional windshield assembly (FIG. 11,Ref.103). The inner diameter of the smaller cylinder structures is such so as to allow insertion into them of WSS lateral spars 1011, WSS aft longitudinal spar 1013, and WSS top frontal longitudinal spar 1015. All connections are secured with screws (not shown). Radiating from the bottom of the larger cylinder structure of WSS top inner hub 1022, is a horizontal beam supporting anemometer electrical interface pickups subassembly 1023. The anemometer electrical interface pickups subassembly 1023 consists of a plurality (four in this example) of metallic strips connected to a vertical mounting mast in such a fashion to form tightly wound coils with the free ends of the wound strips having in innate spring force inward toward the center of the longitudinal axis of the larger cylinder structure of WSS top inner hub 1022.

FIG. 54 is an enlarged view of an anemometer rotor sub-assembly 1024. Anemometer rotor subassembly 1024 is comprised of a single piece of rigid material formed into the shape of a central hub with shafts radiating outward containing cuplike structures on the outer ends of the shafts. The cups are all facing in the same direction so as to provide an assymetric profile to the wind in order to propel the cups around the center of the hub in a circular motion. The material of the anemometer rotor subassembly 1024 should be of such density to allow rotation at wind speeds as low as 5 miles per hour. Anemometer rotor subassembly 1024 is mounted on an anemometer support structure 1025 which rises vertically from the end of windshield support structure(WSS) top frontal longitudinal spar 1015. Anemometer support structure 1025 consists of a rigid material shaped into a hollow cylinder open on both ends. Anemometer support structure 1025 is inserted into a hole drilled into the top of WSS top frontal longitudinal spar 1015 and secured with a suitable adhesive.

FIG. 55 is an enlarged partial sectional view of the wind speed sensing mechanism. The hub of anemometer rotor subassembly 1024 is comprised of a hollow cylinder with rectangular standoffs 1035 emanating at 45 degree points along its inner circumference. These standoffs are of such length so as to pass between two sensor planes of a photoelectric sensor 1033. Photoelectric sensor 1033 is mounted to anemometer support structure 1025 using a suitable adhesive.

FIG. 56 is an enlarged view of the top of intake structure 1007. Intake structure 1007 is mounted to windshield support structure(WSS) lateral spars 1011, WSS bottom frontal longitudinal spar 1016, and WSS aft longitudinal spar 1013 using intake-to-WSS mounting collars 1036 and secured with screws (not shown).

FIG. 57 is an enlarged view of windshield support structure (WSS) bottom inner hub 1037. WSS bottom inner hub 1037 is composed of a single piece of rigid material formed into a cylinder open on both ends with four smaller cylinders open at one end radiating at 90 degree points along its outer circumference. The inner diameter of the larger cylinder structure of WSS bottom inner hub 1037 is such so as to allow installation over lower bearing for directional windshield assembly (FIG. 11 Ref.115). The inner diameter of the smaller cylinder structures is such so as to allow insertion into them of WSS lateral spars 1011, WSS aft longitudinal spar 1013, and WSS bottom frontal longitudinal spar 1015. All connections are secured with screws (not shown).

FIG. 58 is a right side orthogonal view of directional windshield assembly 1001.

FIG. 59 is an enlarged view of the bottom of intake structure 1007. Detailed in this view is the mounting connection of intake structure 1007 to support structure for static assembly 102. This connection is made by mounting intake structure 1007 to bearing for intake structure 107 using screws (not shown).

FIG. 60 is an enlarged view detailing the installation of anemometer rotor sub-assembly 1024 to anemometer support structure 1025. Anemometer rotor sub-assembly 1024 contains an anemometer rotor shaft 1038 with two anemometer rotor shaft bearings 1039 mounted of the shaft. The entire anemometer rotor subassembly 1024 is inserted into the hollow space of anemometer support structure 1025 and held in place by virtue of friction between the outer races of anemometer rotor shaft bearings 1039 against the inner walls of anemometer support structure 1024.

FIG. 61 is an enlarged view featuring anemometer electrical interface sliprings 505 and anemometer electrical interface pickups subassembly 1023.

Operation—FIGS. 1, 1A, 8, 9, 19, 21, 25, 27B, 28, 29A, 29B, 31B, 34A, 34B, 34C, 35, 44, 45, 46, 47, 48, 50B, 55, 58, 60, 61, 62

At the onset of wind a directional windshield assembly (FIG. 1,Ref.1001) is rotated about the static assembly (FIG. 1,Ref.101) so that an intake structure (FIG. 58,Ref.1007) is oriented with its funnel opening into the wind. This action is caused by the forces of the wind acting upon a directional control structure (FIG. 58,Ref.1003) to position the control structure downwind in the same manner as a common weathervane. Simultaneous to the above action the onset of wind also causes sail subassemblies (FIG. 44,Ref.565) to exert rotational forces on outer rotor subassembly (FIG. 44,Ref.573). Because of the articulated construction of the sail subassemblies (FIGS. 45-48,Ref.565) they are predisposed to cause the outer rotor subassembly (FIG. 44,Ref.573) to rotate in a counterclockwise direction when viewed from above (FIG. 45,46). The abovementioned predisposition for counterclockwise rotation is further enhanced by the position of a windshield (FIG. 50B,Ref.1005) being oriented such that the wind is blocked from those sail subassemblies (FIG. 44,Ref.565) advancing into the wind, thus alleviating the resultant clockwise rotational forces associated with those advancing sails contacting the force of the wind. Further counterclockwise rotational forces are produced as a result of the wind flow through the intake structure (FIG. 58,Ref.1007) being directed against impellor vanes of the mass shifter outer structures (FIG. 21,Ref.509) of inner rotor subassembly (FIG. 21,Ref.502).

When the rotors assembly (FIG. 9) reaches a predetermined rotational velocity, the centrifugal forces acting upon the permanent magnet generator(PMG) actuator flyweights cause them to move from the disengaged position (FIG. 29A, Ref.529) to the engaged position (FIG. 29B,Ref.529). This results in the movement of the PMG rotor subassembly from the disengaged position (FIG. 34B,Ref.513) to the engaged position (FIG. 34C,Ref.513). When the PMG rotor subassembly (FIG. 34C,Ref.513) is in the engaged position, the air gap between it and the PMG stator subassembly (FIG. 34C, Ref.117) is sufficiently small enough to cause the magnets contained within the PMG stator subassembly to induce current flow in the coils contained within the PMG rotor subassembly. The delayed actuation of the permanent magnet generator allows the rotors assembly (FIG. 9) to reach a predetermined rotational velocity before the opposing counter force associated with magnetic field interaction between the PMG rotor subassembly (FIG. 34C,Ref.513) and PMG stator subassembly (FIG. 34C,Ref.117) is introduced. By having some kinetic energy present in the rotating rotors assembly (FIG. 9) before permanent magnet generator actuation the overall efficiency of the apparatus is improved by virtue of a faster spool up time of the rotors assembly.

The AC voltage produced by the permanent magnet generator(PMG) is conducted through wires (not shown) within the PMG rotor subassembly (FIG. 34C,Ref.513) to conductive PMG rotor radial alignment wheels (FIG. 31B,Ref.537). These wheels make contact with conductive surfaces (not shown) found on the inner rotor structure (FIG. 29B, Ref.503). The AC voltage is conducted from these surfaces on the inner rotor structure (FIG. 29B,Ref.503) with wires (not shown) to the control module (FIG. 34B, Ref.511). FIG. 62, Ref. 2006 depicts this AC voltage being introduced to the control module and serving as an input to control module DC supply (FIG. 62,Ref.2007) and also serving as an input to PMG speed detector circuit (FIG. 62,Ref.2002).

The control module DC supply (FIG. 62,Ref.2007) receives the AC voltage input then rectifies, filters, and regulates it into a DC voltage. This DC voltage is used throughout the control module (FIG. 34B,Ref.511) and is labeled throughout FIG. 62 as Vcdc-Hi and Vcdc-Lo. This DC voltage is used to provide power to all logic devices throughout the control module (FIG. 34B,Ref.511), to serve as a stimulus voltage for the wind speed photoelectric sensor (FIG. 55,Ref.1033), and to provide power to mass shifter voltage amplifiers (FIG. 62,Refs.2013, 2014) and Ipmg current amplifier (FIG. 62, Ref. 2008).

Once the DC voltage reaches a preset level, the controller application specific integrated circuit (ASIC) (FIG. 62,Ref.2005) initializes itself and begins to perform power up housekeeping functions such as resetting the wind speed counter (FIG. 62, Ref.2003) and PMG speed counter (FIG. 62,Ref.2004). Another power up housekeeping function performed by the controller ASIC (FIG. 62,Ref.2005) is to read the position signals for all mass shifters (FIG. 28,Ref.523) to determine if all shifting masses are at their fully retracted positions (FIG. 27B,Ref.525). If any shifting masses are not fully retracted then the controller ASIC (FIG. 62,Ref.2005) produces the correct polarity drive signals to the appropriate amplifiers (FIG. 62,Refs. 2013, 2014) to drive the shifting masses toward the fully retracted positions.

The fully retracted position of any shifting mass (FIG. 28,Ref.525) is attained by driving mass shifter motor rotor (FIG. 28,Ref.521) in the direction to move the shifting mass (FIG. 28,Ref.525) toward the shifting mass home position detector (FIG. 28, Ref.523). Once the shifting mass (FIG. 28,Ref.525) makes contact with the two electrical contacts of the shifting mass home position detector (FIG. 28,Ref.523) an electrical circuit is closed. A shifting mass detection circuit originates as the signal MASS SHIFTER POSITION OUT from the control module (FIG. 21,Ref.511) and is conducted using wires (not shown) to the electrical contacts (not shown) found within a mass shifter connection receptacle (FIG. 19,Ref.506). The signal is propagated onto the mass shifter electrical interface pins (FIG. 28,Ref.522) by virtue of their insertion into the aforementioned contacts of the mass shifter connection receptacle. The circuit continues via wires (not shown) from mass shifter electrical interface pins (FIG. 28, Ref.522) to the shifting mass home position detector (FIG. 28,Ref.523) electrical contacts with the shifting mass (FIG. 28,Ref.525) providing the ultimate circuit closure through its conductive material. The circuit returns to control module (FIG. 21, Ref.511) by retracing the abovementioned path to be input as the signal MASS SHIFTER POSITION READ (FIG. 62). The last function performed by controller ASIC (FIG. 62, Ref.2005) upon power up is to read the voltage across Ipmg current sense resistor (FIG. 62,Ref.2011) to ensure that there is no current flow out of Ipmg current amplifier (FIG. 62,Ref.2008). If there is current flow, the signal Ipmg CONTROL from controller ASIC (FIG. 62,Ref.2005) is used as an input to Ipmg current amplifier (FIG. 62,Ref.2008) to adjust its output to zero.

After all power up functions have been completed, the controller ASIC (FIG. 62, Ref.2005) begins to monitor the wind speed sensor output (FIG. 62,Ref.2001). Both DC power and wind speed sensor output signals travel between controller ASIC (FIG. 62,Ref.2005) and wind speed photoelectric sensor (FIG. 55,Ref.1033) via wires (not shown) from control module (FIG. 21,Ref.511) to anemometer electrical interface sliprings (FIG. 61,Ref.505). An electrical connection is then made by contact between the sliprings (FIG. 61,Ref.505) and pickups (FIG. 61,Ref.1023) of the anemometer electrical interface. The final connection path is completed between anemometer electrical interface pickups (FIG. 61,Ref.1023) and wind speed photoelectric sensor (FIG. 55,Ref.1033) via wires (not shown) routed through the hollow structures of windshield support structure(WSS) top frontal longitudinal spar (FIG. 60,Ref.1015) and anemometer support structure (FIG. 60,Ref.1025). The output of the wind speed photoelectric sensor is depicted on FIG. 62 as a square wave pulse train which is routed to the input of wind speed counter (FIG. 62,Ref.2003). The frequency of the sensor output is directly proportional to wind speed, i.e. the faster the wind speed the higher the frequency of the output pulses. The wind speed counter (FIG. 62,Ref.2003) is started, stopped, its output sampled, and reset under real time control of the controller ASIC (FIG. 62,Ref.2005).

The AC output of permanent magnet generator(PMG) (FIG. 62,Ref.2006) is also used to provide an input to PMG speed detector circuit (FIG. 62,Ref.2002). This circuit contains components that together form a zero crossing detector and pulse shaper and is designed to take the AC waveform input and produce a square wave output at the same frequency as the input. This output is depicted on FIG. 62 as a square wave pulse train that is routed to the input of PMG speed counter (FIG. 62,Ref.2004). The frequency of the output signal from PMG speed detector circuit is directly pro-portional to the rotational velocity of rotors assembly (FIG. 1,Ref.501), i.e. the faster the rotors assembly rotates, the higher the frequency of the output pulses. PMG speed counter is started, stopped, its output sampled, and reset under real time control of controller ASIC (FIG. 62,Ref.2005).

Once samples of the wind speed have been obtained from the wind speed counter, (FIG. 62,Ref.2003) the controller ASIC (FIG. 62,Ref.2005) performs an access to an internal memory using an averaged value of the wind speed as an address to obtain the optimum mass shifter positional profile data for that particular wind speed. The optimum profile is compared with the actual positional configuration of the shifting masses (FIG. 25,Ref.525) and a delta value is computed. If the delta value indicates that the actual position of the shifting masses (FIG. 25,Ref.525) should be more toward the center of the rotors assembly (FIG. 1,Ref.501), then the controller ASIC (FIG. 62,Ref.2005) produces a drive signal to the appropriate shifting masses in the polarity necessary to drive the mass shifter motor rotor (FIG. 25,Ref.521) in the proper rotational direction to cause the mass shifter drive shaft (FIG. 25,Ref.527) to move the shifting mass (FIG. 25,Ref.525) more toward the desired direction. If the delta value indicates that the actual position of the shifting masses (FIG. 25,Ref.525) should be more away from the center of the rotors assembly (FIG. 1,Ref.501), then the correct polarity drive signal is produced in order for the abovementioned actions to move the shifting masses (FIG. 25,Ref.525) farther from the center. The actual positions of the shifting masses (FIG. 25,Ref.525) are kept within the controller ASIC (FIG. 62, Ref.2005) using internal shift registers, one for each shifting mass, that are initialized upon power up and clocked up or down with subsequent drive pulses to each mass shifter motor housing(stator) (FIG. 25,Ref.519). This results in an instantaneous approximation of each shifting mass position using the product obtained by multiplying the value of the shift register with the constant distance represented by the typical shifting mass displacement achieved by the application of one drive pulse. The drive signals are depicted as outputs from the controller ASIC (FIG. 62,Ref.2005) and applied as inputs to mass shifter drive amplifiers (FIG. 62,Refs. 2013,2014) where they are output as the signals MASS SHIFTER DRIVE HI/RTN and MASS SHIFTER DRIVE RTN/HI respectively.

The physical connections for mass shifter drive signals are routed via wires (not shown) from control module (FIG. 21,Ref.511) to the electrical contacts (not shown) found within mass shifter connection receptacles (FIG. 19,Ref.506). The mass shifter drive signals are then further propagated onto the mass shifter electrical interface pins (FIG. 28,Ref.522) by virtue of their insertion into the aforementioned contacts of the mass shifter connection receptacles (FIG. 19,Ref.506). The two mass shifter electrical interface pins associated with a typical pair of mass shifter drive signals are physically adjoined to the mass shifter motor housing (stator) (FIG. 25,Ref.519) and electrically connected to the stator winding found therein. As a result of the connections described above, any drive pulse from the controller ASIC (FIG. 62,Ref.2005) will be amplified and applied across the associated mass shifter motor housing(stator) (FIG. 25,Ref.519) winding resulting in a magnetic rotational force being exerted upon the mass shifter motor rotor (FIG. 25,Ref.521) causing it to rotate and in turn causing the mass shifter drive shaft (FIG. 25,Ref.527) to rotate.

Once samples of the permanent magnet generator(PMG) rotor (FIG. 34,Ref.513) speed have been obtained from the PMG speed counter (FIG. 62,Ref.2004) the controller ASIC (FIG. 62,Ref.2005) performs a calculation of the kinetic energy of the rotating rotors assembly (FIG. 1,Ref.501) by multiplying the rotors assembly rotational velocity by its moment of inertia. The moment of inertia of the rotors assembly (FIG. 1, Ref.501) will be known because the mass of the rotors assembly is a known constant and the geometrical configuration of this mass is known because the positions of all shifting masses (FIG. 25,Ref.525) are also known by means described above. Once a calculation of kinetic energy is obtained, the controller ASIC (FIG. 62, Ref.2005) uses this value as an address into internal memory to obtain data reflecting the optimum current value to be output from Ipmg and Iemg current amplifiers (FIG. 62, Refs.2008 and 2009 respectively). This data is used to generate inputs to the above-mentioned current amplifiers whose outputs are used to drive coils associated with the electromagnets found on the electromagnetic generator(EMG) rotor subassemblies (FIG. 34A,Ref.515). The outputs from both current amplifiers are measured by applying the voltages developed across the Ipmg and Iemg sense resistors (FIG. 62,Refs.2011 and 2012 respectively) to analog-to-digital converters internal to controller ASIC (FIG. 62,Ref.2005) and comparing the resultant digital outputs of the converters to the optimum values stored in memory internal to controller ASIC. The inputs to current amplifiers Ipmg and Iemg (FIG. 62,Refs.2008 and 2009 respectively) are adjusted accordingly until the measured current output values are equal to the optimum values.

The output of Ipmg current amplifier (FIG. 62,Ref.2008) is derived from the power supplied from control module DC supply (FIG. 62,Ref.2007). The output of Iemg current amplifier (FIG. 62,Ref.2009) is derived from the power supplied from the electromagnetic generator(EMG) main DC supply (FIG. 62,Ref.2010). The output of Ipmg current amplifier (FIG. 62,Ref.2008) must be used first to generate magnetic fields surrounding its respective coils found on the electromagnetic generator rotor subassemblies (FIG. 34A, Ref.515). This action leads to a production of AC voltages from the respective stator windings found on the electromagnetic generator stator subassemblies (FIG. 34A,Ref.119). These AC voltages are depicted as inputs to EMG main DC supply (FIG. 62,Ref.2010) which are rectified, filtered, regulated, and output as DC voltage labeled Vmain DC-HI and Vmain DC-LO. This Vmain DC output is used by Iemg current amplifier to generate magnetic fields surrounding its respective coils found on the electromagnetic generator (EMG) rotor subassemblies (FIG. 34A, Ref.119). These AC voltages are in common with those already generated by the action of the coils associated with the Ipmg current amplifier (FIG. 62,Ref.2008) and are additive in nature to those above-mentioned AC voltages and are applied as inputs to EMG main DC supply (FIG. 62,Ref.2010). The current generated by voltages produced by the permanent magnet generator is used to indirectly flash the coils of the electromagnets associated with the electromagnetic generator(EMG) rotor subassemblies (FIG. 34A,Ref.515). Once the electromagnetic generator starts producing AC voltage, a portion of the output of EMG main DC supply (FIG. 62, Ref. 2010) can in turn be used to power Iemg current amplifier (FIG. 62,Ref.2009), in order to provide self-sustaining current to the associated electromagnets found on the electromagnetic generator rotor subassemblies (FIG. 34A,Ref.515). That portion of power from EMG main DC supply (FIG. 62,Ref.2010) not used to supply the Iemg current amplifier (FIG. 62,Ref.2009) is the power that is available to supply external loads. For example, an inverter to be used to produce power at the prevailing local AC voltage and frequency, capable of being synchronized to the local grid or used to provide standalone service.

That portion of power from EMG main DC supply (FIG. 62,Ref.2010) used to supply Iemg current amplifier (FIG. 62,Ref.2009) is transmitted via wires (not shown) from EMG main DC supply (FIG. 8,Ref.106) to a pair of power transfer pickups (FIG. 35, Ref.113). The two conductors are propagated via contact between power transfer/external communication pickups (FIG. 35,Ref.113) and the associated power transfer/external communication sliprings (FIG. 35,Ref.507). The power is then conducted from. the pair of power transfer/external communication sliprings (FIG. 35,Ref.507) via wires (not shown) to control module (FIG. 34B,Ref.511). The outputs of Ipmg and Iemg current amplifiers (FIG. 62, Refs. 2008 and 2009 respectively) are routed via wires (not shown) from control module (FIG. 34B, Ref.511) to electromagnetic generator(EMG) rotor subassemblies (FIG. 34A,Ref. 515).

A pair of pickups found on power transfer/external communication pickups (FIG. 35, Ref. 113) and a pair of sliprings found on power transfer/external communication sliprings (FIG. 35,Ref.507) are used to provide a path for connection of two wires from control module (FIG. 34B,Ref.511) to an external jack (not shown) mounted on static assembly (FIG. 1,Ref.101). These wires are depicted on FIG. 62 as EXTERNAL COMM HI and EXTERNAL COMM LO and are used to facilitate a connection point for external test and monitoring devices.

Although the description above contains many specificities, these should not be construed as limiting the scope of the invention but as merely providing illustration of an embodiment of this invention.

Thus the scope of the invention should be determined by the appended claims and their legal equivalents, rather than by the examples given.

I claim:

1. A device that transforms the kinetic energy inherent in wind into kinetic energy in the form of mechanical rotation of a mass such that the maximum angular velocity attainable of said rotating mass for a given wind speed is obtained in the minimum time possible through the use of mechanical means comprising:
    (a) a rigid shaft anchored to the earth or some fixed structure so that its orientation is such that its longitudinal axis is approximately vertical and having a plurality of cylindrical bearings attached so that the inner races of said bearings are affixed to the shaft with the outer races of said bearings allowed to rotate freely concentrically about the longitudinal axis of the shaft
    (b) a hollow cylindrical structure serving as an outer rotor and another hollow cylindrical structure smaller in diameter serving as an inner rotor with the two connected to each other by a plurality of radial support structures serving as spokes between them with the inner rotor being attached to said rigid shaft via connection to a plurality of said outer races of said bearings
    (c) a plurality of rigid planar surfaces attached to the outside circumference of the outer rotor to form a plurality of sails which when impacted by incident wind will exert a torque upon the outer rotor tangentially to cause the collective rotating mass of sails, cylinders, spokes, and outer bearing races to rotate about the longitudinal axis of said rigid shaft
    (d) a windshield support structure comprised of a pair of identical circular structures with each having an outer circumferential structure connected to an inner hub by plurality of radial support structures serving as spokes between them with both said circular structures arranged so that the planar area bounded by each circle is oriented horizontally with the two structures some distance apart from each other vertically and being joined together with a plurality of vertical support members with the entire assemblage forming a cagelike structure that is attached to said rigid shaft via connection of said inner hubs to a plurality of said outer races of said bearings at points along the rigid shaft to allow the entire assemblage to rotate freely about the longitudinal axis of said rigid shaft independently of said rotating mass
    (e) a windshield in the form of a curved planar structure attached to said windshield support structure via a plurality of said vertical support members so that the circular extent of said windshield encompasses 180 degrees of arc and is bounded vertically by the same linear dimension as that of said vertical support members' longitudinal axes
    (f) a directional control structure in the form of a rigid planar surface oriented vertically and attached to one vertical edge of said windshield and extending radially outside of and perpendicular to the circumference of said windshield support structure to such extent necessary so as to provide such force as necessary to keep said windshield in a constant attitude with respect to wind direction so as to allow wind pressure to be applied to only one half the frontal area of said rotating mass that is facing into the wind whereby creating assymetric forces to be applied to said attached sails causing said rotating mass to turn in one direction only
    (g) a hollow cylindrical structure forming a duct with the same inner diameter as that of said outer rotor and a length of approximately four times the diameter of said duct with said duct bent in the middle of said length to form a 90 degree elbow with one half of said duct oriented with its longitudinal axis horizontal and the other half of said duct oriented with its longitudinal axis vertical with the top of the vertical portion of said duct connected to the bottom of said windshield support structure via attachments to said windshield support structure radial support structures with the horizontal portion of said duct having a flared funnel attached to its open end with the horizontal portion of said duct connected to said rigid shaft via connection to said outer race such that the entire duct rotates about the longitudinal axis of said rigid shaft in unison with said windshield support structure whereby the open end of the funnel is always pointed into the wind
    (h) a plurality of rigid planar structures attached to the outer rotor to inner rotor radial support structures so as to form a plurality of impellor vanes oriented in such a manner so as to provide an additive component of torque to said rotating mass by virtue of the wind being redirected through said funnel and duct and impinging upon said impellor vanes before being exhausted through the open top of said rotating mass.

2. The plurality of sails of claim 1 wherein said sails are formed from the connection of individual rigid planar structures to each other so as to form articulated structures whereby maximum collective surface area is afforded to capture wind energy in one direction of rotation of said rotating mass but in the opposite direction of rotation of said rotating mass the profile of said articulated sails afford relatively minimal collective surface area whereby ensuring through assymetric forces that the rotating mass will always initiate and sustain rotation in one direction only.

3. The plurality of sails of claim 1 wherein said sails are mounted to the structure of said outer rotor in such a manner so as to allow the connecting masts of said sails to pivot radially about their longitudinal axes through an angle determined by physical limits imposed through structural contact with said outer rotor structure whereby allowing said sails to produce a greater torque in one direction of pivot travel and to produce a lesser torque in the opposite direction pivot travel whereby ensuring through assymetric forces that the rotating mass will rotate in one direction only.

4. A device to maximize the transformation of kinetic energy derived from wind into electrical energy by mechanically manipulating physical moments of inertia of a rotating mass to optimum physical positions based upon wind speed values derived from sensor data and through selective harvest of such electrical energy through means of electrically controlling the amount excitation current applied to electromagnets of an electromagnetic generator based upon the available kinetic energy value of rotating mass that is being used as the prime mover of said electromagnetic generator with said kinetic energy value being derived mathematically as the product of the measured rotational velocity of said rotating mass multiplied by the square of the real time calculation of the physical moment of inertia of said rotating mass using means comprising:
  (a) a rigid shaft anchored to the earth or some fixed structure so that its orientation is such that its longitudinal axis is approximately vertical and having a plurality of cylindrical bearings attached so that the inner races of said bearings are affixed to said shaft with the outer races of said bearings allowed to rotate freely concentrically about the longitudinal axis of said shaft
  (b) a hollow cylindrical structure serving as an outer rotor and another hollow cylindrical structure smaller in diameter serving as an inner rotor with the two connected to each other by a plurality of radial support structures serving as spokes between them with the inner rotor being attached to said rigid shaft via connection to a plurality of said outer races of said bearings
  (c) a plurality of rigid planar surfaces attached to the outside circumference of the outer rotor to form a plurality of sails which when impacted by incident wind will exert a torque upon the outer rotor tangentially to cause the collective rotating mass of sails, cylinders, spokes, all components attached to said cylinders, and outer bearing races to rotate about the longitudinal axis of said rigid shaft
  (d) a wind speed measuring device capable of providing an electrical output representative of such speed that is compatible to be used as a sensory input to data processing circuitry
  (e) a power supply device capable of providing necessary power for electronic circuitry used to power and monitor sensory devices as well as power circuitry used to control electromechanical and electronic regulatory devices
  (f) a plurality of devices attached to said radial support structures with each comprised of a mass and mechanical components that position said mass at variable physical positions along the longitudinal axis of said radial support structure with the shifting masses each controlled by their individual electromechanical mechanisms
  (g) electronic circuit elements comprising counters, nonvolatile memory devices, a central processing unit, and amplifiers with these elements used to accept as inputs real time wind speed and shifting mass positional data and in turn use predetermined formulae stored in said nonvolatile memory to provide the necessary controls to amplifiers to provide corresponding drive signals to said shifting masses' electromechanical mechanisms in order to optimize the position of said shifting masses for a given wind speed
  (h) an electromagnetic generator comprising a plurality of disklike rotor subassemblies mounted on said inner rotor with a plurality of disklike stator subassemblies mounted on static structures attached to said rigid shaft with said electromagnetic generator stator subassemblies constructed and mounted in such a manner so as to allow mounting of said electromagnetic generator stator subassemblies between said electromagnetic generator rotor subassemblies with no resultant physical interference with said inner rotor's rotation about the longitudinal axis of said rigid shaft with each electromagnetic rotor subassembly including a plurality of electromagnets that will create magnetic fields when subjected to electric current flowing through their field coils and with each electromagnetic generator stator subassembly including a plurality of armature windings which when subjected to motion relative to and in close proximity to said magnetic fields will produce an alternating current voltage
  (i) an angular velocity measuring device capable of providing an electrical output representative of angular velocity of said rotating mass that is compatible to be used as a sensory input to data processing circuitry
  (j) electronic circuit elements comprising counters, nonvolatile memory devices, a central processing unit, a zero crossing voltage detector, analog-to-digital converters, and amplifiers with these elements used to accept as inputs real time rotating mass angular velocity and shifting mass positional data and in turn use predetermined formulae stored in said memory devices to provide the necessary controls to amplifiers to provide corresponding drive signals to regulate the amount of current flowing through the field coils of said electromagnets in said electromagnetic generator in order to optimize the amount of electrical power harvested for a given amount of kinetic energy produced by said rotating mass
  (k) a power supply mounted on said rigid shaft which accepts as input alternating current voltages produced by said electromagnetic generator and in turn rectifies, filters, and regulates these input voltages to produce a direct current voltage as an output to be used to supply external loads.

5. The wind speed sensing device of claim 4 wherein said device is mounted in such a manner so as to be exposed to an airstream devoid of turbulence caused by airflow being deviated by contact with associated structures with said device being comprised of:
  (a) a hollow cylindrical structure oriented vertically serving as an anemometer support structure with a photoelectric sensor attached that is comprised of a planar surface emitting some wavelength of light with another planar surface parallel to the other serving to detect said light and capable of producing an electrical signal corresponding to the detection of said light whereby said signal varies in magnitude when some solid object passes between the emitter and detector surfaces
  (b) a hollow cylindrical structure oriented vertically serving as an anemometer rotor shaft with a plurality of cylindrical bearings attached so that the inner races of the bearings are affixed to the shaft with the outer races of the bearings allowed to rotate freely concentrically about the longitudinal axis of the shaft
  (c) an anemometer rotor structure comprised of a hollow cylindrical structure closed on one end serving as the inner hub of the anemometer rotor structure with a plurality of cuplike structures attached to the outer circumference of the inner hub with a plurality of radial support structures serving as spokes with the orientation of the cuplike structures being such that they have their openings pointed in the same direction circumferentially so that when subjected to wind they will afford physical profiles resulting in assymetric forces being applied to said anemometer rotor structure with the entire anemometer rotor structure mounted on the top end of said anemometer rotor shaft such that when this assemblage is inserted into said anemometer support structure the anemometer rotor shaft and anemometer rotor structure are free to rotate about the longitudinal axis of said anemometer support structure and secured to said anemometer support structure by connection of the outer races of said cylindrical bearings of said anemometer rotor shaft to the inner circumferential surface of said anemometer support structure (d) a plurality of rectangular standoffs emanating from the inner circumference of said anemometer rotor inner hub projecting physically toward said anemometer rotor shaft with each standoff having a cross sectional dimension and situated vertically on the inside circumference of said anemometer rotor inner hub such that when the hub is rotated the standoffs will pass between the sensor plates of said photoelectric sensor resulting in an electrical output signal whose frequency is representative of the rotational velocity of said anemometer rotor structure whereby said electrical output signal is compatible to be used by digital signal processing circuitry to calculate windspeed.

6. The power supply device of claim 4 wherein said power supply device is comprised of a permanent magnet generator that supplies an alternating current voltage to a DC power supply affixed to said inner rotor of claim 4 that uses electronic circuit elements comprising diodes, capacitors, and voltage regulators to rectify, filter, and regulate said alternating current voltage into a stable direct current voltage to be used to power electronic circuitry with said permanent magnet generator comprising:

(a) a disklike stator subassembly mounted on static structures attached to said rigid shaft of claim 4 with said permanent magnet generator stator subassembly including a plurality of permanent magnets (b) a disklike rotor subassembly mounted on said inner rotor of claim 4 with said permanent magnet generator rotor subassembly including a plurality of armature windings which when exposed in close proximity to and with relative motion to said permanent magnets associated with said permanent magnet generator stator subassembly will cause alternating current voltages to be induced in said armature windings which will be supplied as inputs to said DC power supply.

7. The permanent magnet generator of claim 6 wherein the actuation of said permanent magnet generator is delayed until a predetermined angular velocity of the rotating mass has been attained with the actuation of said permanent magnet generator accomplished through mechanical means comprising:

(a) a disklike rotor subassembly mounted on said inner rotor of claim 4 in such a manner so as to allow said disklike rotor subassembly to move up and down along the longitudinal axis of said inner rotor to such extent so as to allow a variable air gap between said disklike rotor subassembly and said disklike stator subassembly of claim 4 whereby until such time as the air gap between them reaches a predetermined distance no magnetic interaction of consequence will occur whereby no generation of power will occur (b) a cylindrical structure serving as a mounting collar attached to the top of said disklike rotor subassembly with an inside diameter the same as that of said disklike rotor subassembly with a plurality of radial alignment wheels attached to said collar with the wheels' axes of rotation tangent to the inner circumference of said collar and with the radii of said radial alignment wheels such that they allow the wheels to fit into corresponding vertical channels that are formed in the substrate of said inner rotor thereby allowing the disklike rotor subassembly to maintain positive linkage with said inner rotor to limit radial movement of said disklike rotor subassembly relative to said inner rotor irregardless of vertical movement of said disklike rotor subassembly relative to said inner rotor (c) a plurality of hollow cylindrical structures attached to and radiating from said inner rotor serving as flyweight housings with each typical flyweight housing including a dense piece of material serving as a flyweight that is placed inside said flyweight housing so that said flyweight is free to move along the longitudinal axis and within the confines of said flyweight housing with said flyweight's travel limited in the direction toward said inner rotor by placement of a structural bulkhead within said flyweight housing and said flyweight's travel limited in the direction away from said inner rotor by connection to said disklike rotor subassembly via cable whereby centrifugal force generated by the rotating mass causes said flyweight to move away from said inner rotor and by virtue of said connection to said disklike rotor subassembly causes said disklike rotor subassembly to move upwards along the longitudinal axis of said inner rotor to a point along the inner rotor where there exists superstructure along the outer circumference of said inner rotor that serves as a physical stop limiting further travel by disklike rotor subassembly and in turn said flyweight's travel away from said inner rotor (d) a plurality of pulleys corresponding to the plurality of said flyweight housings with a typical pulley including an axle, and wheel, with the axle mounted horizontally spanning the inner diameter of said flyweight housing and said wheel rotating about the axle with said pulley mounted between said structural bulkhead and said inner rotor with each typical pulley serving as a point of redirection of travel to a cable that is connected to said flyweight with said cable then passing through an opening in said structural bulkhead then riding around 90 degrees of outer circumferential surface afforded by said pulley wheel then passing through an opening in the bottom of said flyweight housing finally connecting to the top of said disklike rotor subassembly (e) a plurality of springs mounted with their axes of extension parallel to said inner rotor with one end of said springs affixed to said inner rotor and the other end of said springs affixed to the bottom of said disklike rotor subassembly whereby said springs exert forces that oppose the movement of said disklike rotor subassembly upwards along the longitudinal axis of said inner rotor toward said disklike stator subassembly until a predetermined angular velocity is reached by said rotating mass that will produce sufficient centrifugal forces to cause said flyweights to move said disklike rotor subassembly toward said disklike stator subassembly until a predetermined physical dimension of airgap is reached to enable magnetic interaction of said disklike rotor subassembly with said disklike stator subassembly.

8. The plurality of devices of claim 4 wherein each said device is typically comprised of a direct current driven motor housed within the confines of said radial support structure where said radial support structure connects to said inner rotor with said direct current driven motor connected to a threaded shaft that extends along the longitudinal axis of said radial support structure with said direct current driven motor being under electrical control of said electronic circuit elements of claim 4 and able to rotate in either direction in order to move a captive mass threaded upon said threaded shaft to a position along said threaded shaft whereby changing the physical moment of inertia of said rotating mass to an optimum position with travel of said captive mass limited in the direction toward said inner rotor by virtue of the threaded mass completing a physical electrical circuit that includes two electrical contacts placed at a predetermined position whereby an electrical signal is propagated to said electronic circuit elements of claim 4 to stop driving said direct current motor upon receipt of the electrical position signal.

9. The angular velocity measuring device of claim 4 wherein said angular velocity measuring device is comprised of a permanent magnet generator whereby the alternating current voltage output of said permanent magnet generator is used as an input to electronic circuitry whereby the frequency of said alternating current voltage is representative of angular velocity.

* * * * *